US012802511B2

(12) United States Patent
Forutanpour et al.

(10) Patent No.: US 12,802,511 B2
(45) Date of Patent: Nov. 17, 2026

(54) KIOSK FOR EVALUATING AND PURCHASING USED ELECTRONIC DEVICES

(71) Applicant: ecoATM, LLC, San Diego, CA (US)

(72) Inventors: Babak Forutanpour, San Diego, CA (US); Ted Ray Gooding, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 815 days.

(21) Appl. No.: 17/445,821

(22) Filed: Aug. 24, 2021

(65) Prior Publication Data

US 2022/0068076 A1 Mar. 3, 2022

Related U.S. Application Data

(60) Provisional application No. 63/088,377, filed on Oct. 6, 2020, provisional application No. 63/070,207, filed on Aug. 25, 2020.

(51) Int. Cl.
*G07F 7/06* (2006.01)
*G06Q 10/30* (2023.01)
(Continued)

(52) U.S. Cl.
CPC ............... *G07F 7/06* (2013.01); *G06Q 10/30* (2013.01); *G06Q 20/18* (2013.01); *G06Q 20/322* (2013.01); *G06Q 30/0278* (2013.01); *G07F 7/005* (2013.01)

(58) Field of Classification Search
CPC ... G07F 7/06; G07F 7/005; G07F 9/10; G07F 11/34; G07F 11/44; G06Q 10/30;
(Continued)

(56) References Cited

U.S. PATENT DOCUMENTS 1,327,315 A 1/1920 Davies
1,730,015 A * 10/1929 Rooke .................... G07B 15/02 235/32
(Continued)

FOREIGN PATENT DOCUMENTS

CA 2760863 11/2010
CA 3039716 9/2011
(Continued)

OTHER PUBLICATIONS

US 12,190,672 B2, 01/2025, Forutanpour et al. (withdrawn)
(Continued)

*Primary Examiner* — Tan D Nguyen
(74) *Attorney, Agent, or Firm* — Ashurst Perkins Coie US LLP

(57) ABSTRACT

Various embodiments of kiosks for purchasing and/or recycling mobile phones and other mobile electronic devices from users are disclosed herein. In some embodiments, the kiosks are relatively small (e.g., less than 0.75 cubic feet) and/or are configured to mount to other kiosks or other suitable mounting structures in publicly accessible areas. The kiosks can include an inspection area having a transparent plate through which the mobile electronic device can be viewed by a camera in the kiosk. The transparent plate can be movable (e.g., tiltable) to direct the mobile electronic device to one or more bins below the inspection area. The kiosk can also include one or more deflecting plates configured to direct the mobile electronic device to a selected bin. One or more of the deflecting plates can be configured to move (e.g., tilt) between two or more configurations to direct mobile electronic device to the selected bin.

16 Claims, 27 Drawing Sheets

(51) Int. Cl.

| | |
|---|---|
| ***G06Q 20/18*** | (2012.01) |
| ***G06Q 20/32*** | (2012.01) |
| ***G06Q 30/02*** | (2023.01) |
| ***G07F 7/00*** | (2006.01) |

(58) Field of Classification Search

CPC .. G06Q 20/18; G06Q 20/322; G06Q 30/0278; G06Q 30/0237; G06Q 30/0601; Y02W 90/00

See application file for complete search history.

(56) References Cited

U.S. PATENT DOCUMENTS

| | | | | |
|---|---|---|---|---|
| 2,817,725 | A | 12/1957 | Rochfort | |
| 3,808,439 | A | 4/1974 | Renius | |
| 4,248,334 | A | 2/1981 | Hanley et al. | |
| 4,519,522 | A | 5/1985 | McElwee | |
| 4,593,820 | A | 6/1986 | Antonie | |
| 4,715,709 | A | 12/1987 | Sekine et al. | |
| 4,821,118 | A | 4/1989 | Lafreniere | |
| 4,845,636 | A | 7/1989 | Walker | |
| 4,870,357 | A | 9/1989 | Young et al. | |
| 4,878,736 | A | 11/1989 | Hekker et al. | |
| 4,893,789 | A | 1/1990 | Novorsky | |
| 4,927,051 | A | 5/1990 | Falk et al. | |
| 4,951,308 | A | 8/1990 | Bishop et al. | |
| 5,025,344 | A | 6/1991 | Maly et al. | |
| 5,027,074 | A | 6/1991 | Haferstat | |
| 5,077,462 | A | 12/1991 | Newell et al. | |
| 5,091,773 | A | 2/1992 | Fouche et al. | |
| 5,105,149 | A | 4/1992 | Tokura | |
| 5,159,560 | A | 10/1992 | Newell et al. | |
| 5,216,502 | A | 6/1993 | Katz | |
| 5,280,170 | A | 1/1994 | Baldwin | |
| 5,319,459 | A | 6/1994 | Mochizuki et al. | |
| 5,339,096 | A | 8/1994 | Beaufort et al. | |
| 5,413,454 | A | 5/1995 | Movesian | |
| 5,419,438 | A | 5/1995 | Squyres et al. | |
| 5,436,554 | A | 7/1995 | Decker | |
| 5,482,140 | A | 1/1996 | Moore | |
| 5,533,645 | A | 7/1996 | Wittern | |
| 5,570,920 | A | 11/1996 | Crisman et al. | |
| 5,572,444 | A | 11/1996 | Lentz et al. | |
| 5,610,710 | A | 3/1997 | Canfield et al. | |
| 5,711,530 | A | 1/1998 | Lewis | |
| 5,717,780 | A | 2/1998 | Mitsumune et al. | |
| 5,747,784 | A | 5/1998 | Walter et al. | |
| 5,748,084 | A | 5/1998 | Isikoff | |
| 5,775,806 | A | 7/1998 | Allred | |
| 5,839,058 | A | 11/1998 | Phillips et al. | |
| 5,868,236 | A | 2/1999 | Rademacher | |
| 5,871,371 | A | 2/1999 | Rothenberger et al. | |
| 5,920,338 | A | 7/1999 | Katz | |
| 5,937,396 | A | 8/1999 | Konya | |
| 5,949,901 | A | 9/1999 | Nichani et al. | |
| 5,965,858 | A | 10/1999 | Suzuki et al. | |
| 5,966,654 | A | 10/1999 | Croughwell et al. | |
| 5,987,159 | A | 11/1999 | Nichani | |
| 5,988,431 | A | 11/1999 | Roe | |
| 5,988,971 | A | 11/1999 | Fossey et al. | |
| 6,029,851 | A | 2/2000 | Jenkins et al. | |
| 6,041,229 | A | 3/2000 | Turner | |
| 6,055,512 | A | 4/2000 | Dean et al. | |
| 6,100,986 | A | 8/2000 | Rydningen | |
| 6,170,702 | B1 | 1/2001 | Zettler et al. | |
| 6,181,805 | B1 | 1/2001 | Koike et al. | |
| 6,216,890 | B1 | 4/2001 | Rathmer | |
| 6,228,008 | B1 | 5/2001 | Pollington et al. | |
| 6,234,812 | B1 | 5/2001 | Ivers et al. | |
| 6,259,827 | B1 | 7/2001 | Nichani | |
| 6,264,104 | B1 | 7/2001 | Jenkins et al. | |
| 6,283,475 | B1 | 9/2001 | Stubben | |
| 6,323,782 | B1 | 11/2001 | Stephens et al. | |
| 6,330,354 | B1 | 12/2001 | Companion et al. | |
| 6,330,958 | B1 | 12/2001 | Ruskin et al. | |
| 6,393,095 | B1 | 5/2002 | Robinson | |
| 6,462,644 | B1 | 10/2002 | Howell et al. | |
| 6,529,837 | B1 | 3/2003 | Kang | |
| 6,535,637 | B1 | 3/2003 | Wootton et al. | |
| 6,573,886 | B1 | 6/2003 | Lehtinen et al. | |
| 6,587,581 | B1 | 7/2003 | Matsuyama et al. | |
| 6,595,684 | B1 | 7/2003 | Casagrande et al. | |
| 6,597,552 | B1 | 7/2003 | Griepentrog et al. | |
| 6,606,154 | B1 | 8/2003 | Oda | |
| 6,633,377 | B1 | 10/2003 | Weiss et al. | |
| 6,667,800 | B1 | 12/2003 | Larsson et al. | |
| 6,679,499 | B2 | 1/2004 | Jeon | |
| 6,687,679 | B1 | 2/2004 | Van Luchene | |
| 6,741,731 | B1 | 5/2004 | Yamamoto et al. | |
| 6,748,296 | B2 | 6/2004 | Banerjee et al. | |
| 6,754,637 | B1 | 6/2004 | Stenz | |
| 6,758,370 | B2 | 7/2004 | Cooke et al. | |
| 6,798,528 | B1 | 9/2004 | Hartman | |
| 6,822,422 | B2 | 11/2004 | Sagawa | |
| 6,842,596 | B2 | 1/2005 | Morii et al. | |
| 6,854,656 | B2 | 2/2005 | Matsumori | |
| 6,947,941 | B1 | 9/2005 | Koon | |
| D512,964 | S | 12/2005 | Kissinger et al. | |
| 7,062,454 | B1 | 6/2006 | Giannini et al. | |
| 7,066,767 | B2 | 6/2006 | Liao | |
| 7,069,236 | B1 | 6/2006 | Tsunenari | |
| 7,076,449 | B2 | 7/2006 | Tsunenari et al. | |
| 7,086,592 | B2 | 8/2006 | Wagner et al. | |
| 7,178,720 | B1 | 2/2007 | Strubbe et al. | |
| 7,201,125 | B2 | 4/2007 | Evans | |
| 7,234,609 | B2 | 6/2007 | DeLazzer et al. | |
| 7,251,458 | B2 | 7/2007 | O'Connell | |
| 7,268,345 | B2 | 9/2007 | Schultz | |
| 7,321,766 | B2 | 1/2008 | Liu et al. | |
| 7,334,729 | B2 | 2/2008 | Brewington | |
| 7,343,319 | B1 | 3/2008 | Jen | |
| 7,407,392 | B2 | 8/2008 | Cooke et al. | |
| 7,408,674 | B2 | 8/2008 | Moro et al. | |
| 7,431,158 | B2 * | 10/2008 | Yamada | B65D 25/107 206/448 |
| 7,455,226 | B1 | 11/2008 | Hammond et al. | |
| 7,520,666 | B2 | 4/2009 | Pevzner et al. | |
| 7,529,687 | B1 | 5/2009 | Phan | |
| 7,567,344 | B2 | 7/2009 | LeBlanc et al. | |
| 7,635,131 | B2 | 12/2009 | Fukazawa | |
| 7,642,687 | B2 | 1/2010 | Kageyama et al. | |
| 7,646,193 | B2 | 1/2010 | Suzuki et al. | |
| 7,649,450 | B2 | 1/2010 | Campion et al. | |
| 7,702,108 | B2 | 4/2010 | Amon et al. | |
| 7,735,125 | B1 | 6/2010 | Alvarez et al. | |
| 7,761,331 | B2 | 7/2010 | Low et al. | |
| 7,783,379 | B2 | 8/2010 | Beane et al. | |
| 7,848,833 | B2 | 12/2010 | Li | |
| 7,881,965 | B2 | 2/2011 | Bowles et al. | |
| 7,890,373 | B2 | 2/2011 | Junger | |
| D640,199 | S | 6/2011 | Wilson | |
| 8,010,402 | B1 | 8/2011 | Sharma et al. | |
| 8,019,588 | B1 | 9/2011 | Wohlberg et al. | |
| 8,025,229 | B2 | 9/2011 | Hammond et al. | |
| 8,031,930 | B2 | 10/2011 | Wang et al. | |
| 8,107,243 | B2 | 1/2012 | Guccione et al. | |
| 8,112,325 | B2 | 2/2012 | Foy et al. | |
| 8,142,199 | B1 | 3/2012 | Almouli | |
| 8,156,008 | B2 | 4/2012 | Bae et al. | |
| 8,195,511 | B2 | 6/2012 | Bowles et al. | |
| 8,200,533 | B2 | 6/2012 | Librizzi et al. | |
| 8,200,736 | B2 | 6/2012 | Shi | |
| 8,215,546 | B2 | 7/2012 | Lin et al. | |
| 8,239,262 | B2 | 8/2012 | Bowles et al. | |
| 8,254,883 | B2 | 8/2012 | Uchida | |
| 8,266,008 | B1 | 9/2012 | Siegel et al. | |
| 8,340,815 | B2 | 12/2012 | Peters et al. | |
| 8,369,987 | B2 | 2/2013 | Claessen | |
| 8,401,914 | B1 | 3/2013 | Kim | |
| 8,417,234 | B2 | 4/2013 | Sanding et al. | |
| 8,418,226 | B2 | 4/2013 | Gardner | |
| 8,423,404 | B2 | 4/2013 | Bowles et al. | |
| 8,429,021 | B2 | 4/2013 | Kraft et al. | |
| 8,463,646 | B2 | 6/2013 | Bowles | |

(56) References Cited

U.S. PATENT DOCUMENTS

| | | | | |
|---|---|---|---|---|
| 8,482,413 | B2 * | 7/2013 | Martin | G07D 3/14 340/572.1 |
| 8,536,472 | B2 | 9/2013 | Wu et al. | |
| 8,543,358 | B2 | 9/2013 | Trabona | |
| 8,566,183 | B1 | 10/2013 | Bonar et al. | |
| 8,606,633 | B2 | 12/2013 | Tarbert et al. | |
| 8,712,893 | B1 | 4/2014 | Brandmaier et al. | |
| 8,718,717 | B2 | 5/2014 | Vaknin et al. | |
| 8,743,215 | B1 | 6/2014 | Lee | |
| 8,755,783 | B2 | 6/2014 | Brahami et al. | |
| 8,781,622 | B2 | 7/2014 | Mockus | |
| 8,806,280 | B2 | 8/2014 | Stephenson | |
| 8,823,794 | B2 | 9/2014 | Suzuki et al. | |
| 8,824,136 | B1 | 9/2014 | Interian et al. | |
| 8,922,643 | B2 | 12/2014 | Ji et al. | |
| 9,010,627 | B1 | 4/2015 | Prasad et al. | |
| 9,043,026 | B2 | 5/2015 | Lien et al. | |
| 9,075,781 | B2 | 7/2015 | Matthews | |
| 9,081,477 | B2 | 7/2015 | Kang | |
| 9,124,056 | B1 | 9/2015 | Lewis, Jr. | |
| 9,147,063 | B1 | 9/2015 | Florissi | |
| 9,153,089 | B1 | 10/2015 | Hewett | |
| 9,189,911 | B2 | 11/2015 | Kavli et al. | |
| 9,195,979 | B2 | 11/2015 | Geller | |
| 9,256,863 | B2 | 2/2016 | Chayon et al. | |
| 9,283,672 | B1 | 3/2016 | Matthews | |
| 9,317,989 | B2 | 4/2016 | Grow et al. | |
| 9,355,515 | B2 | 5/2016 | Brahami et al. | |
| 9,367,436 | B2 | 6/2016 | Matthews | |
| 9,367,982 | B2 | 6/2016 | Chayun et al. | |
| 9,378,606 | B2 | 6/2016 | Chayun et al. | |
| 9,390,442 | B2 | 7/2016 | Lyle | |
| 9,435,931 | B2 | 9/2016 | Tanuma | |
| 9,469,037 | B2 | 10/2016 | Matthews | |
| 9,497,563 | B2 | 11/2016 | Hornung et al. | |
| 9,576,209 | B2 | 2/2017 | Jenkinson et al. | |
| 9,578,133 | B2 | 2/2017 | Matthews | |
| 9,582,101 | B2 | 2/2017 | Chang et al. | |
| 9,595,238 | B2 | 3/2017 | Won | |
| 9,621,947 | B1 | 4/2017 | Oztaskent | |
| 9,641,997 | B2 | 5/2017 | Vratskides | |
| 9,668,298 | B1 | 5/2017 | Pearl et al. | |
| 9,697,548 | B1 | 7/2017 | Jaff et al. | |
| 9,704,142 | B2 | 7/2017 | Ahn | |
| 9,718,196 | B2 | 8/2017 | Matthews | |
| 9,792,597 | B1 | 10/2017 | Abbott | |
| 9,818,160 | B2 | 11/2017 | Bowles et al. | |
| 9,858,178 | B2 | 1/2018 | Matthews | |
| 9,866,664 | B2 | 1/2018 | Sinha et al. | |
| 9,881,284 | B2 | 1/2018 | Bowles et al. | |
| 9,885,672 | B2 | 2/2018 | Forutanpour et al. | |
| 9,904,911 | B2 | 2/2018 | Bowles et al. | |
| 9,911,102 | B2 | 3/2018 | Bowles | |
| 9,934,644 | B2 | 4/2018 | Chayun et al. | |
| 9,936,331 | B2 | 4/2018 | Matthews | |
| 9,972,046 | B2 | 5/2018 | Ackerman | |
| 10,032,140 | B2 | 7/2018 | Bowles et al. | |
| 10,043,339 | B2 | 8/2018 | Walker et al. | |
| 10,044,843 | B2 | 8/2018 | Sinha et al. | |
| 10,055,798 | B2 | 8/2018 | Bowles et al. | |
| 10,127,647 | B2 | 11/2018 | Forutanpour et al. | |
| 10,157,379 | B2 | 12/2018 | Singh | |
| 10,157,427 | B2 | 12/2018 | Bowles et al. | |
| 10,261,611 | B2 | 4/2019 | Matthews | |
| 10,264,426 | B2 | 4/2019 | Matthews | |
| 10,269,110 | B2 | 4/2019 | Forutanpour et al. | |
| 10,275,813 | B2 | 4/2019 | Fu | |
| 10,304,057 | B1 | 5/2019 | Powell | |
| 10,325,440 | B2 | 6/2019 | Abdelmalak et al. | |
| 10,339,509 | B2 | 7/2019 | Bordeleau et al. | |
| 10,401,411 | B2 | 9/2019 | Snook et al. | |
| 10,417,615 | B2 | 9/2019 | Bowles et al. | |
| 10,432,328 | B2 | 10/2019 | Diperna et al. | |
| 10,438,174 | B2 | 10/2019 | Bowles et al. | |
| 10,445,708 | B2 | 10/2019 | Hunt et al. | |
| 10,452,527 | B2 | 10/2019 | Matthews | |
| 10,475,002 | B2 | 11/2019 | Silva et al. | |
| 10,496,963 | B2 | 12/2019 | Silva et al. | |
| 10,528,992 | B2 | 1/2020 | Yost | |
| 10,529,008 | B1 | 1/2020 | Pritchard | |
| 10,565,629 | B2 | 2/2020 | Hartman | |
| 10,572,946 | B2 | 2/2020 | Bowles et al. | |
| 10,600,095 | B2 | 3/2020 | Ackerman | |
| 10,671,367 | B2 | 6/2020 | Matthews | |
| 10,679,279 | B2 | 6/2020 | Ward | |
| 10,701,571 | B2 | 6/2020 | Doshi et al. | |
| 10,740,891 | B1 | 8/2020 | Chen et al. | |
| 10,803,527 | B1 | 10/2020 | Zankat et al. | |
| 10,810,732 | B2 | 10/2020 | Dwivedi et al. | |
| 10,824,942 | B1 | 11/2020 | Bhotika et al. | |
| 10,825,082 | B2 | 11/2020 | Librizzi et al. | |
| 10,834,555 | B2 | 11/2020 | Matthews | |
| 10,839,651 | B2 | 11/2020 | Smart | |
| 10,846,672 | B2 | 11/2020 | Dion et al. | |
| 10,853,873 | B2 | 12/2020 | Bowles et al. | |
| 10,860,122 | B2 | 12/2020 | Matthews | |
| 10,860,990 | B2 | 12/2020 | Bowles et al. | |
| 10,909,673 | B2 | 2/2021 | Forutanpour et al. | |
| 10,970,786 | B1 | 4/2021 | Matheson et al. | |
| 10,977,700 | B2 | 4/2021 | Bordeleau et al. | |
| 11,004,126 | B1 | 5/2021 | Jacobs, II | |
| 11,010,841 | B2 | 5/2021 | Bowles et al. | |
| 11,014,093 | B1 * | 5/2021 | Drexler | B02C 25/00 |
| 11,024,111 | B2 | 6/2021 | Abdelmalak et al. | |
| 11,079,753 | B1 * | 8/2021 | Roy | G05D 1/0016 |
| 11,080,662 | B2 | 8/2021 | Bowles et al. | |
| 11,080,672 | B2 | 8/2021 | Bowles | |
| 11,107,046 | B2 | 8/2021 | Bowles | |
| 11,122,034 | B2 | 9/2021 | Cicchitto | |
| 11,126,973 | B2 | 9/2021 | Silva et al. | |
| 11,164,000 | B2 | 11/2021 | Lee et al. | |
| 11,232,412 | B2 | 1/2022 | Hunt et al. | |
| 11,257,057 | B1 | 2/2022 | Asmi et al. | |
| 11,288,789 | B1 | 3/2022 | Chen et al. | |
| 11,302,038 | B2 | 4/2022 | Muendel et al. | |
| 11,315,093 | B2 | 4/2022 | Bowles | |
| 11,321,768 | B2 | 5/2022 | Beauchamp | |
| 11,328,562 | B2 | 5/2022 | Smart | |
| 11,341,471 | B2 | 5/2022 | Dion et al. | |
| 11,379,886 | B1 | 7/2022 | Fields et al. | |
| 11,386,740 | B2 | 7/2022 | Shah | |
| 11,417,068 | B1 | 8/2022 | Burris et al. | |
| 11,436,570 | B2 | 9/2022 | Bowles et al. | |
| 11,443,289 | B2 | 9/2022 | Bowles et al. | |
| 11,462,868 | B2 | 10/2022 | Forutanpour et al. | |
| 11,482,067 | B2 | 10/2022 | Forutanpour et al. | |
| 11,526,932 | B2 | 12/2022 | Bowles et al. | |
| 11,574,182 | B2 | 2/2023 | Matthews | |
| 11,631,096 | B2 | 4/2023 | Schubert et al. | |
| 11,657,631 | B2 | 5/2023 | Sagnoas | |
| 11,836,867 | B2 | 12/2023 | Sadalgi | |
| 11,843,206 | B2 | 12/2023 | Forutanpour et al. | |
| 11,907,915 | B2 | 2/2024 | Bowles et al. | |
| 12,033,454 | B2 | 7/2024 | Forutanpour et al. | |
| 12,045,973 | B2 | 7/2024 | Johnson et al. | |
| 12,182,773 | B2 | 12/2024 | Bowles | |
| 12,198,108 | B2 | 1/2025 | Bowles | |
| 12,205,081 | B2 | 1/2025 | Bowles et al. | |
| 12,217,221 | B2 | 2/2025 | Silva et al. | |
| 12,223,684 | B2 | 2/2025 | Silva et al. | |
| 12,271,929 | B2 | 4/2025 | Forutanpour et al. | |
| 12,300,059 | B2 | 5/2025 | Forutanpour et al. | |
| 12,321,965 | B2 | 6/2025 | Forutanpour et al. | |
| 12,322,259 | B2 | 6/2025 | Forutanpour et al. | |
| 12,496,725 | B2 | 12/2025 | Jenkinson | |
| 2001/0025883 | A1 | 10/2001 | Ichihara et al. | |
| 2001/0035425 | A1 | 11/2001 | Rocco et al. | |
| 2001/0039531 | A1 | 11/2001 | Aoki | |
| 2002/0014577 | A1 | 2/2002 | Ulrich et al. | |
| 2002/0035515 | A1 | 3/2002 | Moreno | |
| 2002/0046122 | A1 | 4/2002 | Barber | |
| 2002/0067184 | A1 | 6/2002 | Smith et al. | |
| 2002/0087413 | A1 | 7/2002 | Mahaffy et al. | |
| 2002/0112177 | A1 | 8/2002 | Voltmer | |

(56) References Cited

U.S. PATENT DOCUMENTS

| | | | |
|---|---|---|---|
| 2002/0129170 | A1 | 9/2002 | Moore et al. |
| 2002/0147656 | A1 | 10/2002 | Tam |
| 2002/0157033 | A1 | 10/2002 | Cox |
| 2002/0162966 | A1 | 11/2002 | Yoder |
| 2002/0186878 | A1 | 12/2002 | Hoon et al. |
| 2003/0006277 | A1 | 1/2003 | Maskatiya et al. |
| 2003/0018897 | A1 | 1/2003 | Bellis, Jr. et al. |
| 2003/0025476 | A1 | 2/2003 | Trela |
| 2003/0036866 | A1 | 2/2003 | Nair et al. |
| 2003/0061150 | A1 | 3/2003 | Kocher et al. |
| 2003/0063527 | A1 | 4/2003 | Ostwald |
| 2003/0083983 | A1 | 5/2003 | Fisher |
| 2003/0100707 | A1 | 5/2003 | Hwang et al. |
| 2003/0146898 | A1 | 8/2003 | Kawasaki et al. |
| 2003/0158789 | A1 | 8/2003 | Miura et al. |
| 2003/0170529 | A1 | 9/2003 | Sagawa |
| 2003/0179371 | A1 | 9/2003 | Rangarajan et al. |
| 2003/0191675 | A1 | 10/2003 | Murashita |
| 2003/0197782 | A1 | 10/2003 | Ashe |
| 2003/0204289 | A1 | 10/2003 | Banerjee et al. |
| 2004/0012825 | A1 | 1/2004 | Tesavis |
| 2004/0039639 | A1 | 2/2004 | Walker |
| 2004/0088231 | A1 | 5/2004 | Davis |
| 2004/0114153 | A1 | 6/2004 | Andersen et al. |
| 2004/0141320 | A1 | 7/2004 | Bock et al. |
| 2004/0150815 | A1 | 8/2004 | Sones et al. |
| 2004/0156557 | A1 | 8/2004 | Van Der Weij |
| 2004/0156667 | A1 | 8/2004 | Van Der Weij et al. |
| 2004/0184651 | A1 | 9/2004 | Nordbryhn |
| 2004/0186744 | A1 | 9/2004 | Lux |
| 2004/0189812 | A1 | 9/2004 | Gustavsson |
| 2004/0200902 | A1 | 10/2004 | Ishioroshi |
| 2004/0205015 | A1 | 10/2004 | DeLaCruz |
| 2004/0235513 | A1 | 11/2004 | O'Connell |
| 2004/0242216 | A1 | 12/2004 | Boutsikakis |
| 2004/0243478 | A1 | 12/2004 | Walker et al. |
| 2004/0262521 | A1 | 12/2004 | Devitt et al. |
| 2005/0022699 | A1 | 2/2005 | Goza |
| 2005/0027622 | A1 | 2/2005 | Walker et al. |
| 2005/0035311 | A1 | 2/2005 | Asakawa et al. |
| 2005/0043897 | A1 | 2/2005 | Meyer |
| 2005/0088379 | A1 | 4/2005 | Tsuchida |
| 2005/0109841 | A1 | 5/2005 | Ryan et al. |
| 2005/0128551 | A1 | 6/2005 | Yang |
| 2005/0135917 | A1 | 6/2005 | Kauppila et al. |
| 2005/0137942 | A1 | 6/2005 | LaFluer |
| 2005/0139661 | A1 | 6/2005 | Eglen et al. |
| 2005/0143149 | A1 | 6/2005 | Becker et al. |
| 2005/0167620 | A1 | 8/2005 | Cho et al. |
| 2005/0187657 | A1 | 8/2005 | Hashimoto et al. |
| 2005/0216120 | A1 | 9/2005 | Rosenberg et al. |
| 2005/0222690 | A1 | 10/2005 | Wang et al. |
| 2005/0231595 | A1 | 10/2005 | Wang et al. |
| 2005/0240958 | A1 | 10/2005 | Nguyen et al. |
| 2006/0022827 | A1 | 2/2006 | Highham |
| 2006/0038114 | A9 | 2/2006 | Cofer et al. |
| 2006/0047573 | A1 | 3/2006 | Mitchell et al. |
| 2006/0074756 | A1 | 4/2006 | Boykin |
| 2006/0085158 | A1 | 4/2006 | Cakiner |
| 2006/0129411 | A1 | 6/2006 | Bhatti et al. |
| 2006/0167580 | A1 | 7/2006 | Whittier |
| 2006/0171171 | A1 | 8/2006 | Chiang |
| 2006/0184379 | A1 | 8/2006 | Tan et al. |
| 2006/0195384 | A1 | 8/2006 | Bauer et al. |
| 2006/0215027 | A1 | 9/2006 | Nonoyama et al. |
| 2006/0217152 | A1 | 9/2006 | Fok et al. |
| 2006/0219776 | A1 | 10/2006 | Finn |
| 2006/0229108 | A1 | 10/2006 | Cehelnik |
| 2006/0230013 | A1 | 10/2006 | Hrle |
| 2006/0235747 | A1 | 10/2006 | Hammond et al. |
| 2006/0255940 | A1 | 11/2006 | White et al. |
| 2006/0258008 | A1 | 11/2006 | Holler et al. |
| 2006/0261931 | A1 | 11/2006 | Cheng et al. |
| 2006/0271431 | A1 | 11/2006 | Wehr et al. |
| 2006/0279307 | A1 | 12/2006 | Wang et al. |
| 2006/0280356 | A1 | 12/2006 | Yamagashi |
| 2006/0287929 | A1 | 12/2006 | Bae et al. |
| 2007/0012665 | A1 | 1/2007 | Nelson |
| 2007/0013124 | A1 | 1/2007 | Graef et al. |
| 2007/0013139 | A1 | 1/2007 | Kumagai |
| 2007/0032098 | A1 | 2/2007 | Bowles et al. |
| 2007/0047797 | A1 | 3/2007 | Vilella |
| 2007/0050083 | A1 | 3/2007 | Signorelli |
| 2007/0057815 | A1 | 3/2007 | Foy et al. |
| 2007/0129906 | A1 | 6/2007 | Stoecker et al. |
| 2007/0133844 | A1 | 6/2007 | Waehner et al. |
| 2007/0140310 | A1 | 6/2007 | Rolton et al. |
| 2007/0150403 | A1 | 6/2007 | Mock et al. |
| 2007/0189597 | A1 | 8/2007 | Limer et al. |
| 2007/0205751 | A1 | 9/2007 | Suzuki et al. |
| 2007/0258085 | A1 | 11/2007 | Robbins |
| 2007/0263099 | A1 | 11/2007 | Motta et al. |
| 2007/0269099 | A1 | 11/2007 | Nishino et al. |
| 2007/0271194 | A1 | 11/2007 | Walker |
| 2007/0276911 | A1 | 11/2007 | Bhumkar |
| 2007/0281734 | A1 | 12/2007 | Mizrachi |
| 2007/0282999 | A1 | 12/2007 | Tu et al. |
| 2008/0004828 | A1 | 1/2008 | Mizrachi |
| 2008/0027581 | A1 | 1/2008 | Saether et al. |
| 2008/0033596 | A1 | 2/2008 | Fausak et al. |
| 2008/0088833 | A1 | 4/2008 | Yokota et al. |
| 2008/0109746 | A1 | 5/2008 | Mayer |
| 2008/0111989 | A1 | 5/2008 | Dufour et al. |
| 2008/0133432 | A1 | 6/2008 | Ramseyer |
| 2008/0149720 | A1 | 6/2008 | Colville |
| 2008/0167578 | A1 | 7/2008 | Bryer et al. |
| 2008/0177598 | A1 | 7/2008 | Davie |
| 2008/0201232 | A1 | 8/2008 | Walker |
| 2008/0207198 | A1 | 8/2008 | Juric |
| 2008/0228582 | A1 | 9/2008 | Fordyce |
| 2008/0228629 | A1 | 9/2008 | Gotthelf et al. |
| 2008/0231113 | A1 | 9/2008 | Guccione et al. |
| 2008/0255901 | A1 | 10/2008 | Carroll et al. |
| 2008/0256008 | A1 | 10/2008 | Kwok |
| 2008/0260235 | A1 | 10/2008 | Cai et al. |
| 2008/0277467 | A1 | 11/2008 | Carlson |
| 2008/0281691 | A1 | 11/2008 | Pearson et al. |
| 2008/0296374 | A1 | 12/2008 | Gonen et al. |
| 2008/0303915 | A1 | 12/2008 | Omi |
| 2008/0306701 | A1 | 12/2008 | Zhong et al. |
| 2009/0051907 | A1 | 2/2009 | Li et al. |
| 2009/0078775 | A1 | 3/2009 | Giebel et al. |
| 2009/0079388 | A1 | 3/2009 | Reddy |
| 2009/0095047 | A1 | 4/2009 | Patel et al. |
| 2009/0108015 | A1 | 4/2009 | Kreamer |
| 2009/0114716 | A1 | 5/2009 | Ramachandran |
| 2009/0132813 | A1 | 5/2009 | Schibuk |
| 2009/0145727 | A1 * | 6/2009 | Johns ....................... B01J 8/003 73/149 |
| 2009/0156199 | A1 | 6/2009 | Steenstra et al. |
| 2009/0160668 | A1 | 6/2009 | Crowley et al. |
| 2009/0177319 | A1 | 7/2009 | Garibaldi et al. |
| 2009/0184865 | A1 | 7/2009 | Valo et al. |
| 2009/0187491 | A1 | 7/2009 | Bull et al. |
| 2009/0190142 | A1 | 7/2009 | Taylor et al. |
| 2009/0191931 | A1 | 7/2009 | Peck |
| 2009/0207743 | A1 | 8/2009 | Huq et al. |
| 2009/0244285 | A1 | 10/2009 | Chathukutty |
| 2009/0245616 | A1 | 10/2009 | De La Ballina et al. |
| 2009/0247133 | A1 | 10/2009 | Holmen et al. |
| 2009/0248883 | A1 | 10/2009 | Suryanarayana et al. |
| 2009/0251815 | A1 | 10/2009 | Wang et al. |
| 2009/0262341 | A1 | 10/2009 | Konopa et al. |
| 2009/0265035 | A1 | 10/2009 | Jenkinson et al. |
| 2009/0299543 | A1 | 12/2009 | Cox et al. |
| 2009/0312009 | A1 | 12/2009 | Fishel |
| 2009/0321511 | A1 | 12/2009 | Browne |
| 2009/0322706 | A1 | 12/2009 | Austin |
| 2010/0005004 | A1 | 1/2010 | Hudak et al. |
| 2010/0051695 | A1 | 3/2010 | Yepez et al. |
| 2010/0063894 | A1 | 3/2010 | Lundy |
| 2010/0110174 | A1 | 5/2010 | Leconte |
| 2010/0115887 | A1 | 5/2010 | Schroeder et al. |
| 2010/0147953 | A1 | 6/2010 | Barkan |

(56) References Cited

U.S. PATENT DOCUMENTS

2010/0157280 A1 6/2010 Kusevic et al.
2010/0161397 A1 6/2010 Gauthier et al.
2010/0162359 A1 6/2010 Casey et al.
2010/0174596 A1 7/2010 Gilman
2010/0185506 A1 7/2010 Wolff
2010/0214226 A1 8/2010 Brown et al.
2010/0219234 A1 9/2010 Forbes
2010/0235198 A1 9/2010 Fini et al.
2010/0237854 A1 9/2010 Kumhyr et al.
2010/0260271 A1 10/2010 Kapoor
2010/0262481 A1 10/2010 Baker et al.
2010/0268792 A1 10/2010 Butler
2010/0312639 A1 12/2010 Mastronardi
2011/0035322 A1 2/2011 Lively
2011/0043628 A1 2/2011 Yun
2011/0043652 A1 2/2011 King et al.
2011/0047022 A1 2/2011 Walker
2011/0050164 A1 3/2011 Partovi et al.
2011/0055322 A1 3/2011 Gregersen
2011/0060641 A1 3/2011 Grossman et al.
2011/0066514 A1 3/2011 Maraz
2011/0067520 A1 3/2011 Ihrke et al.
2011/0082734 A1 4/2011 Zhang et al.
2011/0099264 A1 4/2011 Chapin et al.
2011/0113479 A1 5/2011 Ganem
2011/0173576 A1 7/2011 Murphy et al.
2011/0191861 A1 8/2011 Spears
2011/0295417 A1 12/2011 Smith, III
2011/0296339 A1 12/2011 Kang
2011/0296508 A1 12/2011 Os et al.
2011/0313840 A1 12/2011 Mason et al.
2012/0004761 A1 1/2012 Madruga
2012/0016518 A1 1/2012 Saario et al.
2012/0022965 A1 1/2012 Seergy
2012/0026582 A1 2/2012 Okabe et al.
2012/0029985 A1 2/2012 Wilson et al.
2012/0030097 A1 2/2012 Hagan et al.
2012/0030399 A1 2/2012 Ben-Harosh
2012/0054113 A1 3/2012 Jayaraman et al.
2012/0063501 A1 3/2012 Aguren
2012/0078413 A1 3/2012 Baker
2012/0095875 A1 4/2012 Guthrie
2012/0116928 A1 5/2012 Gventer
2012/0116929 A1 5/2012 Gventer
2012/0117001 A1 5/2012 Gventer et al.
2012/0127307 A1 5/2012 Hassenzahl
2012/0146956 A1 6/2012 Jenkinson
2012/0209783 A1 8/2012 Smith et al.
2012/0235812 A1 9/2012 Mello et al.
2012/0254046 A1 10/2012 Librizzi et al.
2012/0263394 A1 10/2012 Fujiwara et al.
2012/0280934 A1 11/2012 Ha
2012/0301009 A1 11/2012 Dabic
2012/0303431 A1 11/2012 Phillips et al.
2013/0006713 A1 1/2013 Haake
2013/0034305 A1 2/2013 Jahanshahi et al.
2013/0041508 A1 2/2013 Hu et al.
2013/0046611 A1 2/2013 Bowles et al.
2013/0046699 A1 2/2013 Bowles et al.
2013/0073376 A1 3/2013 Heath
2013/0112440 A1 5/2013 Alsaif et al.
2013/0124426 A1 5/2013 Bowles et al.
2013/0126741 A1 5/2013 Srivastava et al.
2013/0137376 A1 5/2013 Fitzgerald et al.
2013/0138528 A1 5/2013 McAlhaney
2013/0144797 A1* 6/2013 Bowles .................. G06Q 10/30 705/306
2013/0155061 A1 6/2013 Jahanshahi et al.
2013/0159119 A1 6/2013 Henderson et al.
2013/0161153 A1* 6/2013 Saez ....................... G07F 17/00 194/215
2013/0169413 A1 7/2013 Schuessler
2013/0173430 A1 7/2013 Benjamin
2013/0173434 A1 7/2013 Hartman
2013/0181935 A1 7/2013 McKenzie et al.
2013/0198089 A1 8/2013 Bowles
2013/0198144 A1 8/2013 Bowles
2013/0200912 A1 8/2013 Panagas
2013/0246211 A1 9/2013 Sullivan
2013/0246212 A1 9/2013 Sullivan
2013/0253700 A1 9/2013 Carson et al.
2013/0275314 A1* 10/2013 Bowles .................. G06Q 10/30 705/308
2013/0284805 A1 10/2013 Kraft et al.
2013/0290146 A1 10/2013 West et al.
2013/0297388 A1 11/2013 Kyle, Jr. et al.
2014/0006451 A1 1/2014 Mullis et al.
2014/0012643 A1 1/2014 Behrisch
2014/0028449 A1 1/2014 Sigal et al.
2014/0038556 A1 2/2014 DeSousa
2014/0046748 A1 2/2014 Nagarajan
2014/0046845 A1 2/2014 Dogin et al.
2014/0052329 A1 2/2014 Amirpour
2014/0052463 A1 2/2014 Cashman et al.
2014/0067710 A1 3/2014 Gventer et al.
2014/0080550 A1 3/2014 Ino et al.
2014/0111547 A1 4/2014 Bilbrey et al.
2014/0136351 A1* 5/2014 Lennon .................. G06Q 20/14 705/16
2014/0143161 A1 5/2014 Ahn
2014/0147004 A1 5/2014 Uchida
2014/0149201 A1 5/2014 Abbott
2014/0150100 A1 5/2014 Gupta et al.
2014/0156883 A1 6/2014 Bowles
2014/0178029 A1 6/2014 Raheman et al.
2014/0214505 A1 7/2014 Shuster-Arechiga et al.
2014/0235258 A1 8/2014 Wang et al.
2014/0244315 A1 8/2014 Cahill et al.
2014/0267691 A1 9/2014 Humphrey
2014/0273245 A1 9/2014 Ochranek et al.
2014/0278244 A1 9/2014 Humphrey et al.
2014/0297368 A1 10/2014 Ferder
2014/0316561 A1 10/2014 Tkachenko
2014/0330685 A1 11/2014 Nazzari
2014/0347473 A1 11/2014 Wolff et al.
2015/0006281 A1 1/2015 Takahashi
2015/0029751 A1 1/2015 Kim et al.
2015/0046343 A1 2/2015 Martini
2015/0066677 A1 3/2015 Bowles et al.
2015/0073590 A1 3/2015 Garcia
2015/0088698 A1 3/2015 Ackerman
2015/0088731 A1 3/2015 Ackerman
2015/0105901 A1 4/2015 Joshi
2015/0120485 A1 4/2015 Nash
2015/0161714 A1 6/2015 Fainshtein
2015/0170237 A1 6/2015 Powell
2015/0177330 A1 6/2015 Morris
2015/0193797 A1 7/2015 Gerrity
2015/0193982 A1 7/2015 Mihelich et al.
2015/0206200 A1 7/2015 Edmondson et al.
2015/0249353 A1 9/2015 Hamilton
2015/0278529 A1 10/2015 Cho et al.
2015/0293860 A9 10/2015 Bowles
2015/0294278 A1 10/2015 Nguyen
2015/0309912 A1 10/2015 Nguyen et al.
2015/0317619 A1 11/2015 Curtis
2015/0324761 A1 11/2015 Nguyen et al.
2015/0324870 A1 11/2015 Nguyen et al.
2015/0332206 A1 11/2015 Trew et al.
2015/0356637 A1 12/2015 Graffia et al.
2016/0019607 A1 1/2016 Burmester et al.
2016/0019685 A1 1/2016 Nguyen et al.
2016/0055392 A1 2/2016 Nakano
2016/0078434 A1 3/2016 Huxham et al.
2016/0087381 A1 3/2016 Wong et al.
2016/0092849 A1 3/2016 Cirannek et al.
2016/0125612 A1 5/2016 Seki et al.
2016/0171544 A1 6/2016 Heminger et al.
2016/0171575 A1 6/2016 Bowles et al.
2016/0184990 A1 6/2016 Song et al.
2016/0210648 A1* 7/2016 Cirannek ................ H04M 1/24
2016/0253861 A1 9/2016 Seo
2016/0269401 A1 9/2016 Saito et al.
2016/0269895 A1 9/2016 Soini et al.

(56) References Cited

U.S. PATENT DOCUMENTS

2016/0275460 A1 9/2016 Ploetner et al.
2016/0275518 A1 9/2016 Bowles et al.
2016/0292710 A1 10/2016 Casselle
2016/0301786 A1 10/2016 Koltsov et al.
2016/0327383 A1 11/2016 Becker et al.
2016/0328684 A1 11/2016 Bowles et al.
2016/0379287 A1 12/2016 Dabiri
2017/0011374 A1 1/2017 McDivitt
2017/0083886 A1 3/2017 Silva et al.
2017/0091823 A1 3/2017 Adinarayan et al.
2017/0110902 A1 4/2017 Miller
2017/0115235 A1 4/2017 Ohlsson et al.
2017/0142484 A1 5/2017 Jeon
2017/0169401 A1 6/2017 Beane et al.
2017/0221110 A1 8/2017 Sullivan et al.
2017/0249729 A1 8/2017 Greene et al.
2017/0256051 A1 9/2017 Dwivedi et al.
2017/0278191 A1 9/2017 Tassone et al.
2017/0301010 A1 10/2017 Bowles et al.
2017/0323279 A1 11/2017 Dion et al.
2017/0343481 A1 11/2017 Jahanshahi et al.
2018/0084094 A1 3/2018 Sinha et al.
2018/0101810 A1 4/2018 Feng et al.
2018/0122022 A1 5/2018 Kelly
2018/0157246 A1 6/2018 Huang et al.
2018/0157820 A1 6/2018 Adams et al.
2018/0160269 A1 6/2018 Baarman et al.
2018/0165655 A1 6/2018 Marcelle et al.
2018/0232875 A1 8/2018 Kanodia et al.
2018/0240144 A1 8/2018 Curtis
2018/0255047 A1 9/2018 Cicchitto
2018/0293566 A1 10/2018 Engles et al.
2018/0293664 A1 10/2018 Zhang et al.
2018/0300776 A1 10/2018 Yost
2018/0321163 A1 11/2018 Casadio
2018/0322623 A1 11/2018 Memo et al.
2018/0342050 A1 11/2018 Fitzgerald et al.
2018/0350163 A1 12/2018 Pofale et al.
2018/0365744 A1 12/2018 Lennon
2019/0017863 A1* 1/2019 Saltzman ............. G06Q 20/065
2019/0019147 A1 1/2019 McCarty et al.
2019/0051090 A1 2/2019 Goldberg et al.
2019/0066073 A1 2/2019 Yen et al.
2019/0066075 A1 2/2019 Lobo et al.
2019/0066439 A1 2/2019 Pinkus
2019/0073566 A1 3/2019 Brauer
2019/0073568 A1 3/2019 He et al.
2019/0102874 A1 4/2019 Goja
2019/0156611 A1 5/2019 Redhead
2019/0166278 A1 5/2019 Hiyama et al.
2019/0222748 A1 7/2019 Weir et al.
2019/0251777 A1 8/2019 Abdelmalak et al.
2019/0272628 A1 9/2019 Tsou
2019/0279181 A1 9/2019 Kelly
2019/0279431 A1 9/2019 Wurmfeld et al.
2019/0318465 A1 10/2019 Nguyen
2019/0372827 A1 12/2019 Vasseur et al.
2019/0375300 A1 12/2019 Lyon
2020/0020097 A1 1/2020 Do et al.
2020/0042795 A1 2/2020 Lee et al.
2020/0042969 A1 2/2020 Ray
2020/0066067 A1 2/2020 Herman et al.
2020/0090137 A1 3/2020 Bowles et al.
2020/0104028 A1 4/2020 Vats
2020/0104720 A1 4/2020 Boa et al.
2020/0104868 A1 4/2020 Schubert et al.
2020/0175481 A1* 6/2020 Pham ...................... G07F 19/21
2020/0175669 A1 6/2020 Bian et al.
2020/0202319 A1 6/2020 Forutanpour et al.
2020/0202405 A1 6/2020 Glickman et al.
2020/0202419 A1 6/2020 Beauchamp
2020/0241891 A1 7/2020 Li et al.
2020/0258343 A1* 8/2020 Forutanpour ........... G07F 11/72
2020/0265487 A1 8/2020 Forutanpour et al.
2020/0265666 A1 8/2020 Yamamiya
2020/0286030 A1 9/2020 Hewett
2020/0342442 A1 10/2020 Curtis
2020/0387881 A1 12/2020 Smith
2020/0393742 A1 12/2020 Dion et al.
2020/0410793 A1 12/2020 Folco
2021/0012315 A1 1/2021 Priebatsch
2021/0081698 A1 3/2021 Lindeman et al.
2021/0081914 A1 3/2021 Nelms et al.
2021/0110366 A1 4/2021 Dion et al.
2021/0110440 A1 4/2021 Dion et al.
2021/0124994 A1 4/2021 Buibas et al.
2021/0150773 A1 5/2021 Muendel et al.
2021/0174312 A1 6/2021 Bowles et al.
2021/0192484 A1 6/2021 Forutanpour et al.
2021/0209512 A1 7/2021 Gaddam et al.
2021/0209746 A1 7/2021 Johnson et al.
2021/0217076 A1 7/2021 Kruper et al.
2021/0224867 A1 7/2021 Bordeleau et al.
2021/0247016 A1 8/2021 Affentranger
2021/0254966 A1 8/2021 Hur et al.
2021/0255240 A1 8/2021 McGrath
2021/0264483 A1 8/2021 Hirata
2021/0272073 A1 9/2021 Chen
2021/0272208 A1 9/2021 Leise et al.
2021/0278338 A1 9/2021 Jung
2021/0295494 A1 9/2021 Forutanpour et al.
2021/0327203 A1 10/2021 Shah
2021/0343030 A1 11/2021 Sagnoas
2021/0357545 A1 11/2021 Sugawara et al.
2022/0027879 A1 1/2022 Bowles et al.
2022/0050897 A1 2/2022 Gaddam et al.
2022/0051212 A1 2/2022 Forutanpour et al.
2022/0051300 A1 2/2022 Forutanpour et al.
2022/0051301 A1 2/2022 Forutanpour et al.
2022/0051507 A1 2/2022 Forutanpour et al.
2022/0051514 A1 2/2022 Schmidt
2022/0067798 A1 3/2022 Forutanpour et al.
2022/0068076 A1 3/2022 Forutanpour et al.
2022/0084296 A1 3/2022 Sadalgi
2022/0114854 A1 4/2022 Forutanpour et al.
2022/0164833 A1 5/2022 Dion et al.
2022/0172178 A1 6/2022 Forutanpour et al.
2022/0187802 A1 6/2022 Wittenberg et al.
2022/0198407 A1 6/2022 Beane et al.
2022/0254216 A1 8/2022 Schwarzli
2022/0262189 A1 8/2022 Dion et al.
2022/0277281 A1 9/2022 Dion et al.
2022/0284406 A1 9/2022 Hunt et al.
2022/0292464 A1 9/2022 Silva et al.
2022/0318774 A1 10/2022 Bowles
2023/0007937 A1 1/2023 Forutanpour et al.
2023/0051060 A1 2/2023 Nitu
2023/0077844 A1 3/2023 Bowles et al.
2023/0100849 A1 3/2023 Bowles et al.
2023/0101967 A1 3/2023 Holmes
2023/0196865 A1 6/2023 Forutanpour et al.
2023/0238751 A1 7/2023 Forutanpour et al.
2023/0259910 A1 8/2023 Forutanpour et al.
2023/0264871 A1 8/2023 Williams et al.
2023/0274346 A1 8/2023 Bowles et al.
2023/0297973 A1 9/2023 Bowles et al.
2023/0297974 A1 9/2023 Bowles et al.
2023/0306384 A1 9/2023 Bowles et al.
2023/0371729 A1 11/2023 Williams et al.
2023/0394904 A1 12/2023 Forutanpour et al.
2024/0005289 A1 1/2024 Silva et al.
2024/0087276 A1 3/2024 Silva et al.
2024/0144461 A1 5/2024 Forutanpour et al.
2024/0185317 A1 6/2024 Forutanpour et al.
2024/0249251 A1 7/2024 Bowles
2024/0249321 A1 7/2024 Forutanpour et al.
2024/0265364 A1 8/2024 Forutanpour et al.
2024/0265470 A1 8/2024 Bowles et al.
2024/0289753 A1 8/2024 Bowles
2024/0312284 A1 9/2024 Dion
2024/0321033 A1 9/2024 Forutanpour et al.
2024/0322599 A1 9/2024 Bober

(56) References Cited

U.S. PATENT DOCUMENTS

| | | | |
|---|---|---|---|
| 2024/0333032 | A1 | 10/2024 | Bober |
| 2024/0346463 | A1 | 10/2024 | Hunt et al. |

FOREIGN PATENT DOCUMENTS

| | | | | |
|---|---|---|---|---|
| CA | 3235982 | | | 9/2011 |
| CA | 2818533 | A1 | | 5/2012 |
| CA | 2866147 | | | 9/2013 |
| CA | 3069888 | | | 1/2019 |
| CA | 3069890 | | | 1/2019 |
| CN | 1365479 | | | 8/2002 |
| CN | 1574437 | | | 2/2005 |
| CN | 2708415 | | | 7/2005 |
| CN | 1864088 | | | 11/2006 |
| CN | 1957320 | | | 5/2007 |
| CN | 2912132 | | | 6/2007 |
| CN | 200965706 | | | 10/2007 |
| CN | 101176124 | | | 5/2008 |
| CN | 101379488 | A | | 3/2009 |
| CN | 201956656 | U | | 8/2011 |
| CN | 102315630 | A | | 1/2012 |
| CN | 102467728 | A | | 5/2012 |
| CN | 202351953 | | | 7/2012 |
| CN | 202353475 | U | | 7/2012 |
| CN | 202394296 | | | 8/2012 |
| CN | 102654927 | | | 9/2012 |
| CN | 102682597 | A | | 9/2012 |
| CN | 202564711 | U | | 11/2012 |
| CN | 202585951 | U | | 12/2012 |
| CN | 202702438 | U | | 1/2013 |
| CN | 202711369 | U | | 1/2013 |
| CN | 102930642 | | | 2/2013 |
| CN | 102976004 | | | 3/2013 |
| CN | 103198562 | | | 7/2013 |
| CN | 103226870 | | | 7/2013 |
| CN | 203242065 | | | 10/2013 |
| CN | 103440607 | | | 12/2013 |
| CN | 103514641 | | | 1/2014 |
| CN | 103544772 | | | 1/2014 |
| CN | 203408902 | | | 1/2014 |
| CN | 103662541 | | | 3/2014 |
| CN | 103679147 | A | | 3/2014 |
| CN | 203520502 | | | 4/2014 |
| CN | 103824387 | A | | 5/2014 |
| CN | 203588366 | U | | 5/2014 |
| CN | 103843040 | | | 6/2014 |
| CN | 103954626 | | | 7/2014 |
| CN | 302944037 | S | | 9/2014 |
| CN | 302944252 | S | | 9/2014 |
| CN | 302944253 | S | | 9/2014 |
| CN | 303042750 | S | | 12/2014 |
| CN | 105488702 | A | | 4/2016 |
| CN | 205129815 | U | | 4/2016 |
| CN | 205132514 | U | | 4/2016 |
| CN | 205140067 | U | | 4/2016 |
| CN | 106022379 | A | | 10/2016 |
| CN | 303896361 | S | | 10/2016 |
| CN | 106203643 | A | | 12/2016 |
| CN | 106293734 | A | | 1/2017 |
| CN | 106372638 | A | | 2/2017 |
| CN | 304051346 | S | | 2/2017 |
| CN | 304139831 | S | | 5/2017 |
| CN | 106911159 | A | | 6/2017 |
| CN | 304169301 | S | | 6/2017 |
| CN | 206440635 | U | | 8/2017 |
| CN | 107220640 | A | | 9/2017 |
| CN | 206466691 | U | | 9/2017 |
| CN | 107514978 | A | | 12/2017 |
| CN | 206861374 | U | | 1/2018 |
| CN | 207037788 | U | | 2/2018 |
| CN | 105444678 | B | | 3/2018 |
| CN | 304702339 | S | | 6/2018 |
| CN | 304702340 | S | | 6/2018 |
| CN | 304747709 | S | | 7/2018 |
| CN | 304795309 | S | | 8/2018 |
| CN | 108596658 | A | | 9/2018 |
| CN | 207854959 | U | * | 9/2018 |
| CN | 108647588 | A | | 10/2018 |
| CN | 207993120 | U | | 10/2018 |
| CN | 207993121 | U | | 10/2018 |
| CN | 207995226 | U | | 10/2018 |
| CN | 304842785 | S | | 10/2018 |
| CN | 108764236 | A | | 11/2018 |
| CN | 208086545 | U | | 11/2018 |
| CN | 208172834 | U | | 11/2018 |
| CN | 208176564 | U | * | 12/2018 |
| CN | 304958348 | S | | 12/2018 |
| CN | 305014434 | S | | 1/2019 |
| CN | 305014435 | S | | 1/2019 |
| CN | 208790107 | U | * | 4/2019 |
| CN | 109831575 | A | | 5/2019 |
| CN | 208819255 | U | | 5/2019 |
| CN | 208819289 | U | | 5/2019 |
| CN | 208819290 | U | | 5/2019 |
| CN | 208969761 | U | | 6/2019 |
| CN | 305275610 | S | | 7/2019 |
| CN | 110333876 | A | | 10/2019 |
| CN | 110347341 | A | | 10/2019 |
| CN | 110595361 | A | | 12/2019 |
| CN | 110653162 | A | | 1/2020 |
| CN | 110675399 | A | | 1/2020 |
| CN | 110751002 | A | | 2/2020 |
| CN | 110788015 | A | | 2/2020 |
| CN | 110796646 | A | | 2/2020 |
| CN | 110796647 | A | | 2/2020 |
| CN | 110796669 | A | | 2/2020 |
| CN | 110827244 | A | | 2/2020 |
| CN | 110827245 | A | | 2/2020 |
| CN | 110827246 | A | | 2/2020 |
| CN | 110827247 | A | | 2/2020 |
| CN | 110827248 | A | | 2/2020 |
| CN | 110827249 | A | | 2/2020 |
| CN | 110880028 | A | | 3/2020 |
| CN | 110928730 | A | | 3/2020 |
| CN | 305638504 | S | | 3/2020 |
| CN | 110976302 | A | | 4/2020 |
| CN | 111009073 | A | | 4/2020 |
| CN | 111080184 | A | | 4/2020 |
| CN | 210348162 | U | | 4/2020 |
| CN | 111175318 | A | | 5/2020 |
| CN | 111210473 | A | | 5/2020 |
| CN | 305767220 | S | | 5/2020 |
| CN | 111238430 | A | | 6/2020 |
| CN | 111262987 | A | | 6/2020 |
| CN | 111272067 | A | | 6/2020 |
| CN | 111272388 | A | | 6/2020 |
| CN | 111272393 | A | | 6/2020 |
| CN | 111273704 | A | | 6/2020 |
| CN | 111277466 | A | | 6/2020 |
| CN | 111277659 | A | | 6/2020 |
| CN | 111277695 | A | | 6/2020 |
| CN | 111277696 | A | | 6/2020 |
| CN | 111290660 | A | | 6/2020 |
| CN | 111290949 | A | | 6/2020 |
| CN | 111291661 | A | | 6/2020 |
| CN | 111292302 | A | | 6/2020 |
| CN | 111294454 | A | | 6/2020 |
| CN | 111294459 | A | | 6/2020 |
| CN | 111307429 | A | | 6/2020 |
| CN | 111311556 | A | | 6/2020 |
| CN | 111311687 | A | | 6/2020 |
| CN | 111311749 | A | | 6/2020 |
| CN | 111314445 | A | | 6/2020 |
| CN | 111314535 | A | | 6/2020 |
| CN | 111325715 | A | | 6/2020 |
| CN | 111325716 | A | | 6/2020 |
| CN | 111325717 | A | | 6/2020 |
| CN | 111325901 | A | | 6/2020 |
| CN | 210666955 | U | | 6/2020 |
| CN | 305818424 | S | | 6/2020 |
| CN | 111439560 | A | | 7/2020 |
| CN | 211149556 | U | | 7/2020 |
| CN | 305955503 | S | | 7/2020 |
| CN | 211291337 | U | | 8/2020 |

(56) References Cited

FOREIGN PATENT DOCUMENTS

| | | | |
|---|---|---|---|
| CN | 211296771 | U | 8/2020 |
| CN | 211402187 | U | 9/2020 |
| CN | 211515235 | U | 9/2020 |
| CN | 211538600 | U | 9/2020 |
| CN | 111830293 | A | 10/2020 |
| CN | 111830354 | A | 10/2020 |
| CN | 111860890 | A | 10/2020 |
| CN | 111860891 | A | 10/2020 |
| CN | 211630227 | U | 10/2020 |
| CN | 306113050 | S | 10/2020 |
| CN | 306113051 | S | 10/2020 |
| CN | 306113052 | S | 10/2020 |
| CN | 212023984 | U | 11/2020 |
| CN | 212031269 | U | 11/2020 |
| CN | 306164092 | S | 11/2020 |
| CN | 306164093 | S | 11/2020 |
| CN | 306164094 | S | 11/2020 |
| CN | 306164095 | S | 11/2020 |
| CN | 112098443 | A | 12/2020 |
| CN | 212084259 | U | 12/2020 |
| CN | 212268703 | U | 1/2021 |
| CN | 212314534 | U | 1/2021 |
| CN | 212322247 | U | 1/2021 |
| CN | 212364464 | U | 1/2021 |
| CN | 306272538 | S | 1/2021 |
| CN | 306283626 | S | 1/2021 |
| CN | 112348761 | A | 2/2021 |
| CN | 112348808 | A | 2/2021 |
| CN | 112393880 | A | 2/2021 |
| CN | 112395118 | A | 2/2021 |
| CN | 212460662 | U | 2/2021 |
| CN | 212586854 | U | 2/2021 |
| CN | 212597202 | U | 2/2021 |
| CN | 306323627 | S | 2/2021 |
| CN | 112433902 | A | 3/2021 |
| CN | 112452935 | A | 3/2021 |
| CN | 112455988 | A | 3/2021 |
| CN | 112456100 | A | 3/2021 |
| CN | 112565505 | A | 3/2021 |
| CN | 212677296 | U | 3/2021 |
| CN | 212681731 | U | 3/2021 |
| CN | 111314537 | B | 4/2021 |
| CN | 112613622 | A | 4/2021 |
| CN | 112613914 | A | 4/2021 |
| CN | 112614117 | A | 4/2021 |
| CN | 112614269 | A | 4/2021 |
| CN | 112633194 | A | 4/2021 |
| CN | 112634245 | A | 4/2021 |
| CN | 112634288 | A | 4/2021 |
| CN | 112634301 | A | 4/2021 |
| CN | 112672145 | A | 4/2021 |
| CN | 112735081 | A | 4/2021 |
| CN | 213001252 | U | 4/2021 |
| CN | 213004872 | U | 4/2021 |
| CN | 112777290 | A | 5/2021 |
| CN | 112783702 | A | 5/2021 |
| CN | 112816490 | A | 5/2021 |
| CN | 112822740 | A | 5/2021 |
| CN | 112828842 | A | 5/2021 |
| CN | 112837076 | A | 5/2021 |
| CN | 112837102 | A | 5/2021 |
| CN | 213149008 | U | 5/2021 |
| CN | 213301455 | U | 5/2021 |
| CN | 213301535 | U | 5/2021 |
| CN | 213305483 | U | 5/2021 |
| CN | 112907182 | A | 6/2021 |
| CN | 112991614 | A | 6/2021 |
| CN | 113032198 | A | 6/2021 |
| CN | 113034481 | A | 6/2021 |
| CN | 113034493 | A | 6/2021 |
| CN | 113034529 | A | 6/2021 |
| CN | 113034530 | A | 6/2021 |
| CN | 113034531 | A | 6/2021 |
| CN | 113038012 | A | 6/2021 |
| CN | 113052798 | A | 6/2021 |
| CN | 113110806 | A | 7/2021 |
| CN | 113114794 | A | 7/2021 |
| CN | 113132523 | A | 7/2021 |
| CN | 113160494 | A | 7/2021 |
| CN | 113190215 | A | 7/2021 |
| CN | 113191789 | A | 7/2021 |
| CN | 213765490 | U | 7/2021 |
| CN | 213796595 | U | 7/2021 |
| CN | 213807304 | U | 7/2021 |
| CN | 306700330 | S | 7/2021 |
| CN | 113220647 | A | 8/2021 |
| CN | 113220648 | A | 8/2021 |
| CN | 113237473 | A | 8/2021 |
| CN | 113238680 | A | 8/2021 |
| CN | 113238905 | A | 8/2021 |
| CN | 113252678 | A | 8/2021 |
| CN | 113254292 | A | 8/2021 |
| CN | 113254293 | A | 8/2021 |
| CN | 113254294 | A | 8/2021 |
| CN | 113268162 | A | 8/2021 |
| CN | 113298078 | A | 8/2021 |
| CN | 113301202 | A | 8/2021 |
| CN | 113329222 | A | 8/2021 |
| CN | 213917879 | U | 8/2021 |
| CN | 213933659 | U | 8/2021 |
| CN | 306744667 | S | 8/2021 |
| CN | 306744668 | S | 8/2021 |
| CN | 306786433 | S | 8/2021 |
| CN | 306786434 | S | 8/2021 |
| CN | 113422860 | A | 9/2021 |
| CN | 214160736 | U | 9/2021 |
| CN | 214162705 | U | 9/2021 |
| CN | 214427985 | U | 10/2021 |
| CN | 113591066 | A | 11/2021 |
| CN | 113591963 | A | 11/2021 |
| CN | 215246545 | U | 12/2021 |
| CN | 215247165 | U | 12/2021 |
| CN | 215247245 | U | 12/2021 |
| CN | 215247426 | U | 12/2021 |
| CN | 215262785 | U | 12/2021 |
| CN | 215262787 | U | 12/2021 |
| CN | 215266884 | U | 12/2021 |
| CN | 215266954 | U | 12/2021 |
| CN | 215325354 | U | 12/2021 |
| CN | 215555043 | U | 1/2022 |
| CN | 215556081 | U | 1/2022 |
| CN | 215575427 | U | 1/2022 |
| CN | 215576764 | U | 1/2022 |
| CN | 215576765 | U | 1/2022 |
| CN | 215703219 | U | 2/2022 |
| CN | 215708961 | U | 2/2022 |
| CN | 216612155 | U | 5/2022 |
| CN | 112672145 | B | 2/2023 |
| DE | 10031532 | | 10/2001 |
| EP | 0116970 | | 12/1991 |
| EP | 0654003 | | 5/1995 |
| EP | 1168253 | | 1/2002 |
| EP | 1270905 | | 1/2003 |
| EP | 1699020 | | 9/2006 |
| EP | 1703436 | | 9/2006 |
| EP | 2701450 | | 2/2014 |
| EP | 3206194 | A1 | 8/2017 |
| EP | 2428072 | | 1/2018 |
| ES | 2304327 | | 10/2008 |
| FR | 3047833 | B1 | 3/2018 |
| GB | 2167553 | | 5/1986 |
| GB | 202209941 | | 7/2022 |
| GR | 20210100761 | | 7/2022 |
| HK | 30014296 | A | 8/2020 |
| JP | 7112801 | | 5/1995 |
| JP | H7334583 | | 12/1995 |
| JP | H11242005 | | 9/1999 |
| JP | H11334851 | | 12/1999 |
| JP | 2000121564 | | 4/2000 |
| JP | 2000171409 | A | 6/2000 |
| JP | 2000180371 | | 6/2000 |
| JP | 3123095 | | 1/2001 |
| JP | 2001312766 | | 11/2001 |
| JP | 2002019147 | | 1/2002 |

(56) References Cited

FOREIGN PATENT DOCUMENTS

| | | | | | |
|---|---|---|---|---|---|
| JP | 2002183286 | | | 6/2002 | |
| JP | 2002259528 | | | 9/2002 | |
| JP | 2002302252 | | | 10/2002 | |
| JP | 2002324264 | | | 11/2002 | |
| JP | 2002358354 | | | 12/2002 | |
| JP | 2003016179 | | | 1/2003 | |
| JP | 2003139516 | | | 5/2003 | |
| JP | 2003230229 | | | 8/2003 | |
| JP | 2003242243 | | | 8/2003 | |
| JP | 2003264007 | | | 9/2003 | |
| JP | 2003267509 | | | 9/2003 | |
| JP | 2004021569 | | | 1/2004 | |
| JP | 2004191496 | | | 7/2004 | |
| JP | 2004226129 | | | 8/2004 | |
| JP | 2004226328 | | | 8/2004 | |
| JP | 2004239850 | | | 8/2004 | |
| JP | 2004288143 | | | 10/2004 | |
| JP | 2004303102 | | | 10/2004 | |
| JP | 2004341681 | | | 12/2004 | |
| JP | 2005063203 | | | 3/2005 | |
| JP | 2005122059 | | | 5/2005 | |
| JP | 2005308476 | | | 11/2005 | |
| JP | 2006127308 | | | 5/2006 | |
| JP | 2006195814 | | | 7/2006 | |
| JP | 2006203451 | | | 8/2006 | |
| JP | 2006227764 | | | 8/2006 | |
| JP | 2006260246 | | | 9/2006 | |
| JP | 2007141266 | | | 6/2007 | |
| JP | 2007155455 | | | 6/2007 | |
| JP | 2007179516 | | | 7/2007 | |
| JP | 2007265340 | | | 10/2007 | |
| JP | 2008045959 | | | 2/2008 | |
| JP | 2008059403 | A | | 3/2008 | |
| JP | 2008522299 | | | 6/2008 | |
| JP | 2008293391 | | | 12/2008 | |
| JP | 2007086725 | | | 4/2009 | |
| JP | 2009175035 | | | 8/2009 | |
| JP | 2009245058 | | | 10/2009 | |
| JP | 2009250971 | | | 10/2009 | |
| JP | 2009290852 | | | 12/2009 | |
| JP | 2010177720 | | | 8/2010 | |
| JP | 2010276896 | | | 12/2010 | |
| JP | 2011518387 | | | 6/2011 | |
| JP | 2012032370 | | | 2/2012 | |
| JP | 2012504832 | | | 2/2012 | |
| JP | 2012058932 | | | 3/2012 | |
| JP | 2013033361 | | | 2/2013 | |
| JP | 2013037441 | | | 2/2013 | |
| JP | 2014513829 | A | | 6/2014 | |
| JP | 2015505999 | A | | 2/2015 | |
| JP | 2016504900 | | | 2/2016 | |
| JP | 6050922 | B2 | | 12/2016 | |
| JP | 2017040957 | A | | 2/2017 | |
| JP | 2017093938 | | | 6/2017 | |
| JP | 2017142781 | A | | 8/2017 | |
| JP | 2017173902 | A | | 9/2017 | |
| JP | 2017201559 | A | * | 11/2017 | ........... G06K 9/2027 |
| JP | 6266065 | B1 | | 3/2018 | |
| JP | 2018520453 | A | | 7/2018 | |
| JP | 2019012474 | | | 1/2019 | |
| JP | 2019513262 | A | | 5/2019 | |
| JP | 3223233 | U | | 9/2019 | |
| JP | 2020526847 | A | | 8/2020 | |
| JP | 2022539909 | A | | 9/2022 | |
| JP | 2022539910 | A | | 9/2022 | |
| JP | 2022539912 | A | | 9/2022 | |
| JP | 2022545336 | A | | 9/2022 | |
| KR | 20000064168 | | | 11/2000 | |
| KR | 20010074614 | | | 8/2001 | |
| KR | 20010097567 | | | 11/2001 | |
| KR | 100581234 | | | 5/2006 | |
| KR | 100766860 | | | 10/2007 | |
| KR | 20130085255 | | | 7/2013 | |
| KR | 101326680 | | | 11/2013 | |
| KR | 101329949 | | | 11/2013 | |
| KR | 20140037543 | | | 3/2014 | |
| KR | 101599251 | | | 3/2016 | |
| KR | 20180088062 | | | 8/2018 | |
| KR | 20180088063 | | | 8/2018 | |
| KR | 1020180086617 | | | 8/2018 | |
| KR | 1020180088063 | A | | 8/2018 | |
| KR | 20180117278 | | | 10/2018 | |
| KR | 20190026131 | | | 3/2019 | |
| KR | 20190107593 | | | 9/2019 | |
| KR | 20190107595 | | | 9/2019 | |
| KR | 20190107596 | | | 9/2019 | |
| KR | 1020190107594 | | | 9/2019 | |
| KR | 1020200115308 | | | 10/2020 | |
| KR | 20210020717 | | | 2/2021 | |
| KR | 1020210059148 | | | 5/2021 | |
| KR | 1020210107515 | | | 9/2021 | |
| WO | WO8503790 | | | 8/1985 | |
| WO | WO2001015096 | | | 3/2001 | |
| WO | WO2002005176 | | | 1/2002 | |
| WO | WO0221090 | | | 3/2002 | |
| WO | WO2002025613 | | | 3/2002 | |
| WO | WO2002039357 | | | 5/2002 | |
| WO | WO2003012717 | | | 2/2003 | |
| WO | WO2003014994 | | | 2/2003 | |
| WO | WO2004021114 | | | 3/2004 | |
| WO | WO2004114490 | | | 12/2004 | |
| WO | WO2005008566 | | | 1/2005 | |
| WO | 2005054877 | | | 6/2005 | |
| WO | WO2005101346 | | | 10/2005 | |
| WO | WO2006021825 | | | 3/2006 | |
| WO | WO2006058601 | | | 6/2006 | |
| WO | WO2006080851 | | | 8/2006 | |
| WO | WO2007066166 | | | 6/2007 | |
| WO | WO2009089607 | | | 7/2009 | |
| WO | WO2009128173 | | | 10/2009 | |
| WO | WO2009128176 | | | 10/2009 | |
| WO | WO2009129526 | | | 10/2009 | |
| WO | WO2010040116 | | | 4/2010 | |
| WO | WO2010128267 | | | 11/2010 | |
| WO | WO2010128315 | | | 11/2010 | |
| WO | WO2011131016 | | | 10/2011 | |
| WO | WO2012073126 | | | 6/2012 | |
| WO | WO2013002748 | | | 1/2013 | |
| WO | WO2013074819 | | | 5/2013 | |
| WO | 2014033350 | | | 3/2014 | |
| WO | WO2014075055 | | | 5/2014 | |
| WO | WO2014141180 | | | 9/2014 | |
| WO | WO2015022409 | | | 2/2015 | |
| WO | WO2015093676 | | | 6/2015 | |
| WO | WO2015108864 | | | 7/2015 | |
| WO | 2015146026 | | | 10/2015 | |
| WO | WO2016181224 | | | 11/2016 | |
| WO | WO2015196175 | | | 12/2016 | |
| WO | WO-2016196175 | A1 | * | 12/2016 | ............. G06Q 10/30 |
| WO | WO2017034441 | | | 3/2017 | |
| WO | WO-2017052684 | A1 | * | 3/2017 | ............. G06Q 20/18 |
| WO | WO2017081527 | | | 5/2017 | |
| WO | WO2017156046 | | | 9/2017 | |
| WO | 2018003026 | A1 | | 1/2018 | |
| WO | WO2018124669 | | | 7/2018 | |
| WO | WO2018133068 | | | 7/2018 | |
| WO | WO2018146374 | | | 8/2018 | |
| WO | WO2019012305 | | | 1/2019 | |
| WO | WO2019012505 | | | 1/2019 | |
| WO | WO2019012506 | | | 1/2019 | |
| WO | WO2019212513 | | | 11/2019 | |
| WO | WO2019212515 | | | 11/2019 | |
| WO | 2019008943 | A1 | | 4/2020 | |
| WO | WO2020082991 | | | 4/2020 | |
| WO | WO2020204503 | | | 10/2020 | |
| WO | WO-2020226637 | A1 | * | 11/2020 | ........... G06Q 10/087 |
| WO | WO2021019286 | | | 2/2021 | |
| WO | WO2021082918 | A1 | | 5/2021 | |
| WO | WO2021082919 | A1 | | 5/2021 | |
| WO | WO2021082920 | A1 | | 5/2021 | |
| WO | WO2021082921 | A1 | | 5/2021 | |
| WO | WO2021082922 | A1 | | 5/2021 | |
| WO | WO2021082923 | | | 5/2021 | |
| WO | WO2021142009 | | | 7/2021 | |

(56) References Cited

FOREIGN PATENT DOCUMENTS

| | | |
|---|---|---|
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |
| WO | 2022034298 | 2/2022 |
| WO | WO2022090999 | 5/2022 |
| WO | WO2022091000 | 5/2022 |
| WO | 2023073248 | 5/2023 |

OTHER PUBLICATIONS

Renee Kuriyan, "Review of Research on Rural PC Kiosks," 2007, Microsoft research, pp. 1-22. (Year: 2007).*
Radovan Novotny, "Smart City Concept, Applications and Services," 2014, Journal of Telecommunications System & Management, pp. 1-8. (Year: 2014).*
Hakan Tuzun, "Usability testing of a 3D touch screen kiosk system for way-finding," 2016, Computers in Human Behavior 61, pp. 73-79. (Year: 2016).*
2006 Florida Statutes Title XXXIII, Chapter 538, Sections 538.03 and 538.04, 7 pages.
3GPP Organizational Partners, "3rd Generation Partnership Project; Technical Specification Group Terminals; AT command set for GSM Mobile Equipment (ME)," Global System for Mobile Communications, 1998, 124 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing User's Guide 2007, 8 pages.
Bhule et al., "Environmental and economic trade-offs in consumer electronic products recycling: a case study of cell phones and computers," IEEE International Symposium on Electronics and the Environment, Conference Record, 2004.
Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Business Wire, "The World's First Office Photography Machine" at CES 2008 Launched by Ortery Technologies, Jan. 7, 2008, 3 pages.
Cnet, "Tackling LCD "burn ins", and dead/stick Pixels", published Sep. 2, 2009, retrieved from http://www.cnet.com/news/tackling-lcd-burn-ins-and-deadstuck-pixels/.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Draft IDS 10/26ress Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4): 493-504.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=lcd on Apr. 28, 2016, 1 page.
International Numbering Plan, www.numberingplans.com, 2 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate-Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.

(56) References Cited

OTHER PUBLICATIONS

Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles - and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?gid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
International Search Report and Written Opinion mailed Dec. 20, 2021 in International Application No. PCT/US2021/071270, 15 pages.
Grose, Thomas; "New Life for Old Phones," ASE Prism 22.3 (2012): 18.
Hassan, et al.; "A Novel Cascaded Deep Neural Network for Analyzing Smart Phone Data for Indoor Localization", Dec. 2019, vol. 101, pp. 760-769, Future Generation Computer Systems.
Hazelwood, et al.; "Life Extension of Electronic Products: A Case Study of Smartphones", Sep. 20, 2021, IEEE Access, vol. 9, pp. 144726-144739, DOI: 10.1109/ACCESS.2021.3121733.
Park, et al., "Ambiguous Surface Defect Image Classification of AMOLED Displays in Smartphones", Jan. 26, 2016, IEEE Transactions Industrial Informatics, vol. 12, Issue 2, pp. 597-607, DOI: 10.1109/TII.2016.2522191.
Watson; "Review: SanDisk iXpand Wireless Charger" Sep. 15, 2019, 4 pages retrieved at https://www.whatmobile.net/Reviews/article/review-sandisk-lxpand-wireless-charger.
Cybercom Group, "Leading Telecom Organisations Address Device Management Issues," Press Release, 2007, 1 page.
Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
Tech Spurt, "Sandisk iXpand Review | Wireless Charger & Auto Photo Backup!" https://www.youtube.com/watch?v=zemKQ6xIJLww, Aug. 21, 2019, 1 page.
Belak, "Terotechnology," 2004 IEEE, pp. 201-204.
Zhou, et al. "Application of environmental accounting information to the decision-making for the environmentally conscious design and end-of-life management of cellular phones," 2006, IEEE, pp. 173-178.
Nithi et al., "Smart Power Management for Mobile Handsets".
Shi, "The LOB Recreation Model: Predicting the Limit Order Book from TAQ History Using an Ordinary Differential Equation Recurrent Neural Network" 548-556. The Thirty-Fifth AAAI Conference on Artificial Intelligence. 2021; < DOI: 10.48550/arXiv.2103.01670> abstract; p. 551, 2nd column 1st paragraph; p. 552, 1st column 1st paragraph; fig. 3.

* cited by examiner

KIOSK FOR EVALUATING AND PURCHASING USED ELECTRONIC DEVICES

CROSS-REFERENCE TO RELATED APPLICATIONS

This application claims the benefit of U.S. Provisional Patent Application No. 63/088,377, filed Oct. 6, 2020, and of U.S. Provisional Patent Application No. 63/070,207, filed Aug. 25, 2020, each of which is incorporated by reference in its entirety herein.

TECHNICAL FIELD

The present disclosure is generally related to consumer operated kiosks for evaluating and purchasing mobile phones and other mobile electronic devices from users.

BACKGROUND

There are more mobile phones in use now than there are people on the planet. The rapid growth of mobile phones is due in part to the rapid pace at which they evolve. Because of the rapid pace of development, a relatively high percentage of mobile phones are replaced every year as consumers continually upgrade to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

DETAILED DESCRIPTION

Figure 1B:
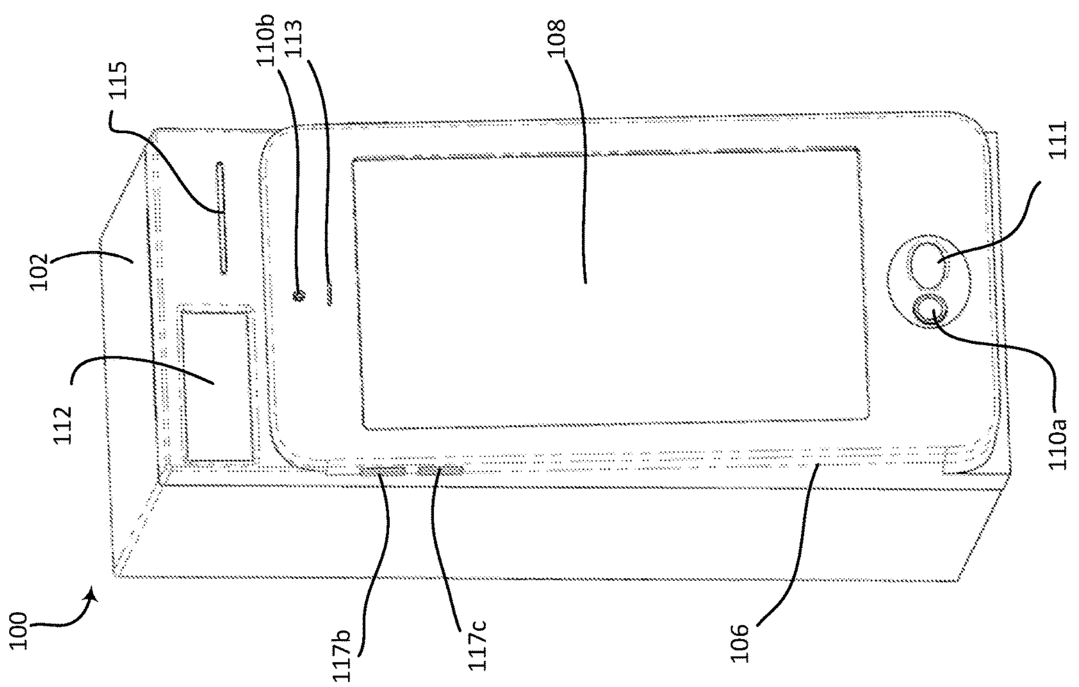
FIG. 1B is a top, front, left-side isometric view of the consumer operated kiosk of FIG. 1A.

The following disclosure describes various embodiments of systems and methods that enable users to sell, deposit, and/or recycle mobile phones and other electronic devices. In some embodiments, the systems described herein include a kiosk having a housing and a door assembly mounted to the housing. The housing can include an inspection area configured to accept a mobile phone or other electronic device to be sold and/or recycled. In some embodiments, the inspection area can include a transparent plate onto which the mobile phone is set with its screen facedown. A camera positioned within the housing is directed through the transparent plate and toward the inspection area, and is configured to obtain an image of the screen of the mobile device and identifying information displayed thereon. By way of example, the identifying information can include make, model, serial number, International Mobile Equipment Identity (IMEI) number, and/or other information used to uniquely identify the mobile phone. In some embodiments, the kiosk and associated systems can be configured to verify whether the mobile phone is the same mobile phone previously evaluated at another kiosk, evaluated using a mobile application, or otherwise evaluated, and if such identity is confirmed, provide the user with an offer to purchase the mobile phone. If the user agrees to sell or recycle their phone, the transparent plate tilts to direct the phone toward a storage unit (e.g., a bin) in the kiosk. In some embodiments, the kiosk can further include a movable deflecting plate or other structure configured to selectively direct/redirect the phone from the transparent plate to one of a plurality of storage units. In some embodiments, the kiosk in its entirety can have a volume less than one cubic foot and, in some embodiments, less than 0.75 cubic feet. Accordingly, one benefit of some embodiments of the kiosks disclosed herein is that the kiosks take up very little space and are, therefore, usable in many environments which may lack the space required to accommodate larger kiosks. In some applications, the kiosks disclosed herein can be mounted to other kiosks, walls, or other structures, which can facilitate further flexibility for installing the kiosks.

The kiosks described herein can be used to facilitate the final steps of a recycling/sales transaction wherein a user sells their used electronic device. The initial steps (e.g., device evaluation, determination of an offer price, etc.) may be performed, for example, by a mobile application on the user's device. In some instances, the user can obtain an offer for purchase (e.g., a guaranteed offer for purchase) of their electronic device from their home, then use one of the kiosks described herein to drop off the electronic device and/or receive payment. As described above, the kiosks can be relatively small, which can create a lower overhead burden for a retailer than a traditional recycling kiosk that may be much larger.

Certain details are set forth in the following description and in FIGS. 1A-8 to provide a thorough understanding of various embodiments of the present technology. In other instances, well-known structures, materials, operations and/or systems often associated with smartphones and other handheld mobile electronic devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 102 is first introduced and discussed with reference to FIG. 1A.

Figure 1A:
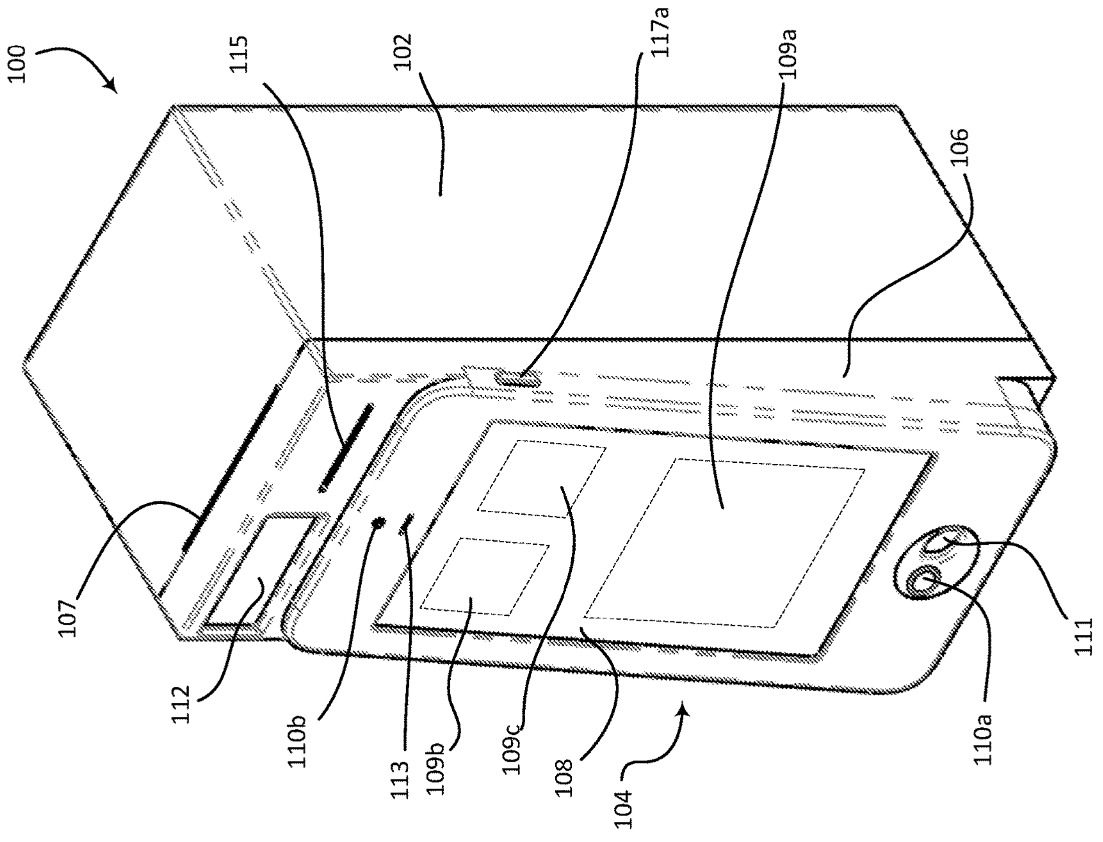
FIG. 1A is a top, front, right-side isometric view of a consumer operated kiosk for receiving/purchasing mobile electronic devices from users, configured in accordance with embodiments of the present technology.

FIG. 1A is a right-side isometric view of a consumer operated kiosk 100 for purchasing mobile phones and other electronic devices from users, configured in accordance with embodiments of the present technology. The kiosk 100 includes an enclosure or housing 102 having a door assembly 104. The door assembly 104 can include a door 106 that can be operably coupled to the housing 102 with one or more hinges 107 or other connection mechanisms. In the illustrated embodiment, the door assembly 104 is shaped and/or otherwise configured to resemble a mobile phone or other electronic device. In other embodiments, the door assembly 104 can have other configurations.

The door assembly 104 can include a display screen 108. The display screen 108 can include a liquid crystal display (LCD) or a light emitting diode (LED) display screen, a projected display (such as a heads-up display or a head-mounted device), and so on, for providing information, prompts, etc. to users. In some embodiments, the display screen 108 can include visual features 109*a-c* (e.g., images, icons, animations, and/or other graphical and/or textual features) configured to resemble a home screen of a mobile phone. For example, the visual features 109*a-c* could resemble application icons, widget icons, and/or other icons commonly found on the display of a mobile phone. Some or all of these visual features 109*a-c* can be used as advertisements, information sources, and/or prompts and other user interfaces configured facilitate transactions at the kiosk 100. For example, one or more of the visual features 109*a-c* can include information for purchasing used or new mobile phones or other electronic devices via the kiosk 100. Such information could include, for example, one or more website pages, links, scannable codes (e.g., QR codes, barcodes, etc.), or other information configured to help a user purchase a new electronic device. In some embodiments, one or more of the visual features 109*a-c* are graphical user interfaces (GUIs), including touch screens, for receiving user input and responses to displayed prompts to facilitate use of the kiosk 100 to sell a mobile phone.

FIG. 1B is left-side isometric view of the consumer operated kiosk 100. Referring to FIGS. 1A and 1B together, the kiosk 100 can include one or more user interfaces on one or both of the door assembly 104 and the housing 102 for providing instructions and other information to users, and/or for receiving user inputs and other information from users. For example, the kiosk 100 can include one or more cameras 110*a-b* positioned and configured to capture images of a user of the kiosk 100, the user's identification, and/or other objects external to the kiosk 100. In some embodiments, a first camera 110*a* is positioned near a bottom portion of the kiosk 100 and a second camera 110*b* is positioned near a top portion of the kiosk 100. One or both of the cameras 110*a-b* can have a wide-angle lens and/or a resolution of 1 megapixel (MP), 2 MP, 5 MP, 10 MP, or more. The kiosk 100 can also include a fingerprint scanner or reader 111 or other biometric interface configured to collect biometric data (e.g., a thumbprint) from the user. The first camera 110*a* can have a field of vision that includes the user and the fingerprint scanner 111 to confirm that the user is the person that touches the fingerprint scanner when prompted.

In some embodiments, the kiosk 100 further includes a speaker 113 configured to provide audible feedback, prompts, and/or instructions to a user of the kiosk 100. The kiosk 100 can include a card reader configured to read ID cards, credit cards, and/or other electronic cards provided by the user. The kiosk 100 can also include a label outlet 115. In some embodiments, label outlet 115 is configured to dispense receipts (from, e.g., an associated printer) in addition to or instead of labels. In some embodiments, the kiosk 100 is configured to display a barcode, QR code, and alphanumeric code, or other image the user can scan or otherwise record to serve as a receipt for the transaction at the kiosk 100. The kiosk 100 can include a payment (e.g., cash, voucher, gift certificate, etc.) dispenser configured to provide a user with remuneration for their mobile phone at the conclusion of a transaction with the kiosk 100. In some embodiments, the kiosk 100 is configured to provide the user with confirmation of an electronic funds transfer or other virtual payment. The kiosk can include additional features 117*a-c* that can resemble features of a mobile phone (e.g., buttons, plugs, or other features). These features 117*a-c* can be decorative or, in some embodiments, one or more of the features 117*a-c* are cameras, buttons, scanners, lights, or other devices and/or structures configured to allow a user and/or a technician to interact with the kiosk 100. In some embodiments, the kiosk 100 can include a keyboard or keypad for receiving user inputs. As noted above, one or more of the cameras 110*a-b*, fingerprint scanner 111, display screen 108, speaker 113, and features 117*a-c* can be sized, positioned, and/or otherwise configured to resemble features of a mobile phone. For example, the camera 110*a* and/or fingerprint reader 111 can be positioned and sized to resemble a home button of a mobile phone (e.g., the camera 110*a* and/or fingerprint reader 111 can be positioned near the center of the lower end portion of the door 106). The kiosk 100 can include an inspection area access door 112. The access door 112 is configured to prevent unauthorized access to an inspection area of the housing 102, as described below with reference to FIG. 1E. The access door 112 can be pivotally or otherwise movably mounted to the door assembly 104 or to the housing 102. The access door 112 can be formed from, e.g., vary types of plastic (e.g., polyethylene, polycarbonate, etc.), glass, etc. that can be transparent, opaque or solid. The housing 102, door 104, and/or other components can be manufactured from, for example, sheet metal, plastic panels, etc. and/or other suitable materials in a conventional manner. In embodiments wherein the access door 112 is transparent or translucent, the light admitted through the access door into the housing 102 can be sufficient to allow for visual crack detection using one or more cameras in the kiosk 100, without necessarily requiring additional internal lights.

Although not identified in FIGS. 1A-1B, the kiosk 100 can further include, e.g., a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), as well as other user input and/or output devices. Additionally, the kiosk 100 can also include a barcode reader (for reading, e.g., a barcode displayed on a mobile device), a QR code reader (for reading, e.g., a QR displayed on a mobile device), a package or bag dispenser (e.g., a shipping package dispenser), a digital signature pad, etc. For example, the kiosk 100 can include a barcode reader (e.g., a laser or optical reader) that is directed to an exterior of the kiosk to scan a barcode on a mobile phone. The kiosk 100 (e.g., a processor thereof) can be configured to open the access door 112 in response to scanning the barcode on the mobile phone, whereafter a camera or other optical device inside the kiosk 100 reads the barcode again when the mobile phone is inside the kiosk 100. In some embodiments, the kiosk 100 includes one or more motion or proximity sensors configured to detect when a person approaches the kiosk 100. The kiosk 100 can be configured to activate the display 108 and/or other components of the kiosk 100 upon detection of the approach of a potential user. The user interface devices described above are representative of such devices that can be included with some embodiments the kiosk 100. Depending on the particular use case or commercial application, other embodiments of the kiosks disclosed herein can include other devices, or one or more of the above devices may be omitted. Accordingly, embodiments of the kiosk 100 are not limited to the type or arrangement of user interface devices described above.

Figure 1D:
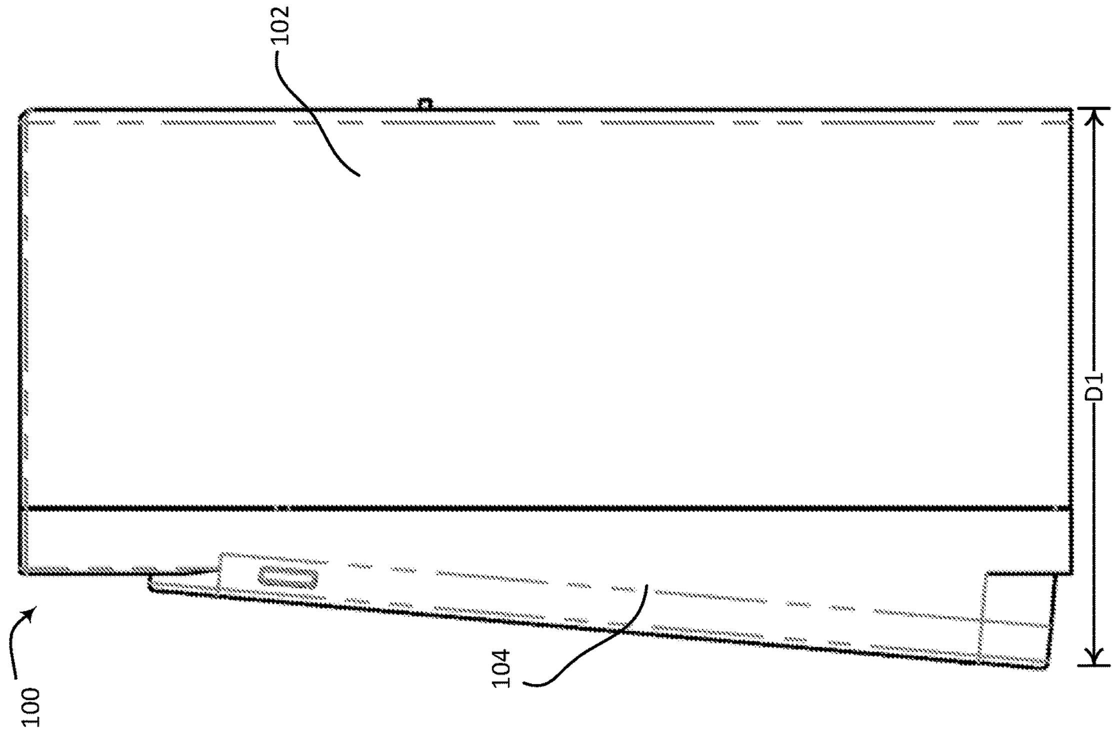
FIG. 1D is a right-side view of the consumer operated kiosk of FIG. 1A.
Figure 1C:
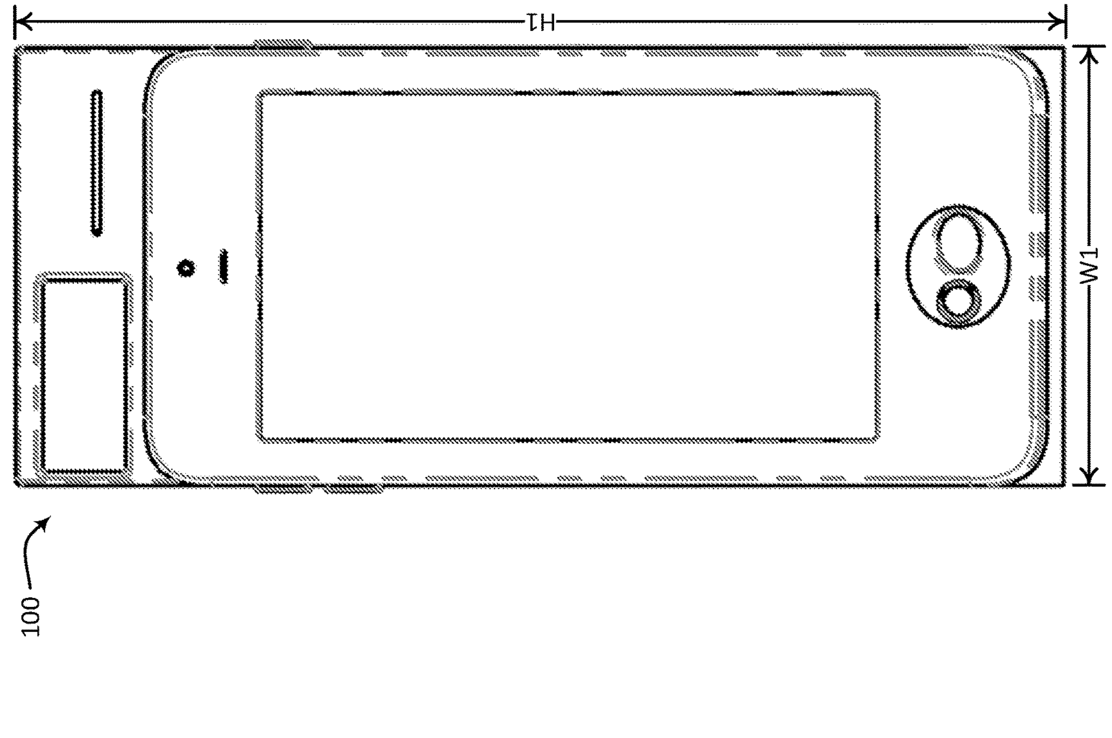
FIG. 1C is a front view of the consumer operated kiosk of FIG. 1A.

FIGS. 1C and 1D are front and right-side views, respectively, of the kiosk 100 configured in accordance with embodiments of the present technology. As described above, the overall size of the kiosk 100 can be less than about two cubic feet, less than about one cubic foot, less than about 0.9 cubic feet, less than about 0.75 cubic feet, and/or less than about 0.6 cubic feet. In some embodiments, the kiosk 100 has an overall size between about 0.6 cubic feet and about one cubic foot, and/or between about 0.7 cubic feet and about 0.8 cubic feet. By way of example only, in some embodiments, the kiosk 100 can have a width W1 of from about 5 inches to about 12 inches, or from about 8 inches to about 9 inches; a depth D1 of from about 4 inches to about 12 inches, or from 7 inches to about 9 inches; and an overall height H1 of from about 12 inches to about 24 inches, or from about 16 inches to about 21 inches. In some embodiments, the width W1 is about 8.5 inches, the depth D1 is about 8 inches, and/or the height H1 is about 19 inches. One advantage of the kiosk 100 having a relatively small overall size is at the kiosk 100 can be accessibly mounted onto other structures including, but not limited to, other kiosks, walls, countertops, and/or other structures. In some embodiment, the kiosk 100 may be positioned behind the counter of a retail setting and operated by a clerk or other retail associate. The foregoing dimensions are but some examples; in other embodiments, kiosks configured in accordance with the present disclosure can have other dimensions without departing from the present disclosure.

Figure 1E:
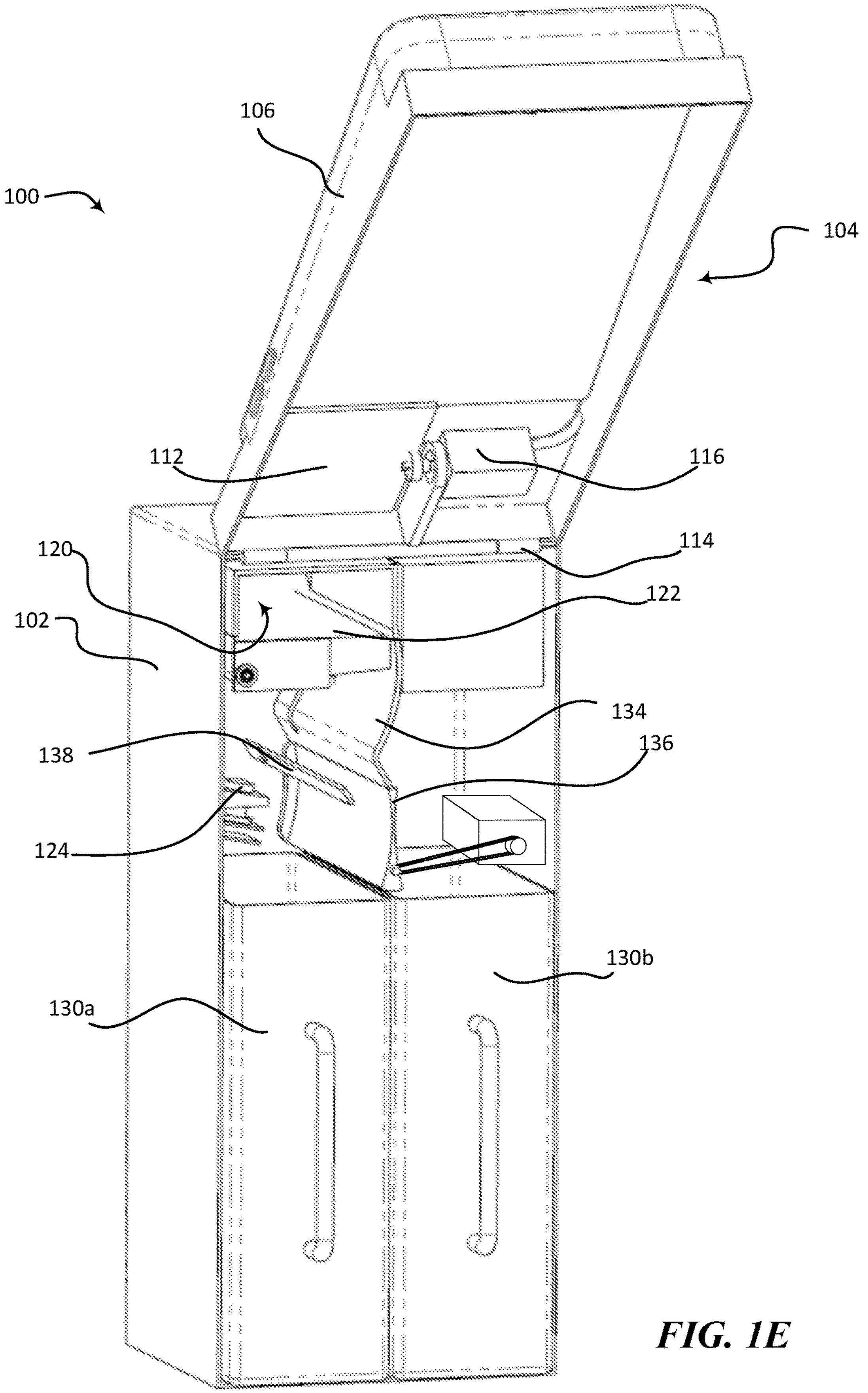
FIG. 1E is a top, front, left-side isometric view of the consumer operated kiosk of FIG. 1A with a kiosk door in an open position in accordance with embodiments of the present technology.

FIG. 1E is a left-side isometric view of the kiosk 100 with the door assembly 104 in an opened configuration. As illustrated, the door assembly 104 (e.g., the door 106) can be pivotally coupled to the housing 102 via one or more hinges 114. The hinges 114 can be positioned at or proximate an upper edge portion of the door assembly 104, such that the door assembly swings outwardly and upwardly when opening. In other embodiments, the hinges 114 can be positioned on a lateral side or bottom end portion of the door assembly 104.

The door assembly 104 can include an access motor 116 operably associated with the access door 112 and configured to move the access door 112 between opened and closed configurations. More specifically, the access motor 116 can be an electric motor having one or more gears, pulleys, linear actuators, and/or other mechanisms configured to operably slide and/or tilt the access door 112 between the opened and closed configurations. In the illustrated embodiment, the access motor 116 is mounted directly or indirectly to the door 106, e.g., adjacent to the access door 112. In other embodiments, the access motor 116 can be mounted directly or indirectly to the housing 102.

Referring still to FIG. 1E, the housing 102 can include an inspection area 120 configured to receive a mobile phone or other electronic device from a user when the access door 112 is in the open configuration. The inspection area 120 can include an inspection plate 122 and/or other structure configured to support the user's electronic device when the electronic device is positioned within the inspection area 120. The inspection plate 122 can be transparent and can be formed from glass, plexiglass, polymer, and/or some other suitable material or combination of materials. The inspection plate 122, access door 112, and inspection area 120 can be sized to accommodate a single electronic device (e.g., a mobile phone, tablet, etc.). In some embodiments, the inspection plate 122, access door 112, and inspection area 120 can be sized to accommodate more than one electronic device at a time. For example, the inspection plate 122 can be large enough to accommodate 2, 3, 4, 5, 10, or more electronic devices placed screen-side-down on the inspection plate 122 at the same time.

As noted above, the kiosk 100 can include a camera 124 mounted to a sidewall or other portion of the housing 102 and directed toward the inspection area 120. For example, the camera 124 can be mounted below the inspection plate 122 and directed upwards toward the inspection plate 122 and the inspection area 120. The field of view of the camera 124 can include some or all of the inspection plate 122 and/or any devices positioned thereon. In some embodiments, the kiosk 100 includes one or more additional cameras directed toward the inspection area 120. The additional cameras could be positioned above and/or below the inspection plate 122 within the housing 102. In some embodiments, the kiosk 100 (e.g., a processor thereof) is configured to alert a user if the mobile phone on the inspection plate 122 is too large (e.g., some foldable mobile phones) to lay flat on the plate 122 and/or to reach storage bins in the kiosk. The alert could include a recommendation to take the mobile phone to a larger kiosk (e.g., a kiosk operated by ecoATM, LLC) for processing at another location. The location of a larger kiosk can be conveyed to the user via an email, text, or other communication to the user and/or to the display 108 of the kiosk 100.

In some embodiments, the camera 124 can be used to image a user's ID positioned on the inspection plate 122. For example, in some embodiments, the kiosk 100 may not include a card reader. In some such embodiments, the kiosk 100 may be configured to prompt the user to place the user's ID on the inspection plate such that the camera 124 is able to capture an image of the ID to confirm the identity of the user (e.g., to comply with second-hand dealer laws, and/or to otherwise associate the user with the transaction at the kiosk 100).

In addition to the foregoing features, the kiosk 100 can further include one or more removable bins 130*a,b* positioned in a lower portion of the housing 102 and configured to receive electronic devices from the inspection area 120. While two bins 130*a-b* are illustrated, more bins may be used (e.g., 3, 4, 5, 6, or more bins. In some embodiments, the bins 130*a-b* are positioned in a structure separate from (e.g., below or beside) the housing 102. One or more directing structures can be positioned within the housing 102 and configured to direct an electronic device from the inspection plate 122 into one of the bins 130*a-b*. For example, the housing 102 can include an upper deflecting member or plate 134 positioned at least partially between the inspection plate 122 and the bins 130*a,b*. In the illustrated embodiment, the upper deflecting plate 134 is shaped (e.g., curved) and positioned (e.g., fixedly positioned) to direct or redirect an electronic device downward from the inspection plate 122 and towards the bins 130*a,b*. In some embodiments, the housing 102 can also include a movable lower deflecting plate 136 positioned between the upper deflecting plate 134 and the bins 130*a-b*. As described in greater detail below, the lower deflecting plate 136 can be configured to selectively direct or redirect the electronic device from the upper deflecting plate 134 to one of the bins 130*a-b*. In some embodiments, the housing 102 can additionally include an intermediate deflecting plate 138 positioned toward an upper portion of the lower deflecting plate 136 and a lower portion of the upper deflecting plate 134. As also described below, the intermediate deflecting plate 136 can be configured to direct the electronic device from the upper deflecting plate 134 toward the lower deflecting plate 136. The deflecting plates 134, 136, 138 can be directly or indirectly operably coupled to the housing 102 (e.g., to a sidewall or upper wall thereof). As described in more detail below, in operation one or more of the deflecting plates 134, 136, 138 can be configured to rotate, tilt, translate, or otherwise move with respect to one or more of the other deflecting plates 134, 136, 138 to selectively direct mobile phones and other electronic devices from the inspection plate 122 to one of the bins 130*a, b*.

Figure 2A:
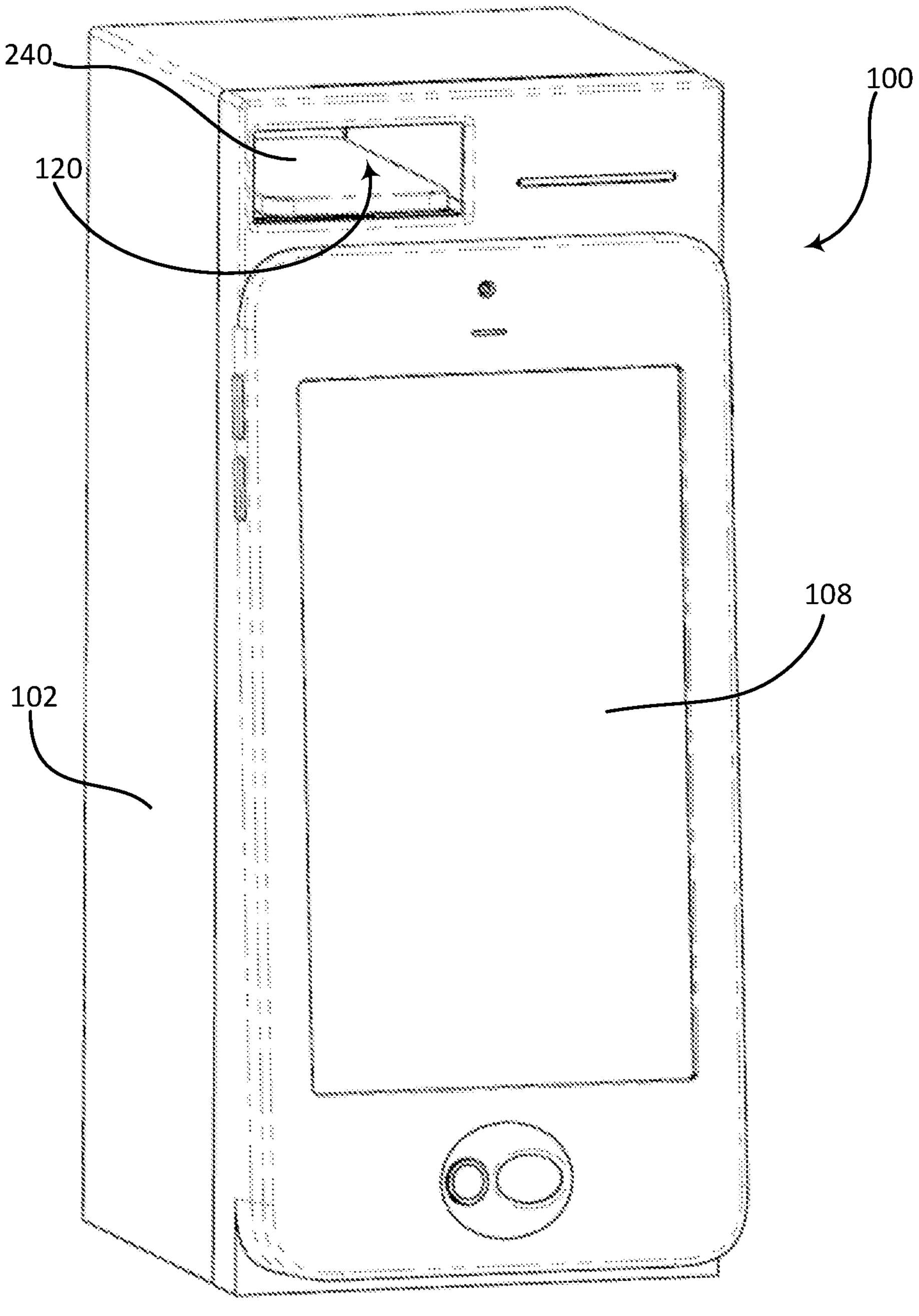
FIG. 2A is a top, front, left-side isometric view of the consumer operated kiosk of FIG. 1A with an electronic device positioned within an inspection area of the kiosk in accordance with embodiments of the present technology.

FIGS. 2A-2E are a series of views of the kiosk 100 and subsystems thereof at various stages of a transaction at the kiosk 100. FIG. 2A, for example, is a left-side isometric view of the kiosk 100 with the access door 112 (FIGS. 1A and 1B) in an open position. Referring first to this Figure, a user can interact with the kiosk 100 (e.g., via the display screen 108 or other user interface) to initiate a transaction. For example, the kiosk 100 can prompt the user to enter (via, e.g., the display 108) a unique code or other information obtained by the user in a previous transaction. Such previous transactions can include, for example, a transaction in which the user obtained a trade-in value estimate for a target electronic device (e.g., a mobile phone 240) the user wishes to sell via, e.g., use of a mobile application running on the phone 240 or another mobile device, and/or via inspection of the phone 240 at another consumer operated phone evaluation kiosk. Example mobile applications are described in, for example, U.S. Pat. No. 10,475,002, filed on Oct. 1, 2015, U.S. Pat. No. 10,438,174, filed on Oct. 1, 2015, and U.S. patent application Ser. No. 14/934,134, filed on Nov. 5, 2015, 63/070,207, filed on Aug. 25, 2020, and Appendix A, each of which is hereby incorporated by reference herein in its entirety and made part of the present application. After input of the unique code and/or other information, the access door 112 is opened (e.g., lowered) so that the user can insert the electronic device 240 into the inspection area 120.

Figure 2C:
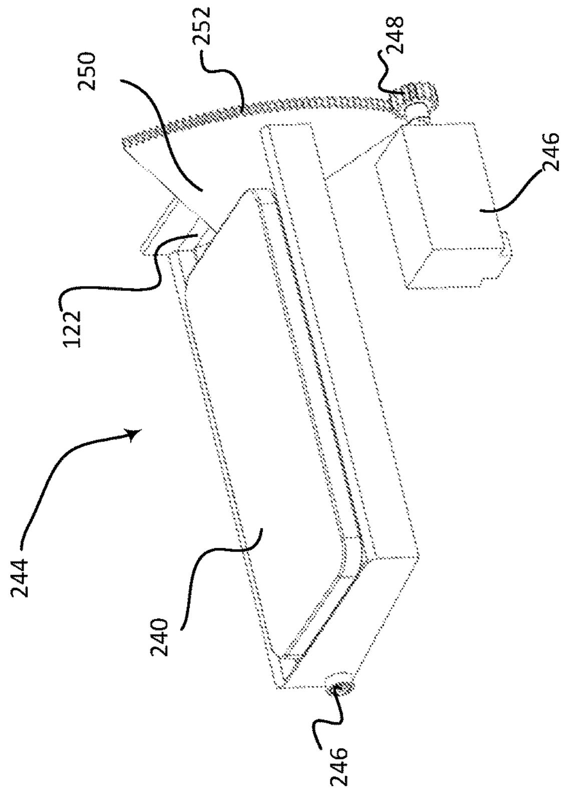
FIG. 2C is an enlarged top, front, right-side isometric view of an inspection plate assembly of the kiosk of FIG. 1A, configured in accordance with embodiments of the present technology.
Figure 2B:
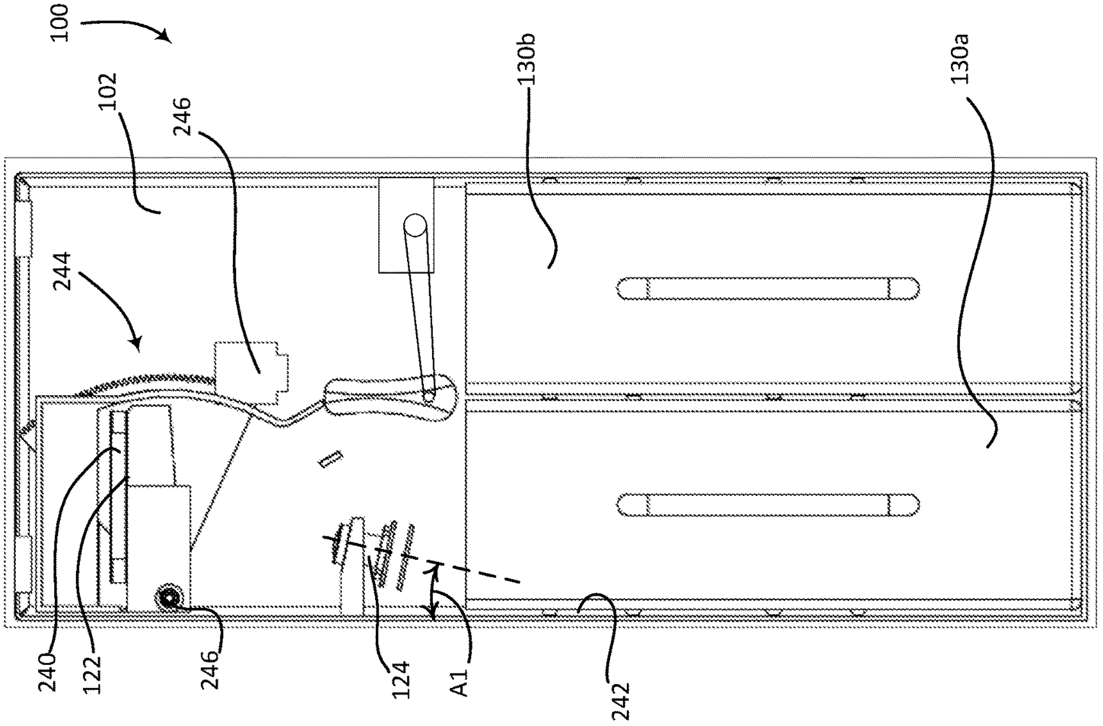
FIG. 2B is a front view of the kiosk of FIG. 1A with the kiosk door removed for purposes of illustrating an inspection plate in a first (e.g., an inspection) position in accordance with embodiments of the present technology.

FIG. 2B is a front view of the housing 102 with the door assembly 104 removed and the electronic device 240 positioned on an upper surface of the inspection plate 122. The kiosk 100 can prompt the user to place the electronic device 240 on the inspection plate 122 screen-side-down so that the camera 124 can view the screen of the electronic device 240 (e.g., through the inspection plate 122). The camera 124 can be aligned at a nonzero angle A1 away from a sidewall 142 (e.g., a vertical sidewall) of the housing 102 to which the camera 124 is mounted. Aligning the camera 124 at the nonzero angle A1 with respect to the sidewall 142 can allow the camera 124 to be positioned closer to the sidewall 242 while viewing all or most of the inspection plate 122. In some embodiments, the angle A1 between the sidewall 242 and the alignment of the camera 124 is between about 5°-45°, between about 10°-35°, and/or between about 15°-25°. In some embodiments, the angle A1 between the sidewall 242 in the alignment of the camera 124 is about 15°.

The camera 124 can be used to visually inspect the electronic device 240 by capturing images and/or video of the electronic device 240 when the electronic device 240 is positioned on the inspection plate 122. For example, in some embodiments, the user is prompted to load a "settings" or other page on the electronic device 240 that displays a unique identifier (e.g., an IMEI number or an MEID or equivalent number, a hardware media access control address (MAC address), a model number and/or serial number, etc.) associated with the electronic device 240. The camera 124 can capture an image of the unique identifier. The unique identifier can be confirmed by a processor of the kiosk and/or by a remote server/operator via optical character recognition (OCR) or other suitable methods to confirm the identity of the electronic device 240 (i.e., confirmation that the electronic device 240 is the same device that was previously evaluated to obtain a trade-in estimate). In some embodiments, the kiosk 100 includes one or more cable connectors to connect to the mobile phone to access and record the IMEI or other unique identifier from the phone. The one or more connectors can be, for example, on a connector carousel structure.

In some embodiments, a time on a clock captured in the image(s) of the electronic device 240 is compared to real time in order to confirm that the electronic device 240 is operating and that the image displayed on the screen of the electronic device 240 is a genuine image of the unique identifier, and not a reproduction of an image from another electronic device. In some embodiments, the camera 124 captures a video or series of images of the screen of the electronic device 240 in order to capture the passage of time on the clock displayed on the screen of the electronic device 240. In some embodiments, the kiosk 100 includes a mechanism configured to physically contact (e.g., "touch") the screen of the electronic device 240 and move along the screen of electronics device 240 in order to cause the image on the screen to move or scroll. Potential examples of such devices are disclosed in, e.g., U.S. patent application Ser. No. 13/658,825, filed Oct. 24, 2012, Ser. No. 13/733,984, filed Jan. 4, 2014 and Ser. No. 15/091,487, filed Apr. 5, 2016 which are incorporated herein by reference in their entireties.

Upon confirmation of the identity of the electronic device, the kiosk 100 can offer remuneration to the user in the form of, for example, cash, a voucher, a gift card, an electronic deposit into a user account, a receipt for tax purposes, and/or some other form or forms of renumeration. For example, in some embodiments the user can obtain cash via the cash outlet, a redeemable voucher via the voucher outlet, or the user can provide input (e.g., a unique code) via the display 108 identifying a user account (e.g., a bank account, credit card account, etc.) to receive an electronic money transfer. In some instances, the offer of remuneration can be an offer to recycle the electronic device 240 without further financial compensation. In some embodiments, kiosk 100 is configured to provide a contingent offer for remuneration in instances in which the unique identifier is unreadable or otherwise inaccessible and/or the electronic device 240 is unpowered. In such instances, the user may be asked to provide contact information to allow for remuneration at a later time when the value of the electronic device 240 is confirmed by, for example, a remote operator. Should the user accept the offer of remuneration, the kiosk 100 can retain the electronic device 240 (e.g., in one of the bins 130*a,b*), as described below.

Figure 2E:
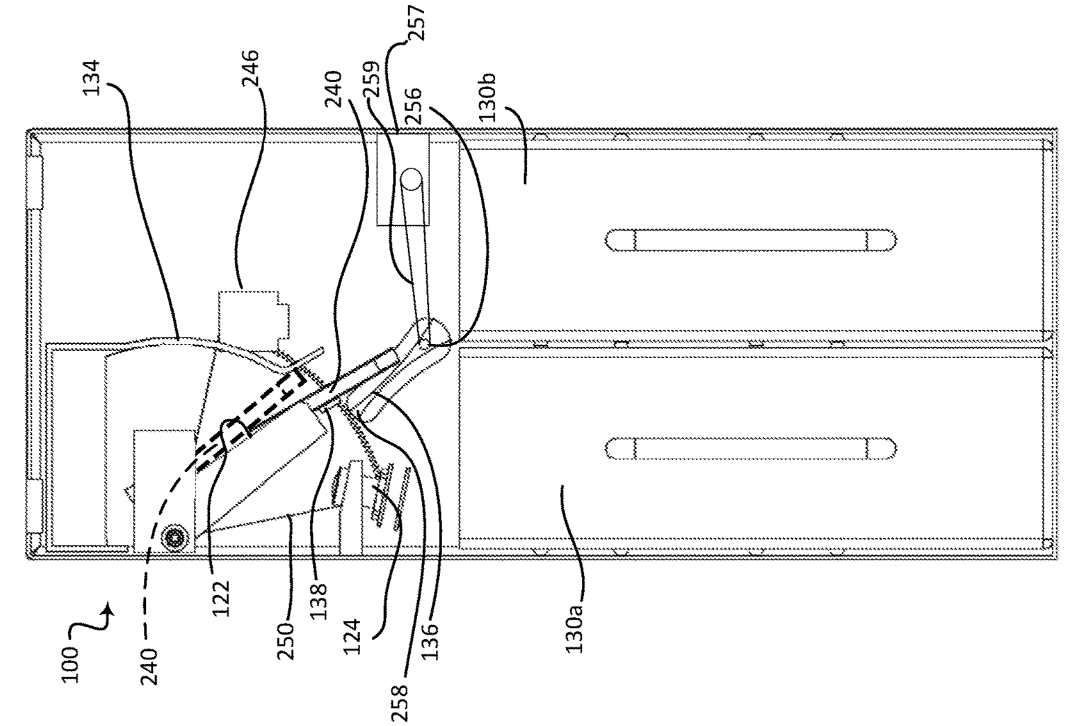
FIG. 2E is a front view of the kiosk of FIG. 1A, with the kiosk door removed, the inspection plate in the second position, and the lower mounting plate in a second (e.g., a tilted) position in accordance with embodiments of the present technology.
Figure 2D:
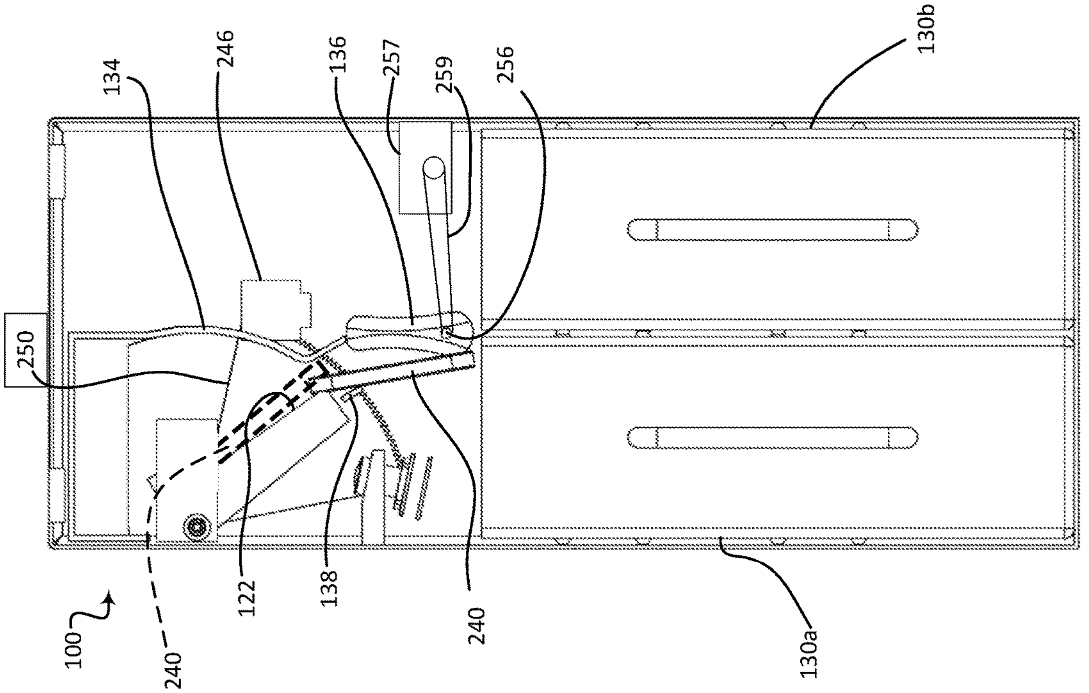
FIG. 2D is a front view of the kiosk of FIG. 1A with the kiosk door removed, the inspection plate in a second (e.g., a binning) position, and a lower mounting plate in a first (e.g., a vertical) position in accordance with embodiments of the present technology.

Referring to FIGS. 2B and 2C together, the housing 102 can include an inspection plate assembly 244. The inspection plate assembly 244 can be configured to transfer the electronic device 240 toward the bins 130*a-b* upon the user's acceptance of the offer price or other remuneration. The inspection plate assembly 244 can include the inspection plate 122 and a pivot shaft 246. The inspection plate 122 can be mounted to the housing 102 via the pivot shaft 246 and configured to rotate about the pivot shaft 246 (e.g., axis of rotation) between an inspection position (e.g., a horizontal configuration as illustrated in FIGS. 2B and 2C), and a binning position (e.g., a tilted configuration, as illustrated in FIGS. 2D-2E). In some embodiments, the pivot shaft 246 is non-parallel to a front wall of the kiosk 100 and/or perpendicular to the front wall of the kiosk 100. The inspection plate assembly 244 can also include a motor 247 (e.g., an electric stepper motor) or other actuator configured to rotate the inspection plate 122 between the inspection position and the binning position. For example, a gear 248 can be fixedly attached to a drive shaft of the motor 247 and operably engaged with teeth 252 on a tilting mechanism 250 (e.g., a quadrant gear), which in turn is fixedly attached or otherwise operably coupled to the inspection plate 122. In operation, the motor 247 rotates the gear 248 in a first direction to drive the quadrant gear 250 (and the inspection plate 122) downwardly toward the binning position, and the motor 247 rotates the gear 248 in the opposite direction to drive the quadrant gear 250 (and the inspection plate 122) back upwardly and toward the inspection position. In other embodiments, the motor 247 can rotate the inspection plate 122 via other structures such as, for example, belts and pulleys, linear actuators, solenoids, or other suitable components and structures.

Turning next to FIGS. 2D and 2E, the kiosk 100 begins the binning process by tilting the inspection plate 122 to cause the electronic device 240 to slide off the inspection plate 122. As described above, this tilting/moving, can be driven by the motor 247. As it moves off the inspection plate 122, the electronic device 240 first contacts the upper deflecting plate 134, as illustrated by the first device position shown in broken lines in both FIGS. 2D and 2E. As the electronic device 240 continues toward the bins 130*a*-*b*, the lower deflecting plate 136 can direct the electronic device 240 toward either the first bin 130*a* or the second bin 130*b*. For example, referring first to FIG. 2D, the lower deflecting plate 136 can be positioned in a first orientation or position (e.g., a vertical, or substantially vertical position) to direct the electronic device 240 toward the first bin 130*a* (as indicated by the electronic device 240 shown in solid line in FIG. 2D). In the first position, the lower deflecting plate 136 can be oriented such that it blocks a path from the inspection plate 122 to the second bin 130*b*, thereby deflecting the electronic device 240 toward the first bin 130*a*. Referring next to FIG. 2E, the lower deflecting plate 136 can be moved from the first position of FIG. 2D to a second position in which the lower deflecting plate 136 is tilted or angled toward the first bin 130*a*. In this position, the lower deflecting plate 136 directs the electronic device 240 toward the second bin 130*b*. In some embodiments, the lower deflecting plate 136 can be pivotally mounted to the housing 102 by means of a pivot shaft 256 that facilitates rotation of the lower deflecting plate 136 between the first and second positions. The kiosk 100 can include a deflecting plate motor 137 configured to drive the deflecting plate 136. The deflecting plate motor 257 can be an electric motor (e.g., a step motor) or other appropriate mechanism for moving the deflecting plate 136. The motor 137 can be configured to drive a belt 259, chain, or other link configured to engage with the pivot shaft 256 or other portion of the lower deflecting plate 136. In some embodiments, the deflecting plate motor 257 is mounted to or otherwise connected to a wall of the kiosk 100.

In some embodiments, a free end portion 258 of the lower deflecting plate 136 (e.g., an upper end portion of the lower deflecting plate 136 opposite the pivot shaft 256) is positioned beneath the intermediate tilting plate 138 when the lower deflecting plate 136 is in the second position. This enables the electronic device 240 to pass between the lower deflecting plate 136 and the upper deflecting plate 134 and into the second bin 130*b* when the lower deflecting plate 136 is in the second configuration. The kiosk 100 can be configured to selectively fill one of the bins 130*a, b* before the other of the bins 130*a, b* by using the lower deflecting plate 136 to direct electronic devices toward the desired bin as described above. For example, a processor of the kiosk 100 (e.g., the processor 402 described below with reference to FIG. 4) is configured to move the lower deflecting plate 136. In some embodiments, the kiosk is configured to direct electronic devices toward a specific bin based on characteristics of the electronic device. For example, the kiosk 100 may be configured to direct all iOS® devices to one bin and all Android® devices to the other bin. In some embodiments, the kiosk 100 is configured to direct low-value devices to one bin and high-value devices to another bin. For example, devices having a recycle/trade-in value below a threshold amount (e.g., below $20, below $40, etc.) can be directed (e.g., via the lower deflecting plate 136) to the first bin 130*a*, while devices having a value above the threshold value can be directed to the second bin 130*b*.

Figure 3B:
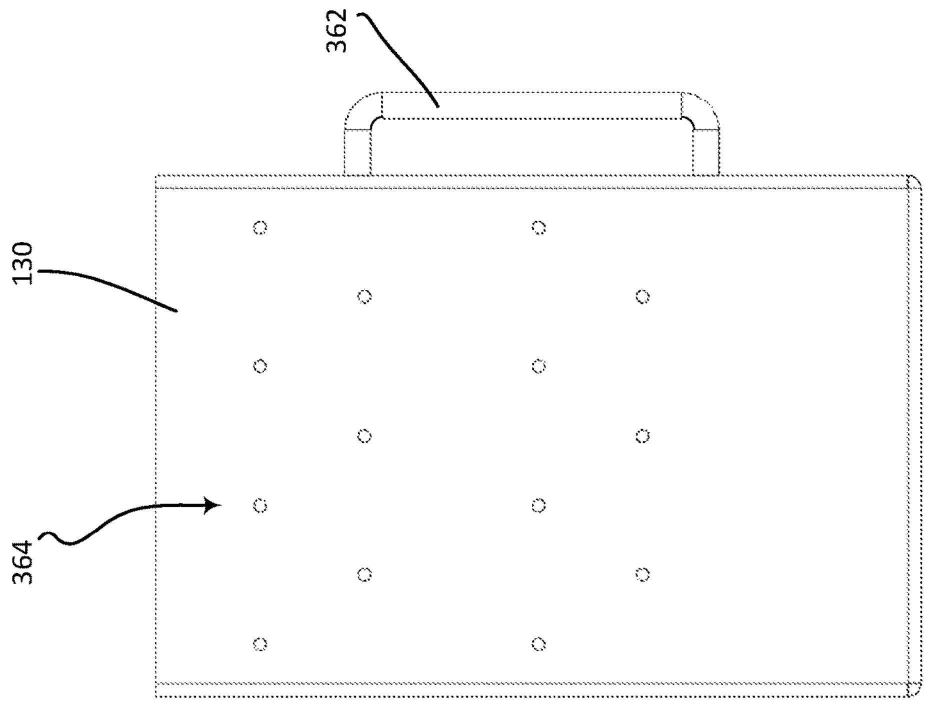
FIG. 3B is a left-side view of the storage bin of FIG. 3A.
Figure 3A:
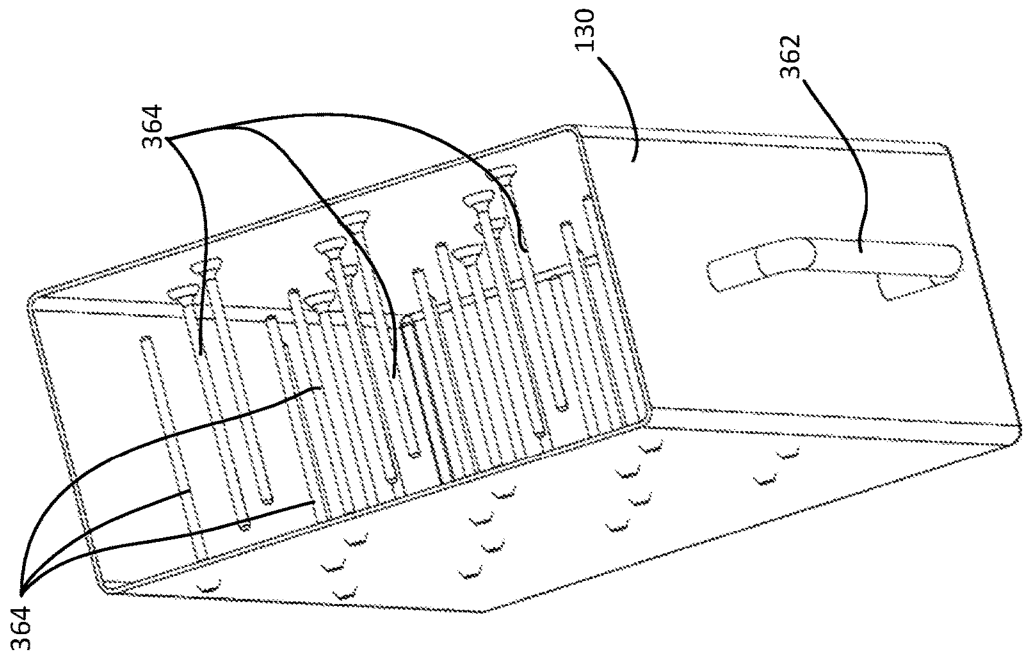
FIG. 3A is a top, front, left-side isometric view of a storage bin configured in accordance with embodiments of the present technology.

FIGS. 3A and 3B are isometric and side views, respectively, of a bin 130 configured in accordance with embodiments of the present technology. The bin 130 can be the same as or at least generally similar to the bins 130*a*-*b* described above. The bin 130 can include a handle 362 (e.g., on a front side of the bin 130) so that the bin 130 can be easily manually installed and/or removed from the kiosk 100. The bin 130 can also include one or more structures or features configured to increase the likelihood that electronic devices dropped into the bin 130 come to rest on their respective screen sides or backsides. Arranging the electronic devices in such a manner can increase the number of electronic devices that can fit inside the bin 130. For example, referring to FIG. 3A, the bin 130 can include one or more fingers 364 extending into an interior of the bin 130 from one or more opposing sidewalls of the bin 130. The fingers 364 can be elongate members (e.g., cylindrical members) constructed from a resilient material such as a rubber, polymer, and/or some other resilient material or combination of materials and can be configured to flex when contacted by an electronic device dropped into the bin 130. The fingers 364 can be arranged in various patterns. For example, referring to FIG. 3B, the fingers 364 can be arranged in one or more vertical rows, columns, or other patterns. In some embodiments, the fingers 364 are arranged in staggered rows extending inwardly in a cantilevered manner from opposite sides of the bin 130. Extending fingers 364 from opposite sides of the bin 130 can reduce the likelihood that an electronic device passing through the bin 130 lands on a lateral side of the electronic device, as the fingers 364 cause the electronic device to alternately rotate toward and away from each of the opposite sides of the bin 130 as the electronic device moves toward the lower end of the bin 130.

Figure 4:
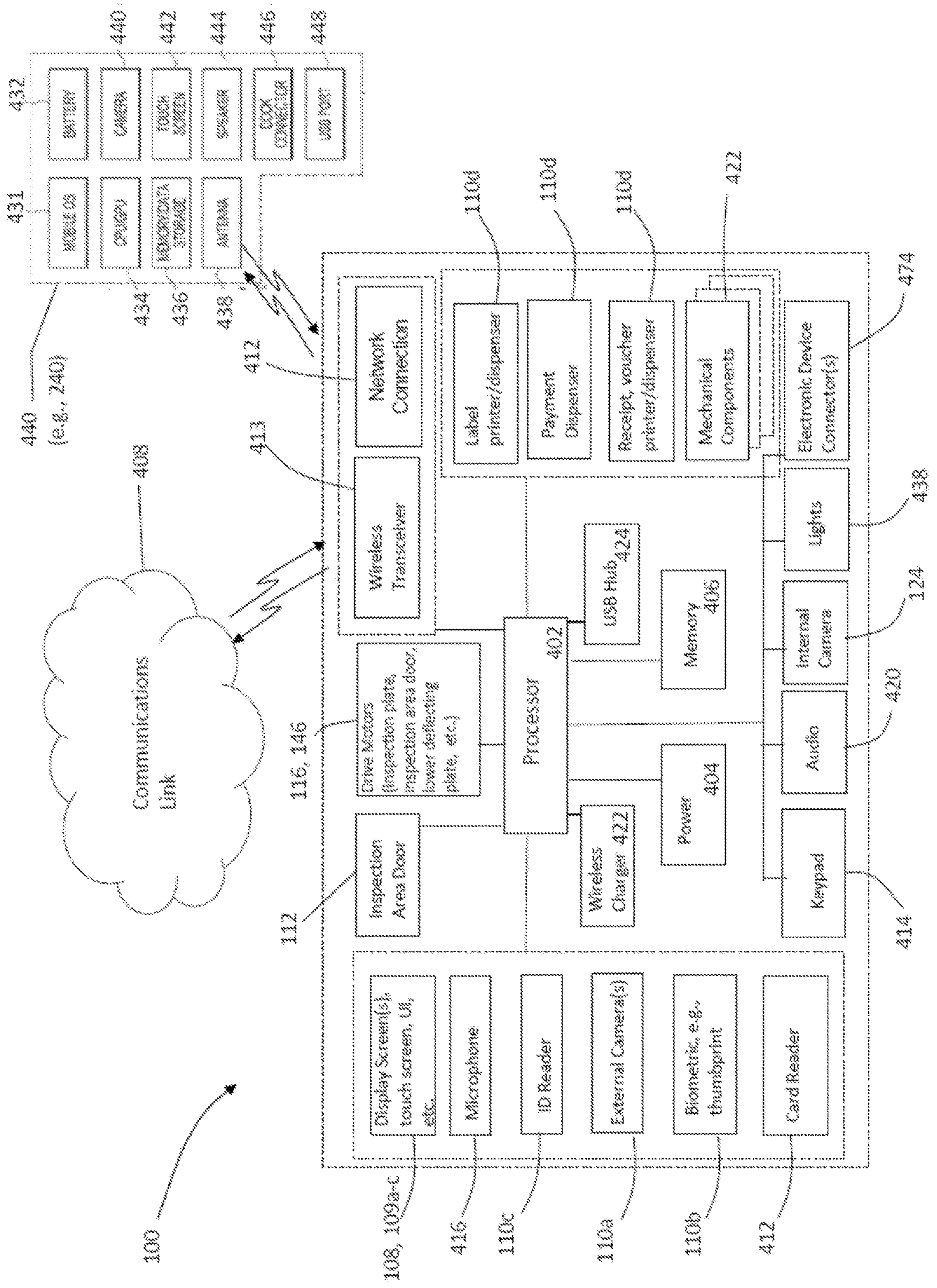
FIG. 4 is a schematic diagram illustrating various components associated with the kiosk of FIG. 1A configured in accordance with embodiments of the present technology.

FIG. 4 provides a schematic diagram of an architecture of the kiosk 100 configured in accordance with embodiments of the present technology. In the illustrated embodiment, the kiosk 100 includes a suitable processor or central processing unit (CPU) 402 that controls operation of the kiosk 100 as described herein in accordance with computer-readable instructions stored on system memory 406. The processor 402 may be any logic processing unit, such as one or more CPUs, digital signal processors (DSPs), application-specific integrated circuits (ASICs), etc. The processor 402 may be a single processing unit or multiple processing units in an electronic device or distributed across multiple devices. The processor 402 is connected to the memory 406 and may be coupled to other hardware devices and high-speed peripherals internally, for example, with the use of a bus (e.g., a USB 3.0 hub 424, a PCI Express or Serial ATA bus, etc.). The processor 402 can include, by way of example, a standard personal computer (PC) (e.g., a Dell® Optiplex® 7010PC); or other type of embedded computers running any suitable operating system, such as Windows® (e.g., Windows 8 Pro operating system), Linux®, Android™, iOS®, or an embedded real-time operating system. In some embodiments, the processor 402 can be a small form factor PC with integrated hard disk drive (HDD) or solid-state drive (SSD) and universal serial bus (USB) or other ports to communicate with other components of the kiosk 100. In other embodiments, the processor 402 can include a microprocessor with a standalone motherboard that interfaces with a separate HDD. The memory 406 can include read-only memory (ROM) and random access memory (RAM) or other storage devices, such as disk drives or SSDs, that store the executable applications, test software, databases, and/or other software required to, for example, control kiosk components, process electronic device information and data (to, e.g., evaluate device make, model, condition, pricing, etc.), and communicate and exchange data and information with remote computers and other devices, etc. Program modules can be stored in the system memory 406, such as an operating system, one or more application programs, other programs or modules and program data. The memory 406 may also include a web browser for permitting kiosk 100 to access and exchange data with web sites over the Internet.

The processor 402 can provide information and instructions to kiosk users via the display screen 108 and/or an audio system (e.g., a speaker) 420. The processor 402 can also receive user inputs via, e.g., a touch screen associated with the display screen 108 and/or, in some embodiments, a keypad 414 with physical keys, and/or a microphone 416. Additionally, the processor 402 can receive personal identification and/or biometric information associated with users via an ID reader (e.g., a driver's license reader/scanner), one or more of the external cameras 110*a-b*, and/or the fingerprint reader 111. In some embodiments, the processor 402 can also receive information (such as user identification and/or account information) via a card reader 412 (e.g., a debit, credit, or loyalty card reader having, e.g., a suitable magnetic stripe reader, optical reader, etc.). The processor 402 can also control operation of the dispenser 115 (e.g., the dispenser configured to provide labels, remuneration (e.g., cash), and/or a receipt or voucher to the user).

The processor 402 can also control operation of the electronic, optical, and electromechanical systems the kiosk 100 includes for electrically, visually and/or physically analyzing electronic devices placed in the kiosk 100 for purchase or recycling. Such systems can include: one or more internal cameras (e.g., the camera 124) for visually inspecting electronic devices for, e.g., confirming unique identifiers and/or model IDs; and (optionally) one or more electrical connectors 474 (e.g., USB connectors) for, e.g., powering up mobile phones and other electronic devices and performing electronic inspections. The processor 402 can also be operably connected to a connector carrier 478 to control dispensing of the connectors 474, and to the motors 116 and 247 to control movement of the access door 112 and the inspection plate 122, respectively, as described in detail above. The kiosk 100 further includes a plurality of mechanical components 422 that are electronically actuated for carrying out the various functions of the kiosk 100 during operation. The mechanical components 422 can include, for example, the inspection area access door 112 (FIG. 1A). The kiosk 100 further includes power 404, which can include battery power and/or facility power for operation of the various electrical components associated with kiosk operation.

In the illustrated embodiment, the kiosk 100 further includes a network connection 417 (e.g., a wired connection, such as an Ethernet port, cable modem, FireWire cable, Lightning connector, USB port, etc.) suitable for communication with, e.g., all manner of processing devices (including remote processing devices) via a communication link 408, and a wireless transceiver 413 (e.g., including a Wi-Fi access point; Bluetooth transceiver; near-field communication (NFC) device; wireless modem or cellular radio utilizing GSM, CDMA, 3G, 4G and/or 5G technologies; etc.) suitable for communication with, e.g., all manner of processing devices (including remote processing devices) via the communication link 408 and/or directly via, e.g., a wireless peer-to-peer connection. For example, the wireless transceiver 413 can facilitate wireless communication with electronic devices, such as a mobile device 440 (e.g., the electronic device 240) for, e.g., wireless evaluation of the mobile device via, e.g., a mobile application loaded on the device. Such communication with the mobile device 440 can occur when the device is in the proximity of the kiosk 100 (e.g., in or near the inspection area 120) or when the device 440 is remote from the kiosk 100. In other embodiments, the kiosk 100 can include other components and features that may be different from those described above, and/or one or more of the components and features described above may be omitted.

In the illustrated embodiment, the electronic device 440 is depicted as a handheld device, e.g., the electronic device 240. In other embodiments, however, the electronic device 440 can be other types of electronic devices including, for example, other handheld devices; PDAs; MP3 players; tablet, notebook and laptop computers; e-readers; cameras; desktop computers; TVs; DVRs; game consoles; Google® Glass™; smartwatches; etc. By way of example only, in the illustrated embodiment the electronic device 440 can include one or more features, applications and/or other elements commonly found in smartphones and other known mobile devices. For example, the electronic device 440 can include a CPU and/or a graphics processing unit (GPU) 434 for executing computer readable instructions stored on memory 436. In addition, the electronic device 440 can include an internal power source or battery 432, a dock connector 446, a USB port 448, a camera 441, and/or well-known input devices, including, for example, a touch screen 442, a keypad, etc. In many embodiments, the electronic device 440 can also include a speaker 444 for two-way communication and audio playback. In addition to the foregoing features, the electronic device 440 can include an operating system (OS) 431 and/or a device wireless transceiver that may include one or more antennas 438 for wirelessly communicating with, for example, other electronic devices, websites, and the kiosk 100. Such communication can be performed via, e.g., the communication link 408 (which can include the Internet, a public or private intranet, a local or extended Wi-Fi network, cell towers, the plain old telephone system (POTS), etc.), direct wireless communication, etc.

Figure 5:
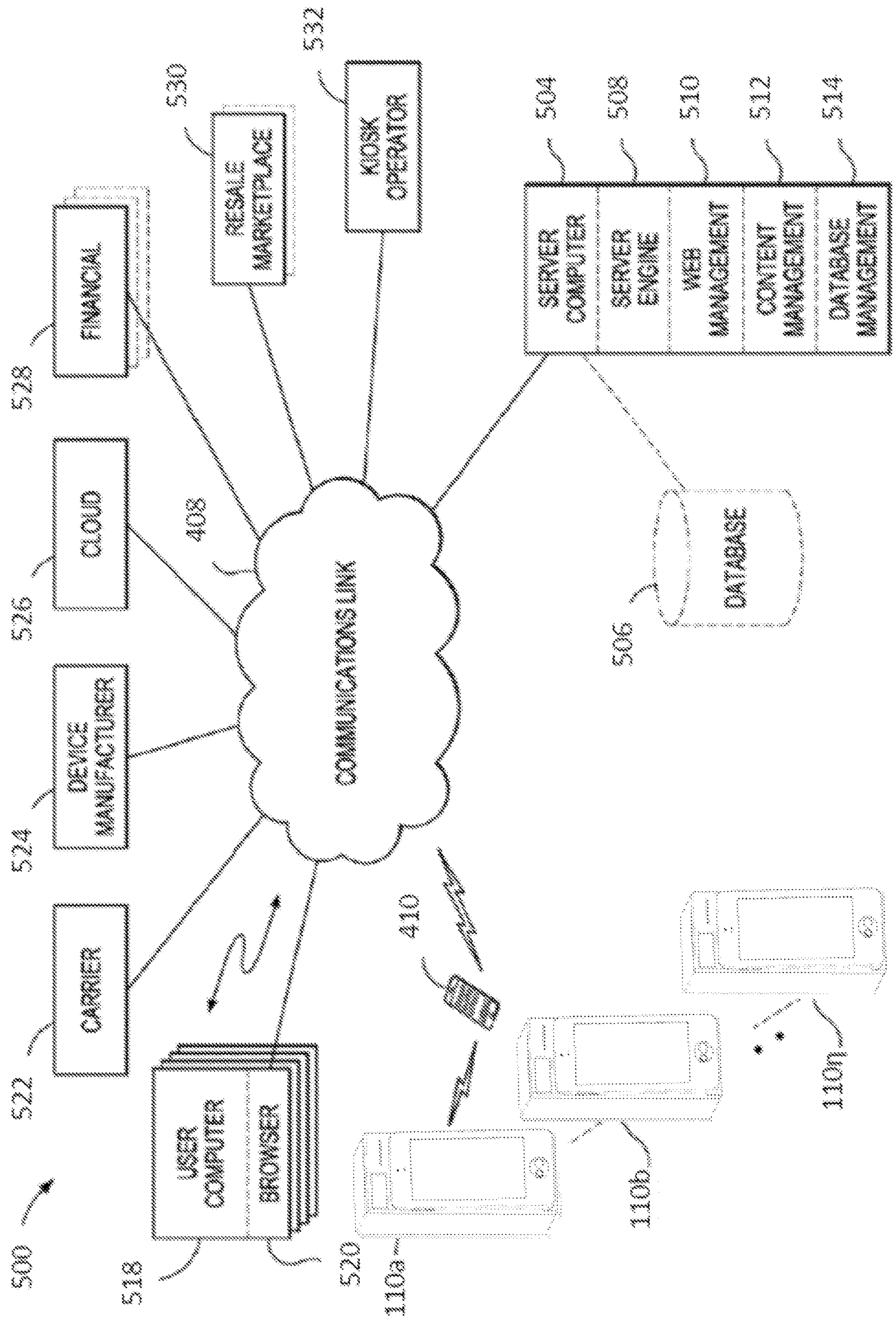
FIG. 5 is a schematic diagram of a suitable network environment for implementing various aspects of an electronic device recycling system configured in accordance with embodiments of the present technology.

FIG. 5 is a schematic diagram of a suitable network environment for implementing various aspects of an electronic device recycling system 500 configured in accordance with embodiments of the present technology. In the illustrated embodiment, a plurality of the kiosks 100 (identified individually as kiosks 100*a*-100*n*) can exchange information with one or more remote computers (e.g., one or more server computers 504) via the communication link 408. Although the communication link 408 can include a publicly available network (e.g., the Internet with a web interface), a private communication link, such as an intranet or other network can also be used. Moreover, in various embodiments the individual kiosks 100 can be connected to a host computer (not shown) that facilitates the exchange of information between the kiosks 100 and remote computers, other kiosks, mobile devices, etc.

The server computer 504 can perform many or all of the functions for receiving, routing and storing of electronic messages, such as webpages, audio signals and electronic images necessary to implement the various electronic transactions described herein. For example, the server computer 504 can retrieve and exchange web pages and other content with an associated database or databases 506. In some embodiments, the database 506 can include information related to mobile phones and/or other consumer electronic devices. Such information can include, for example, make, model, serial number, IMEI number, carrier plan information, pricing information, owner information, etc. In various embodiments the server computer 504 can also include a server engine 508, a web page management component 510, a content management component 512, and a database management component 514. The server engine 508 can perform the basic processing and operating system level tasks associated with the various technologies described herein. The webpage management component 510 can handle creation and/or display and/or routing of web or other display pages. The content management component 512 can handle many of the functions associated with the routines described herein. The database management component 514 can perform various storage, retrieval and query tasks associated with the database 506, and can store various information and data such as animation, graphics, visual and audio signals, etc.

In the illustrated embodiment, the kiosks 100 can also be operably connected to a plurality of other remote devices and systems via the communication link 408. For example, the kiosks 100 can be operably connected to a plurality of user devices 518 (e.g., personal computers, laptops, handheld devices, etc.) having associated browsers 520. Similarly, as described above the kiosks 100 can each include wireless communication facilities for exchanging digital information with wireless-enabled electronic devices, such as the electronic device 440 (e.g. the electronic device 240). The kiosks 100 and/or the server computer 504 are also operably connectable to a series of remote computers for obtaining data and/or exchanging information with necessary service providers, financial institutions, device manufactures, authorities, government agencies, etc. For example, the kiosks 100 and the server computer 504 can be operably connected to one or more cell carriers 522, one or more device manufacturers 524 (e.g., mobile phone manufacturers), one or more electronic payment or financial institutions 528, one or more databases (e.g., the GSMA IMEI Database, etc.), and one or more computers and/or other remotely located or shared resources associated with cloud computing 526. The financial institutions 528 can include all manner of entity associated with conducting financial transactions, including banks, credit/debit card facilities, online commerce facilities, online payment systems, virtual cash systems, money transfer systems, etc.

In addition to the foregoing, the kiosks 100 and the server computer 504 can be operably connected to a resale marketplace 530 and/or a kiosk operator 532. The resale marketplace 530 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 532 can be a central computer or system of computers for controlling all manner of operation of the network of kiosks 100. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 532 can further include one or more display screens operably connected to receive images from one or cameras located at each of the kiosks 100 (e.g., one or more of the cameras 110*a-b* and 124). This remote viewing capability enables operator personnel to verify user identification and/or make other visual observations at the kiosks 100 in real-time during transactions. This can include remote evaluation of images of an electronic device by a remote operator to grade the physical condition of the device.

The kiosk 100 described herein can be used in transactions wherein a user first receives an offer (e.g., a guaranteed offer) to purchase their electronic device prior to visiting the kiosk 100. For example, the user may download a mobile application used to evaluate the electronic device and provide an offer to purchase the electronic device. The mobile application could be downloaded to the electronic device to be evaluated or to a separate electronic device. Some such mobile applications are described in Appendix A, attached hereto and made part of the present disclosure. In some cases, the electronic device is evaluated at a separate kiosk, at which the user is offered a purchase price. The user may then, after receiving the guaranteed offer, bring the electronic device to the kiosk 100 described herein. The kiosk 100 can be used to confirm that the electronic device is the same device for which the guaranteed offer was provided. In some embodiments, the kiosk 100 does not perform any further evaluation of the electronic device beyond the above-stated confirmation.

Figure 6:
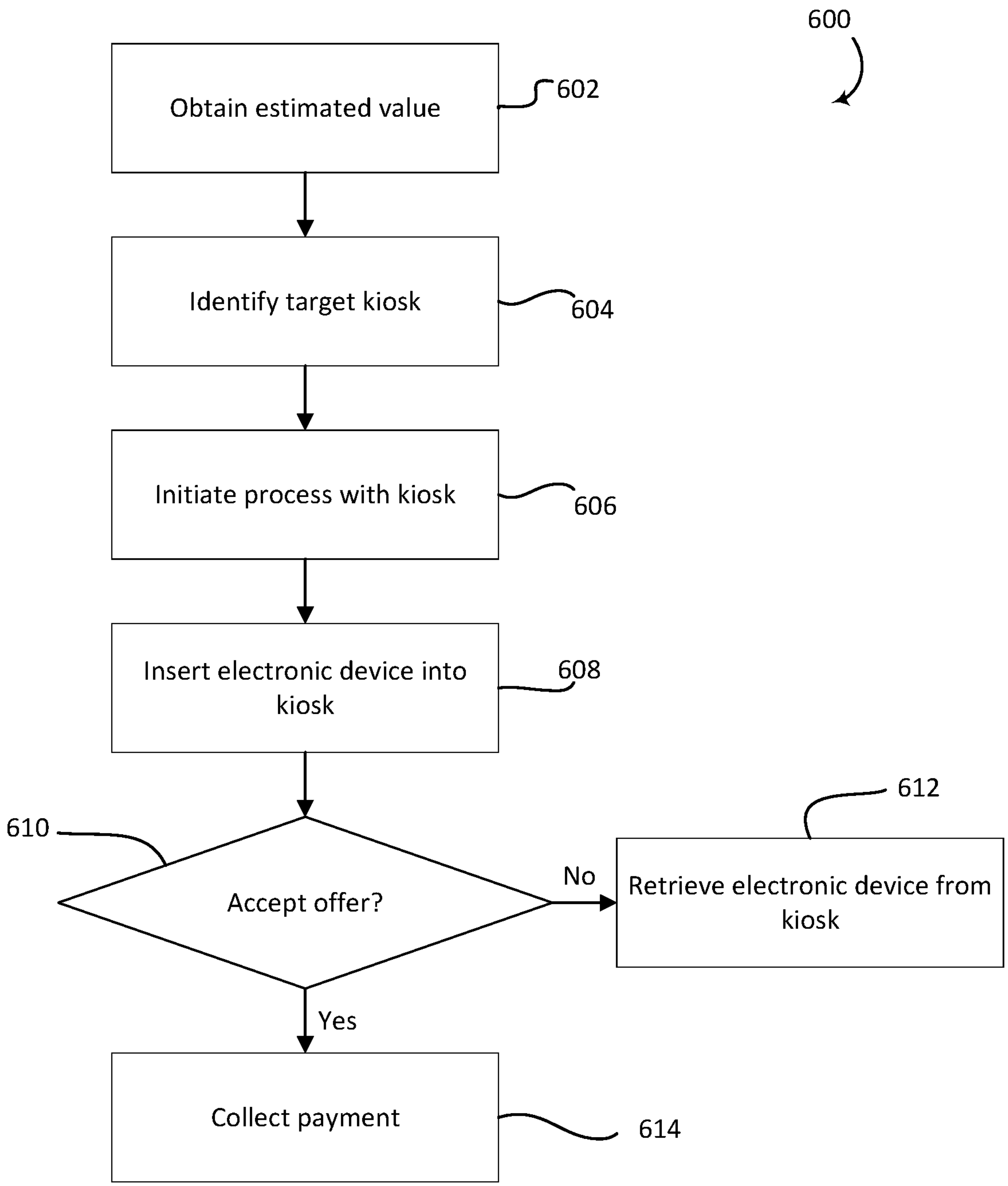
FIG. 6 is a flow diagram illustrating a process performed by a user of the kiosk of FIG. 1A in accordance with embodiments of the present technology.

FIG. 6 is a flowchart illustrating a process 600 for interacting with the kiosk 100 to sell an electronic device in accordance with embodiments of the present technology. The process 600 can start by the user obtaining an initial estimated value for an electronic device the user wishes to sell (block 602). The value could be, for example, a trade-in price, a sale price, and/or a deductible value for tax purposes. In some embodiments, the user can obtain the initial estimate by executing a mobile application on the device the user wishes to sell, and/or by having the device evaluated by another consumer-operated kiosk that is configured to evaluate and price electronic devices (e.g., mobile phones). In some embodiments, the user is prompted to obtain an initial estimated value for their electronic device after first observing a kiosk 100 (e.g., in a retail or other public environment).

Figure 7:
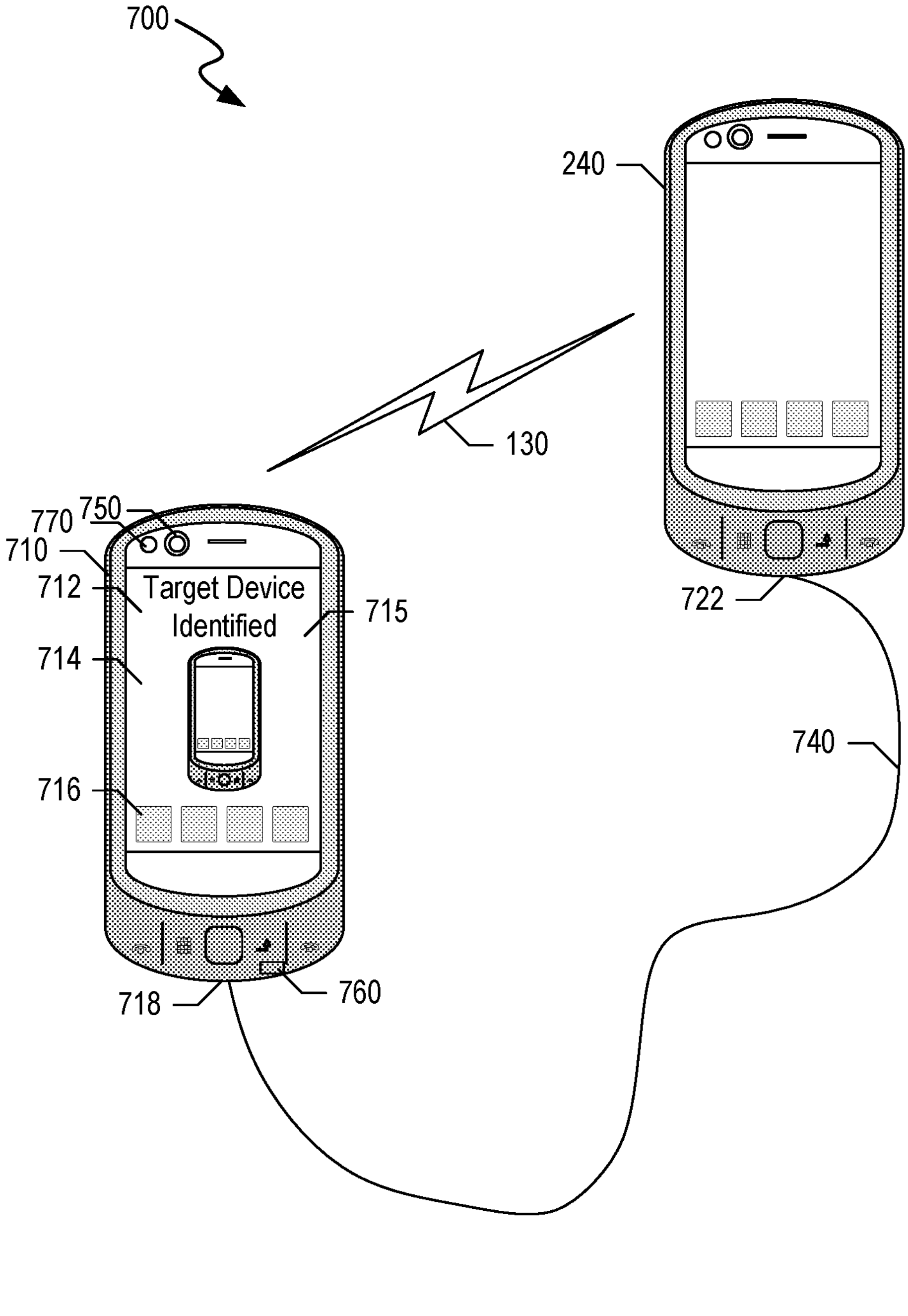
FIG. 7 illustrates an embodiment of a suitable computing environment for implementing various aspects of the present technology.

FIGS. 7-18 $_{[JB(1)]}$ illustrate example systems and methods for implementing obtaining an initial estimated value for an electronic device the user wishes to sell. For example, FIG. 7 illustrates an embodiment of a suitable computing environment 700 for implementing various aspects of the present technology. The environment 700 includes a first electronic device (e.g., an evaluator device 710) and a second electronic device (e.g., the target electronic device or mobile phone 240). In the illustrated embodiment, the evaluator device 710 is depicted as a handheld computing device such as a smartphone or other mobile phone. However, in other embodiments, the evaluator device 710 can be any manner of electronic device. For example, the evaluator device 710 could be, for example, a tablet, a handheld gaming device, a media player, all manner of mobile phones; smartphones; handheld devices; personal digital assistants (PDAs); MP3 or other digital music players; tablet, notebook, Ultrabook and laptop computers; e-readers; all types of cameras; GPS devices; set-top boxes and other media players; VoIP phones; universal remote controls; speakers; headphones; wearable computers; larger consumer electronic devices, such as desktop computers, televisions, projectors, DVRs, game consoles, Blu-ray Disc™ players, printers, network attached storage devices, etc.; as well as smaller electronic devices such as Google® Glass™, smartwatches (e.g., the Apple Watch™, Android Wear™ devices such as the Moto 360®, or the Pebble Steel™ watch), fitness bands, thumb drives, wireless hands-free devices; unmanned aerial vehicles; etc. Although many embodiments of the present technology are described herein in the context of mobile phones, aspects of the present technology are not limited to mobile phones and generally apply to other consumer electronic devices. Such devices include, as non-limiting examples, desktop computers, TVs, game consoles, etc.

In one embodiment, the evaluator device 710 can execute a software application to aid in the evaluation of the target device 240. For example, the evaluator device 710 can have a camera 750 and a flashlight 770, and can use the camera and the flashlight to take pictures and record videos of the target device 240. The evaluator device 710 can provide instructions to the user through speakers 760 and/or display 715 of the evaluator device 710 to direct the user how to position the target device 240 with respect to the camera 750 and/or flashlight 770, as described in more detail below. The flashlight can be a flash used in taking pictures or can include flashlight functionality of a device.

In some embodiments, both the evaluator device 710 and the target device 240 can execute one or more applications. The one or more applications can communicate with each other, and the evaluator device 710 and the target device 240 can work in a server-client relationship to determine a price for the target device 240. For example, the application executed by the target device 240 can provide information about the target device 240 to the application executed by the evaluator device 710. Information can include, but is not limited to, make and model of the target device 240, operating system version, memory/storage capacity of the target device 240, service provider to the target device 240, IMEI number of the target device 240, network capabilities (e.g., 4G, 5G, etc.) of the target device 240, and so on.

In some embodiments, the target device 240 includes a communication interface (e.g., a connector port 722 and/or a wireless transceiver (not shown)) and the evaluator device 710 similarly includes a communication interface (e.g., a connector port 718 and/or a wireless transceiver (not shown)). In this embodiment, the evaluator device 710 can be electrically connected to the target device 240 via a wireless connection 730 between the respective device transceivers, such as a Wi-Fi or Bluetooth network or a near-field communication (NFC) link; or via a wired connection 740, such as a universal serial bus (USB), Ethernet, or Lightning cable connected between the device connector ports 718 and 722. The evaluator device 710 can run special software configured to evaluate the target device 240. The evaluator device 710 and the target device 240 can be connected via a USB cable. A display screen 715 of the evaluator device 710 can display information such as textual information 712 indicating that the evaluator device 710 has identified the target device 240, an image 714 representing the target device 240, and/or icons or buttons 716 enabling the user to select various options or actions such as confirming the correct identification of the target device 240, pricing the target device 240, saving the target device 240 in a list of devices, etc.

As described in detail below, the present technology enables the evaluator device 710 to obtain information from the target device 240 over the wireless connection 730 and/or the wired connection 740, and evaluate the obtained information to facilitate recycling and/or other processing of the target device 240. The term "processing" is used herein for ease of reference to generally refer to all manner of services and operations that may be performed on, with, or otherwise in relation to a target device. Such services and operations can include, for example, selling, reselling, recycling, upcycling, donating, exchanging, identifying, evaluating, pricing, auctioning, decommissioning, transferring data from or to, reconfiguring, refurbishing, etc. mobile phones and other target devices. The term "recycling" is used herein for ease of reference to generally refer to selling, purchasing, reselling, exchanging, donating, and/or receiving target devices. For example, owners may elect to sell their used target devices, and the target devices can be recycled for resale, reconditioning, repair, recovery of salvageable components, environmentally conscious disposal, etc.

Figure 8:
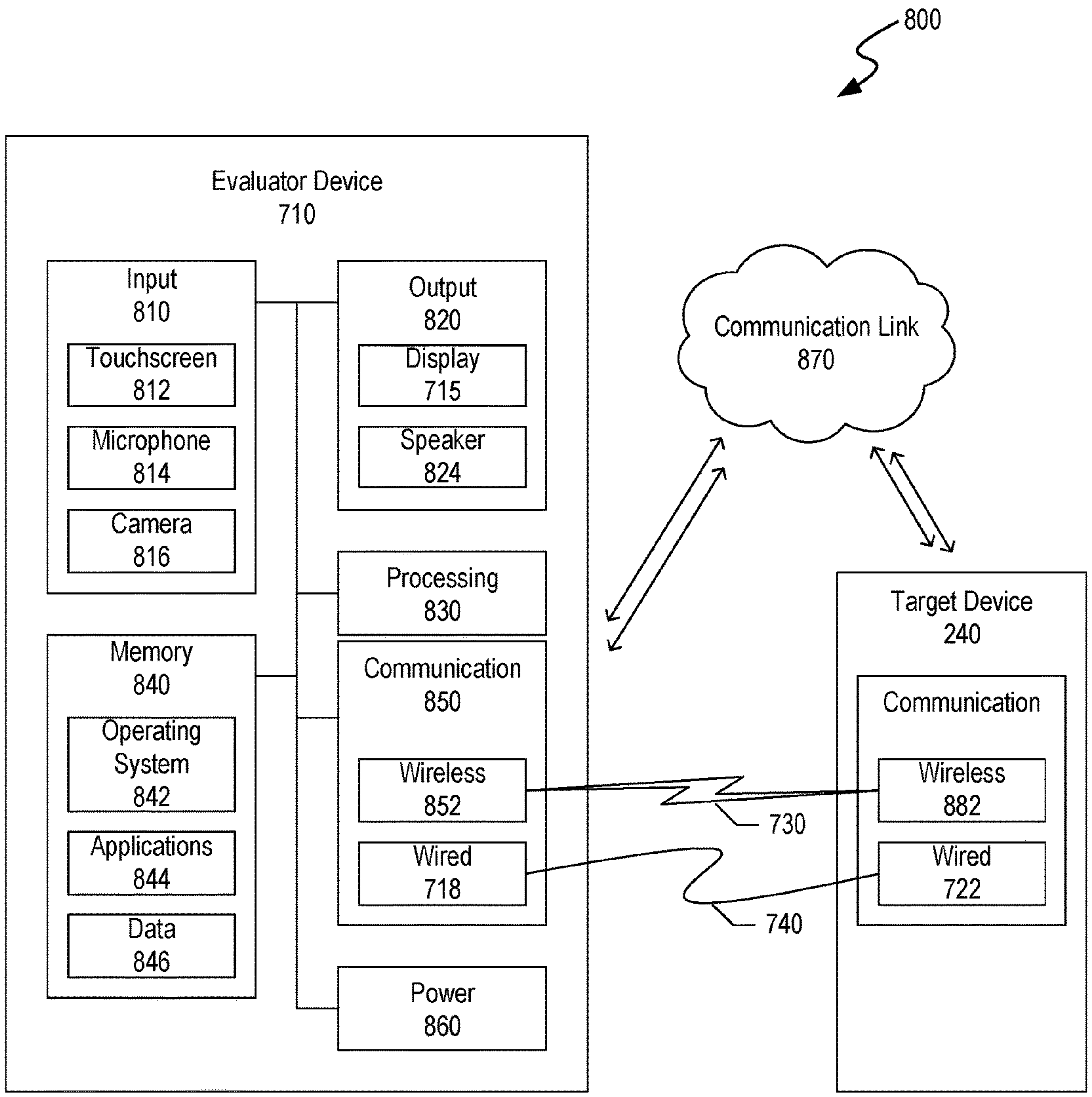
FIG. 8 is a block diagram illustrating various components typically incorporated in computing systems and other devices on which the present technology can be implemented.

FIG. 8 is a block diagram showing some of the components 800 typically incorporated in computing systems and other devices on which the present technology can be implemented. In the illustrated embodiment, the evaluator device 710 includes a processing component 830 that controls operation of the evaluator device 710 in accordance with computer-readable instructions stored in memory 840. The processing component 830 may be any logic processing unit, such as one or more central processing units (CPUs), graphics processing units (GPUs), digital signal processors (DSPs), application-specific integrated circuits (ASICs), etc. The processing component 830 may be a single processing unit or multiple processing units in an evaluator device or distributed across multiple devices. Aspects of the present technology can be embodied in a special purpose computing device or data processor that is specifically programmed, configured, or constructed to perform one or more of the computer-executable instructions explained in detail herein. Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices.

The processing component 830 is connected to memory 840, which can include a combination of temporary and/or permanent storage, and both read-only memory (ROM) and writable memory (e.g., random-access memory or RAM), writable non-volatile memory such as flash memory or other solid-state memory, hard drives, removable media, magnetically or optically readable discs, nanotechnology memory, biological memory, and so forth. As used herein, memory does not include a transitory propagating signal per se. The memory 840 includes data storage that contains programs, software, and information, such as an operating system 842, application programs 844, and data 846. Evaluator device 710 operating systems can include, for example, Windows®, Linux®, Android™, iOS®, and/or an embedded real-time operating system. The application programs 844 and data 846 can include software and databases configured to control evaluator device 710 components, process target device 240 information and data (e.g., to evaluate device make, model, condition, pricing, etc.), communicate and exchange data and information with remote computers and other devices, etc.

The evaluator device 710 can include input components 810 that receive input from user interactions and provide input to the processor 830, typically mediated by a hardware controller that interprets the raw signals received from the input device and communicates the information to the processor 830 using a known communication protocol. Examples of an input component 810 include a keyboard (with physical or virtual keys), a pointing device (such as a mouse, joystick, dial, or eye tracking device), a touchscreen 812 that detects contact events when it is touched by a user, a microphone 814 that receives audio input, and a camera

816 for still photographs and/or video capture. The evaluator device 710 can also include various other input components 810 such as GPS or other location determination sensors, motion sensors, wearable input devices with accelerometers (e.g., wearable glove-type input devices), biometric sensors (e.g., fingerprint sensors), light sensors, card readers (e.g., magnetic stripe readers or memory card readers), and so on.

The processor 830 can also be connected to one or more various output components 820, for example, directly or via a hardware controller. The output devices can include a display 715 on which text and graphics are displayed. The display 715 can be, for example, an LCD, LED, or OLED display screen (such as a desktop computer screen, handheld device screen, or television screen), an e-ink display, a projected display (such as a heads-up display device), and/or a display integrated with a touchscreen 812 that serves as an input device as well as an output device that provides graphical and textual visual feedback to the user. The output devices can also include a speaker 824 for playing audio signals, haptic feedback devices for tactile output such as vibration, etc. In some implementations, the speaker 824 and the microphone 814 are implemented by a combined audio input-output device.

In the illustrated embodiment, the evaluator device 710 further includes one or more communication components 850. The communication components can include, for example, a wireless transceiver 852 (e.g., one or more of a Wi-Fi transceiver; Bluetooth transceiver; NFC device; wireless modem or cellular radio utilizing GSM, CDMA, 3G, and/or 4G technologies; etc.) and/or a wired network connection 718 (e.g., one or more of an Ethernet port, cable modem, FireWire cable, Lightning connector, USB port, etc.). The communication components 850 are suitable for communication between the evaluator device 710 and other local and/or remote computing devices, for example, the target device 240, directly via a wired or wireless peer-to-peer connection and/or indirectly via the communication link 870 (which can include the Internet, a public or private intranet, a local or extended Wi-Fi network, cell towers, the plain old telephone system (POTS), etc.). For example, the wireless transceiver 852 of the evaluator device 710 can connect to the wireless transceiver 882 (e.g., the antenna 438) of the target device 240 via the wireless connection 730, and/or the wired connector 740 of the evaluator device 710 can connect to the wired connector 722 (e.g., the port 722) of the target device 240 via the wired connection 740. The evaluator device 710 further includes power 860, which can include battery power and/or facility power for operation of the various electrical components associated with the evaluator device 710.

Unless described otherwise, the construction and operation of the various components shown in FIG. 8 are of conventional design. As a result, such components need not be described in further detail herein, as they will be readily understood by those skilled in the relevant art. In other embodiments, the evaluator device 710 and/or the target device 240 can include other features that may be different from those described above. In still further embodiments, the evaluator device 710 and/or the target device 240 can include more or fewer features similar to those described above.

Figure 9:
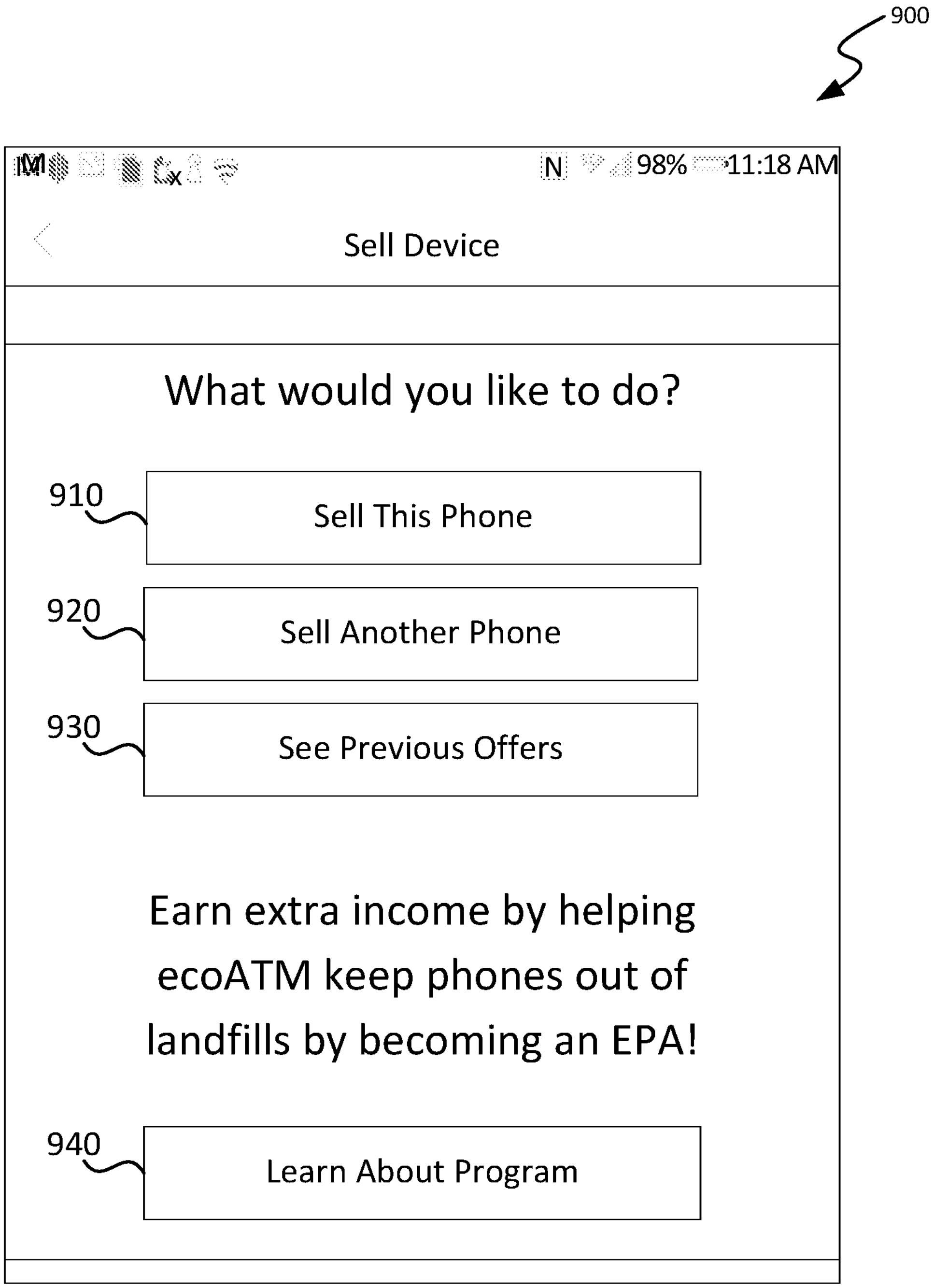
FIG. 9 shows a user interface presented by an application running on an evaluator device or a target device according to some embodiments of the present technology.

FIG. 9 shows a user interface presented by an application running on the evaluator device or the target device according to some embodiments of the present technology. The user interface 900 presents several buttons 910, 920, 930, 940 to the user.

When the user selects button 910, an application running on the device determines that the user wants to sell the device displaying the user interface 900. When the user selects the button 920, the application determines the user wants to sell another device, for example, the target device 240 in FIG. 7, and use the device displaying the user interface 900 as the evaluator device 710 in FIG. 7.

When the user selects the button 930, the application displays to the user previous offers received for various devices that the user previously offered for sale. The user can have an account with an entity (e.g., ecoATM). The user can login to that account and retrieve previous offers. When the user selects the button 940, the application provides the user additional information about trading in the user's devices (e.g. terms of service, privacy notices, recycling policies, etc.).

Figure 10:
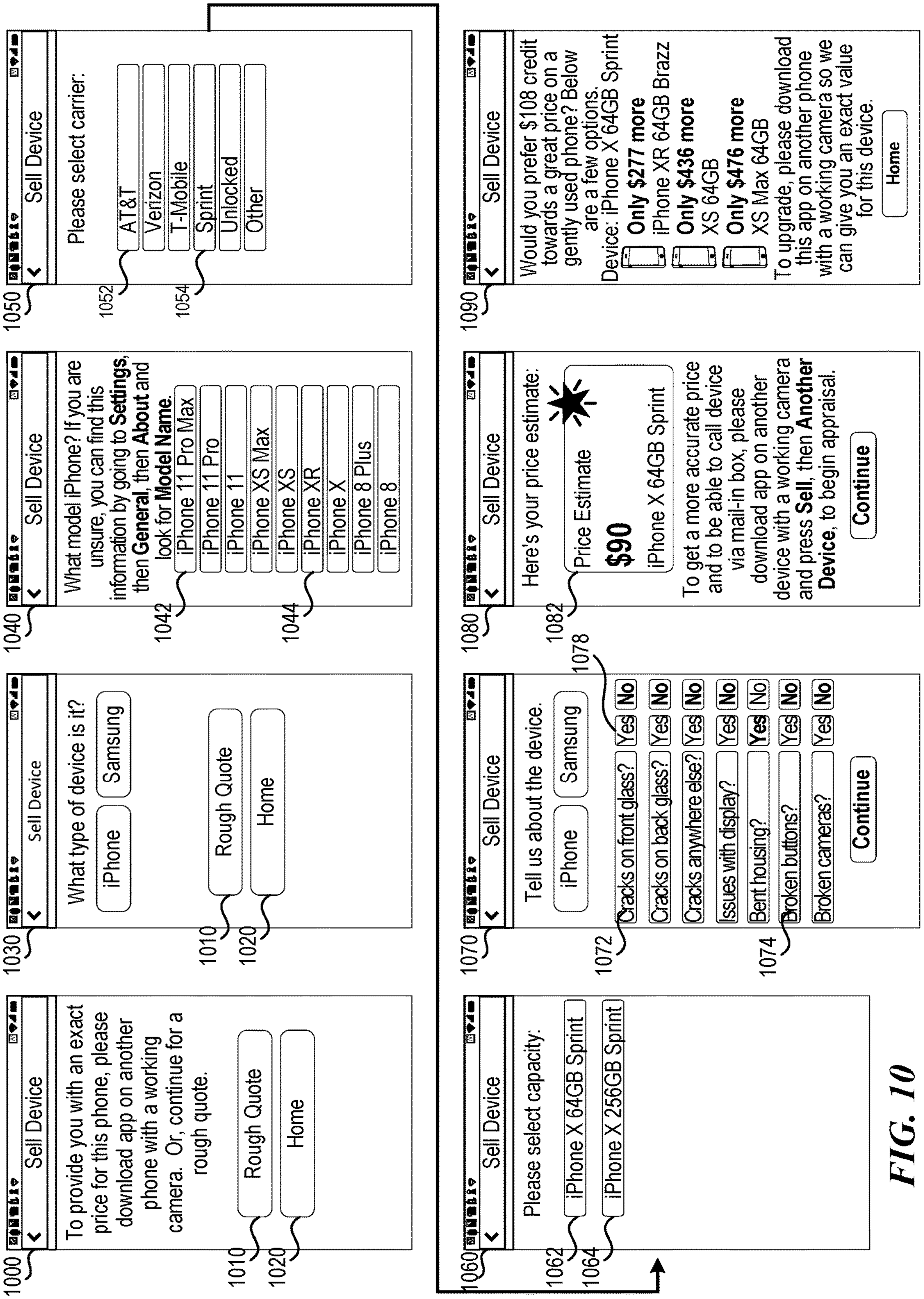
FIG. 10 shows a series of user interfaces presented to the user when the user wants to sell a target device according to some embodiments of the present technology.

FIG. 10 shows a series of user interfaces presented to the user when the user wants to sell a target device according to some embodiments of the present technology. When the user selects the button 910 in FIG. 9, the application running on the device determines that the user has a single device that the user wants to sell. In step 1000, the application provides information to the user encouraging the user to obtain a second device, such as an evaluator device 710 in FIG. 7 to obtain a more precise quote. The application provides two buttons 1010 and 1020. If the user wants to proceed with a single device, the user can select button 1010, in which case the application provides a rough quote to the user. When the user selects button 1020, the user can go back to the user interface 900 in FIG. 9 and can select button 920 in FIG. 9.

If the user wants to proceed with a single device, the application can gather information about the device by querying the user or automatically. For example, in step 1030, the application asks the user to specify a type of device, such as iPhone, Samsung, Huawei, Dell, Lenovo, etc. In step 1040, the application presents options 1042, 1044 (only two labeled for brevity) to the user to select a make of the device. In step 1050, the application presents options 1052, 1054 (only two labeled for brevity) to the user to select a carrier/telecommunications service provider.

In step 1060, the application presents options 1062, 1064 (only two labeled for brevity) to the user to select the memory capacity of the device. The application can also query the user whether the target device 240 is currently under contract or is a company phone.

In step 1070, the application presents multiple questions 1072, 1074 (only two labeled for brevity) to prompt the user to describe the condition of the device, such as whether there is a crack on the front glass, crack in the back glass, issues with the display, broken buttons, broken cameras, etc. If in step 1070 the user indicates that the device is in mint condition by, for example, not selecting a "Yes" button 1076 for any of the questions, the application can request the user to provide additional information about the device, as described in FIG. 11 below.

In addition, the application can automatically gather information about the target device 240, thus shortening the user-UI interaction by obtaining parameters directly from the target device 240. To determine whether the device is an Android or an Apple device, the application can determine the operating system (OS) of the target device 240. If the operating system is iOS, the application can determine that the target device 240 is an Apple device. If the operating system is Android, the application can query the manufacturer of the device for the type of the device such as Samsung, Google, HTC, etc.

To determine the make, model, memory capacity, and/or carrier information of the target device 240, the application can obtain information from the target device 240, and can present the determined make, model, memory capacity, and/or carrier information for the user to confirm.

To test the ability of the target device 240 ability to connect over a wireless network, the application can ask the user's permission to automatically dial a number or send a text message. If the call is successfully placed and/or the text is successfully sent, the application can determine that the target device 240 has network capability.

To test whether the target device 240 has logged out of user's personal accounts, such as Gmail and/or iCloud, the application can attempt to access the user's personal accounts automatically. If the login attempts are unsuccessful, the application can determine that the user has successfully logged out of the user's personal accounts.

In step 1080, based on information that the user has provided to the application, the application provides a price estimate 1082 of the device to the user. However, in this case, the price estimate 1082 is not a guarantee of a minimum price that the user is going to receive once the user submits the device for inspection and/or sale. The price estimate 1082 can be reduced once the user submits the device (e.g., the user takes the device to a physical kiosk, mails-in the device to an evaluating entity, submits the device at a physical store, etc.).

Finally, in step 1090, the application can present an alternative offer to the user. For example, as shown in FIG. 10, the offer can be to trade in the device for an upgraded device and receive a discount on the upgraded device. The discount can be higher than the price estimate 1082 received in step 1080. The offer can include credits for unrelated services such as a rideshare (e.g., Uber or a Lyft) ride, various accessories that can be traded for the device, credits towards accessory, gift cards, points, mileage credits, etc. For example, employers can offer trade-in for employee devices in exchange for carbon credits for which the employer can apply. Alternatively, the employer can reimburse employees for the traded-in devices.

FIGS. 11A-11D show a series of user interfaces associated with an application running on an evaluator device to guide the user in evaluating a target device according to some embodiments of the present technology. The application running on the evaluator device 710 can vary the steps of target device 240 evaluation, as explained in FIGS. 11A-11D, depending on what type of target device 240 is being evaluated, what type of damage has been disclosed by the user, etc.

Figure 11A:
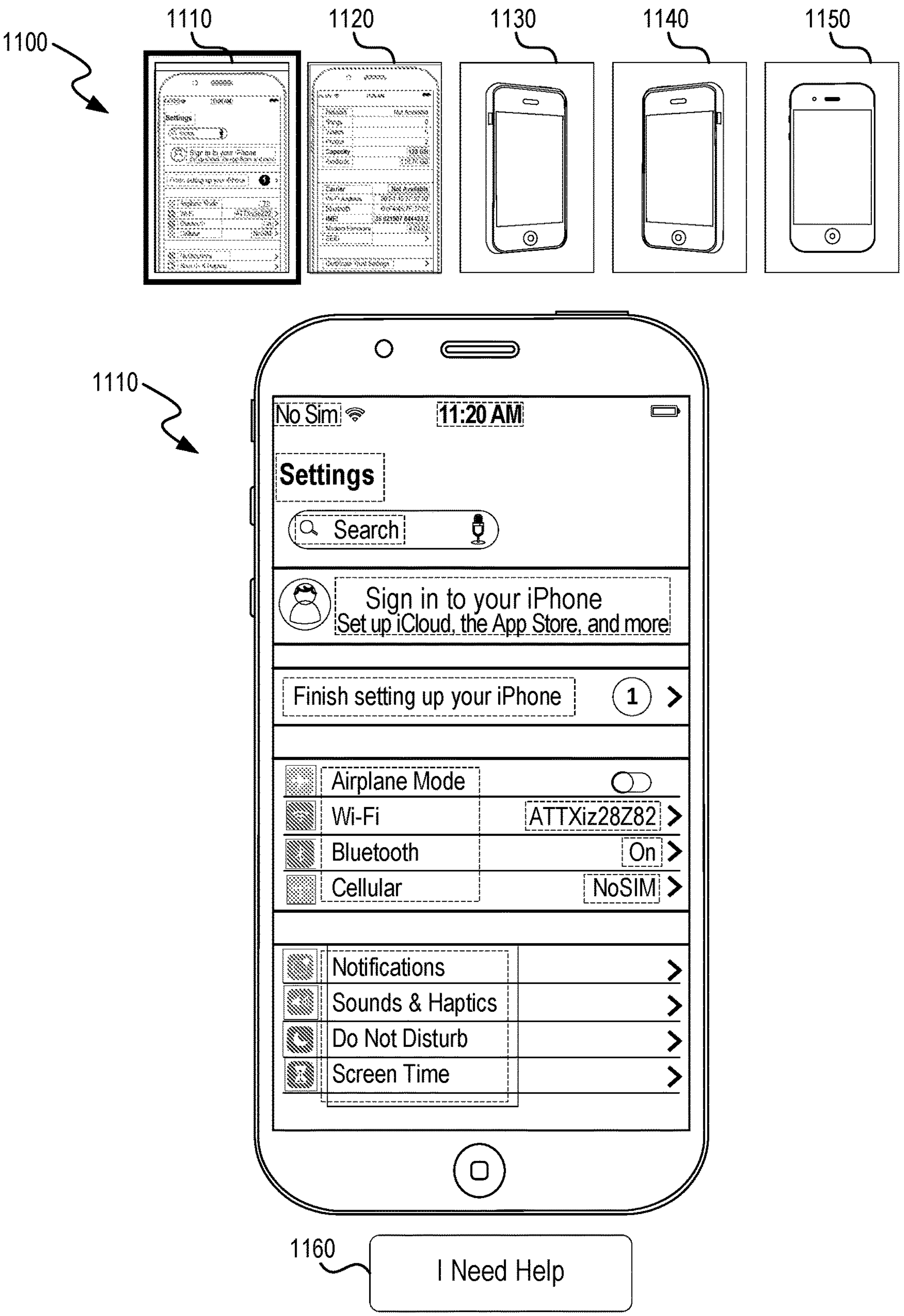
FIGS. 11A-11D show a series of user interfaces associated with an application running on an evaluator device to guide the user in evaluating a target device according to some embodiments of the present technology.

FIG. 11A shows a display of the evaluator device 710 in FIG. 7 showing an initial step in evaluating the target device 240. Display element 1100 can show all the steps needed to complete the evaluation of the target device 240. An image of the current step 1110 can be highlighted to attract the user's attention, while the images of the rest of the steps 1120, 1130, 1140, 1150 can presented to appear less visible, such as by darkening them.

An application running on the evaluator device 710 can direct the user via audio, text, picture, video, or other similar means to logout of the user's personal accounts stored in the target device 240, and to display on the target device 240 an application verifying that the user has been logged out from the user's personal accounts. The user's personal accounts can include iCloud, Google, Dropbox, etc. The application, such as settings, can verify that the user has been locked out from the user's personal accounts. Further, the evaluator device 710 can direct the user, via audio, text, picture, video, or other similar means, to point the camera 750 in FIG. 7 of the evaluator device 710 to the display of target device 240 to record the display created by the verifying application such as Settings.

In addition, the application running on the evaluator device 710 can request the user to factory reset the target device 240. To verify that the target device 240 has gone or is going through the process of factory reset, the camera 750 of the evaluator device 710 can record progress or completion of the factory reset being completed on the target device.

The evaluator device 710 can record a picture (and/or video) of the target device 240 and produce an indication, such as a clicking sound, that the picture has been recorded. The evaluator device 710 can perform optical character recognition (OCR) to determine from the recorded image whether the user has logged out from the user's personal accounts.

In addition, the evaluator device 710 can provide a help button 1160. When the user selects the button 1160, evaluator device 710 can provide more detailed instructions to the user, provide a list of frequently asked questions (FAQ), and/or provide contact information of technical support.

Figure 11B:
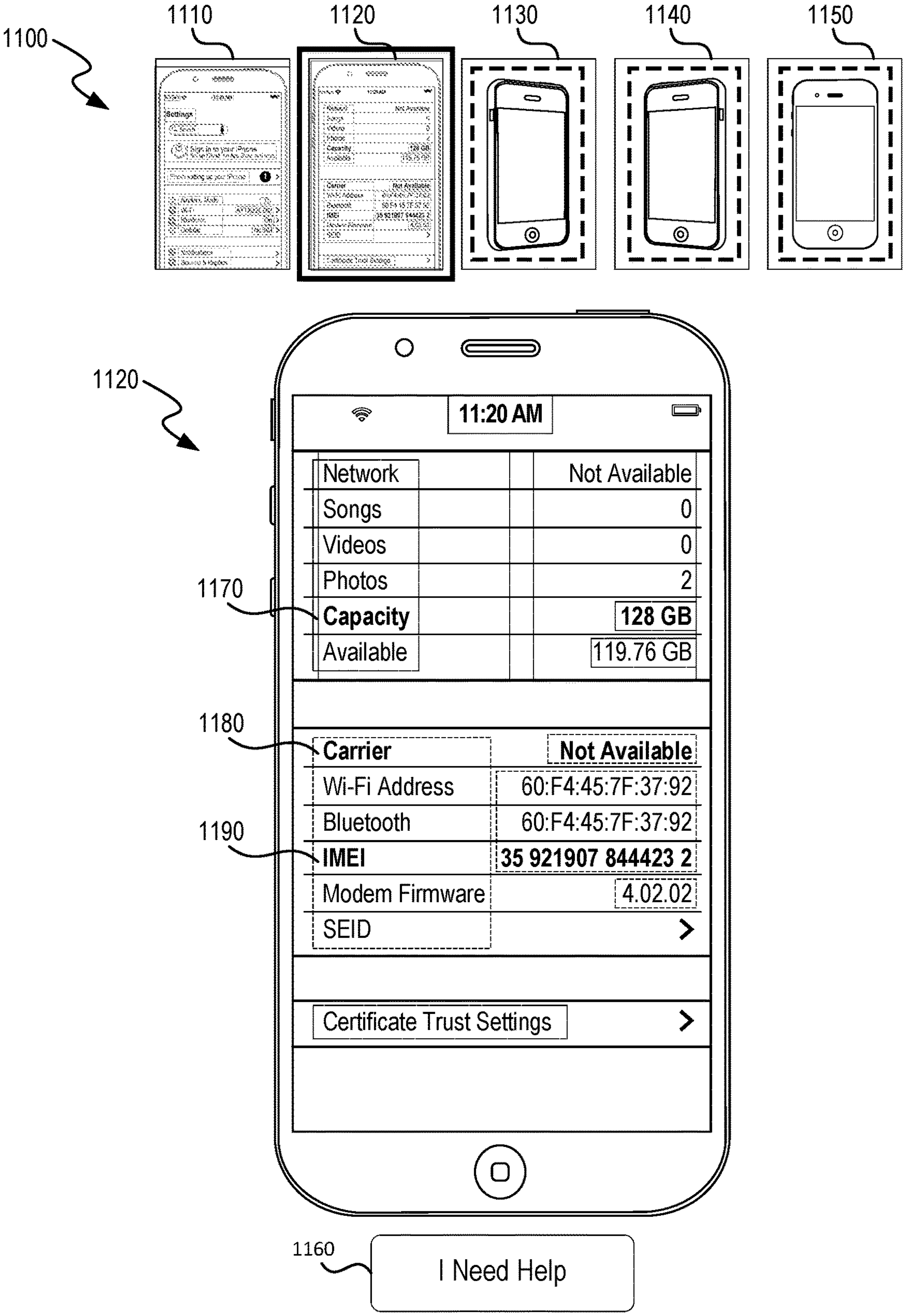

In step 1120 shown in FIG. 11B, the evaluator device 710 can direct the user to display the target device 240's unique identifier 1190, such as primary and secondary International Mobile Equipment Identity (IMEI) for devices with multiple subscriber identity modules (SIMs), Unique Device Identification (UDI), media access control (MAC) address, Bluetooth MAC address, WiFi MAC Address, Universally Unique Identifier (UUID), Internet protocol (IP) Address (ipvc4/6), target device's phone number, target device model and serial numbers, etc. To get the unique identifier 1190, e.g. IMEI, the user can also dial *#06# on the target device 240 to bring up the unique identifier. The evaluator device 710 can perform OCR on the unique identifier 1190.

In addition, the evaluator device 710 can also request information about the capacity 1170 and carrier 1180 of the target device 240, as shown in FIG. 11B. The evaluator device 710 can get the unique identifier 1190 from a previously installed application such as an application installed by a phone manufacturer. To prevent the user from photographing the IMEI of a damaged target device 240 and then taking a video of an undamaged device and attempting to sell the damaged target device 240, the application running on the evaluator device 710 can instruct the user to keep the evaluator device 710 constantly focused on the target device 240. When the app detects that the evaluator device 710 is not constantly (or substantially constantly) focused on the target device 240, it can present an error message to the user (e.g., as an audio alert (e.g. beeping sound), visual alert (e.g., a flashing/blinking light), and so on).

An application running on the evaluator device 710 can direct the user via audio, text, picture, video, or other similar means how to display the information containing the unique identifier 1190, the capacity 1170 and the carrier 1180 on the display of the target device 240. For example, the evaluator device 710 can communicate to the user to go to settings, select the "general" button, and then select "about" to obtain the needed information.

The application running on the evaluator device 710 can direct the user to record a picture of the target device 240 showing the needed information. The evaluator device 710 can produce an indication, such as a sound, that the picture is recorded. Once the picture is recorded, the evaluator device 710 can use OCR to obtain the needed information from the picture.

As described herein, the evaluator device 710 obtains a unique identifier of the target device 240. In some embodiments, the evaluator device 710 determines whether the target device 240 has been evaluated previously based on the unique identifier 1190. Upon determining that the target device 240 has been evaluated previously, the evaluator device 710 retrieves data describing the target device 240 from a database.

Once the evaluator device 710 obtains the unique identifier 1190, the evaluator device 710 can determine whether the unique identifier 1190 has been evaluated before, such as if the user has tried to scan the target device 240 multiple times. If the unique identifier 1190 has been evaluated before, the evaluator device 710 can pre-populate the device information using the previously stored information such as IMEI number, storage capacity, etc. In addition, once the evaluator device 710 has the unique identifier 1190, the evaluator device 710 can gather some info automatically. For example, the evaluator device 710 can query the wireless telecommunication provider database to get additional information about the device, such as technical specifications, age, number of resales, etc.

Figure 11C:
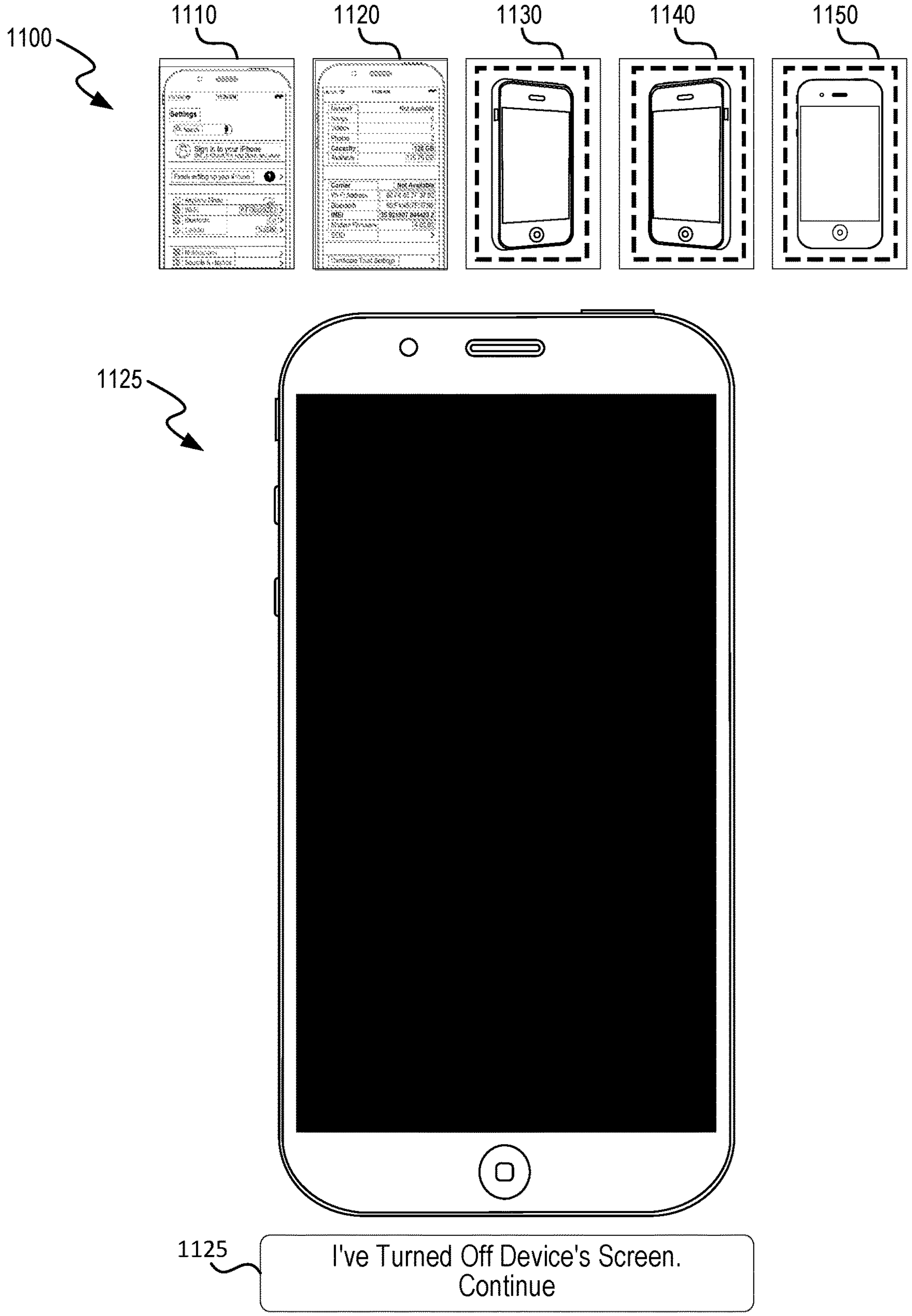

In step 1115, shown in FIG. 11C, the evaluator device 710 can instruct the user to turn off the target device 240's screen prior to proceeding to the final three steps 1130, 1140, 1150. The reason to turn off the target device 240's screen is to increase the visibility of any screen imperfections (e.g., cracks) on the target device 240 in the steps described in FIG. 11D. When the user turns off the display screen, the user can communicate to the evaluator device 710 to move to the final three steps 1130, 1140, 1150 by selecting the button 1125.

Figure 11D:
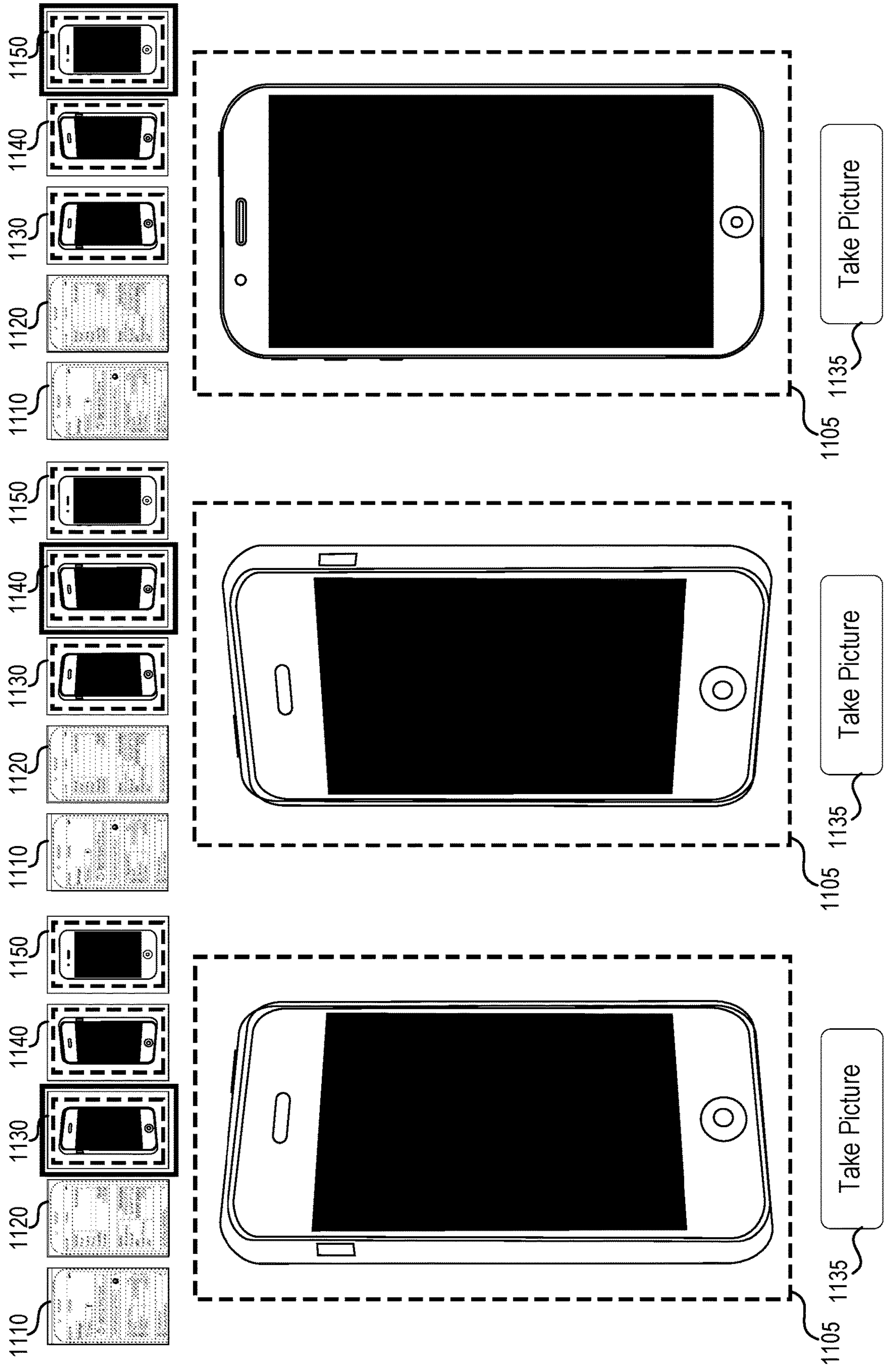

FIG. 11D shows the remaining steps needed to evaluate the target device 240. In these three steps, 1130, 1140, 1150, the application running on the evaluator device 710 directs the user, via audio, text, picture, video, or other similar means, to take several pictures, such as three pictures, of the target device 240, as shown in FIG. 11D. The guide 1105 displayed on the evaluator device 710 indicates how to position the target device 240 within the camera view of the evaluator device 710. The guide 1105 can be any color and/or shape, such as a green rounded rectangle, a red rounded rectangle with broken lines, etc. In some embodiments, no guide is displayed. The pictures can be from approximately a three-quarters view to the left of the target device 240, three-quarters view to the right of the target device 240, and from the front. Additional pictures such as from the back and or the sides can also be taken. In one embodiment, steps 1130, 1140, 1150 can be performed once for the display side of the target device 240, and once for the back side of the target device 240. For example, during evaluation, the evaluator device 710 can ask the user to position the target device 240 to take pictures of the back side of the target device 240, since most devices today have glass backs.

In some embodiments, a remote operator detects that a second device has replaced the target device 240 by analyzing the video. It is determined that the obtained physical properties are inaccurate in response to detecting that the second device has replaced the target device 240. For example, while the user is positioning the target device 240 to take the pictures, unknown to the user, the evaluator device 710 can record a video of the user's actions. The reason that the evaluator device 710 records the video unknown to the user is to prevent the user from switching out the target device 240 with another device (sometimes referred to as a "second device") that is in better condition than the target device 240. While the user is recording a video, a remote operator can receive the video in real time and can detect whether the user has switched out the target device 240 for a device that is in better condition. If the remote operator detects the switch, the remote operator can instruct the evaluator device 710 to abort the evaluation and produce a notification to the user that the evaluation has been aborted. In some embodiments, detecting that the second device has replaced the target device is performed using an artificial intelligence module. For example, the remote operator can be an artificial intelligence module trained to detect the device switch. The artificial intelligence module can also be trained to detect screen and/or device imperfections (e.g., cracks) that may not be otherwise visible in picture format from the recorded video.

The artificial intelligence module is implemented using the components illustrated and described in more detail with reference to FIGS. 7-8. For example, the artificial intelligence module can be implemented on the evaluator device 710 using instructions programmed in the memory 840 illustrated and described in more detail with reference to FIG. 8. Likewise, embodiments of the artificial intelligence module can include different and/or additional components or can be connected in different ways. The artificial intelligence module is sometimes referred to as a machine learning module.

In some embodiments, the artificial intelligence module includes a feature extraction module implemented using the components illustrated and described in more detail with reference to FIG. 8. The feature extraction module extracts a feature vector from the recorded video. The feature extraction module reduces the redundancy in the input data, e.g., repetitive data values, to transform the input data into a reduced set of features. The feature vector contains the relevant information from the input data, such that properties of a target device under evaluation or data value thresholds of interest can be identified by the artificial intelligence module by using this reduced representation. In some example embodiments, the following dimensionality reduction techniques are used by the feature extraction module: independent component analysis, Isomap, Kernel PCA, latent semantic analysis, partial least squares, principal component analysis, multifactor dimensionality reduction, nonlinear dimensionality reduction, Multilinear Principal Component Analysis, multilinear subspace learning, semidefinite embedding, Autoencoder, and deep feature synthesis.

In alternate embodiments, the artificial intelligence module performs deep learning (also known as deep structured learning or hierarchical learning) directly on input data to learn data representations, as opposed to using task-specific algorithms. In deep learning, no explicit feature extraction is performed; features are implicitly extracted by the artificial intelligence module. For example, the artificial intelligence module can use a cascade of multiple layers of nonlinear processing units for implicit feature extraction and transformation. Each successive layer uses the output from a previous layer as input. The artificial intelligence module can thus learn in supervised (e.g., classification) and/or unsupervised (e.g., pattern analysis) modes. The artificial intelligence module can learn multiple levels of representations that correspond to different levels of abstraction, wherein the different levels form a hierarchy of concepts. In this manner, the artificial intelligence module can be configured to differentiate features of interest from background features.

In some embodiments, the artificial intelligence module, e.g., in the form of a convolutional neural network (CNN)

generates output, without the need for feature extraction, directly from input data. The output is provided to the evaluator device 710. A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

In some embodiments, the artificial intelligence module is trained based on training data, to correlate the feature vector to expected outputs in training data. The training data includes a positive training set of features that have been determined to have a desired property in question, and, in some embodiments, a negative training set of features that lack the property in question. Machine learning techniques are used to train the artificial intelligence module, that when applied to a feature vector, outputs indications of whether the feature vector has an associated desired property or properties, such as a probability that the feature vector has a particular Boolean property, or an estimated value of a scalar property. The artificial intelligence module can further apply dimensionality reduction (e.g., via linear discriminant analysis (LDA), principle component analysis (PCA), or the like) to reduce the amount of data in the feature vector to a smaller, more representative set of data.

Supervised machine learning can be used to train the artificial intelligence module, with feature vectors of the positive training set and the negative training set serving as the inputs. In some embodiments, different machine learning techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set is formed of additional features, other than those in the training data that have already been determined to have or to lack the property in question. The artificial intelligence module can apply a trained machine learning model to the features of the validation set to quantify the accuracy of the machine learning model. Common metrics applied in accuracy measurement include: Precision and Recall, where Precision refers to a number of results the artificial intelligence module correctly predicted out of the total it predicted, and Recall is a number of results the artificial intelligence module correctly predicted out of the total number of features that did have the desired property in question. In some embodiments, the artificial intelligence module is iteratively re-trained until the occurrence of a stopping condition, such as the accuracy measurement indication that the artificial intelligence module is sufficiently accurate, or a number of training rounds having taken place.

Returning now to FIGS. 11A-11D, when the user positions the device according to the instructions, the user can select the button 1135, and the evaluator device 710 can indicate that the picture has been taken by, for example, producing a clicking sound, even though the evaluator device 710 is recording a video. The reason to indicate that the picture has been taken is to lead the user to believe that the app is recording pictures, thus leading the user who wants to switch out the target device 240 to be less careful when switching the devices.

When recording the video in steps 1130, 1140, 1150, the evaluator device 710 can have the flashlight 770 in FIG. 7 on, so that any fractures on the target device 240 reflect the flashlight and create highlights, which can be detected as cracks on the target device 240. In one embodiment, the application running on the evaluator device 710 can check whether the target device 240 has a white frame around the display. If the target device 240 has a white frame, the application can perform steps 1130, 1140, 1150 twice, once with the flashlight 770 on, and once with the flashlight 770 off.

If the evaluator device 710 determines that the target device 240 has a white or gray border or back, the evaluator device 710 can choose to not turn on the flashlight because the flashlight helps with detecting highlights and/or glints of the cracked glass when the glass is over a black sub-surface, e.g. LCD. However, when the cracked glass is on top of a white or a gray surface, the evaluator device 710 can detect drop shadows on top of the white or gray surface. In that case, turning on the flashlight can deter the detection of the drop shadows by illuminating them and washing them out. Consequently, the evaluator device 710 can ask the user to take two pictures of a single side of the target device 240, such as a front side or the backside of the target device 240. The first picture can be taken with the flashlight, and the second picture can be taken without the flashlight.

Steps 1110, 1120, 1130, 1140, 1150 can be repeated numerous times, independently of each other. For example, step 1110 can be repeated three or four times, while steps 1130, 1140, 1150 are repeated twice. The number of pictures taken and the number of videos taken can vary depending on the information provided by the user, and information detected in the pictures and videos recorded. For example, if the remote operator detects a potential crack in the front of the screen based on a video of the front of the screen, the remote operator can request an additional video recording of the front of the screen under different lighting conditions.

As explained in this application, the evaluator device 710 can be, for example, a laptop, or a desktop, and the user can receive a quote for the target device 240 using a web browser running on the evaluator device 710. The evaluator device 710 can ask the user's permission to turn on the camera 750 of the evaluator device 710. If the user approves, the browser tells the user to move the target device 240 through the various positions so the fixed camera 750 can record the video for the remote operator such as an AI to analyze. In this scenario, the user can optionally place a flashlight (e.g., the flash of a working phone) resting on the screen 714 of their evaluator device 710, facing the user, so that the camera 750 can better record any cracks in the target device 240.

Figure 12:
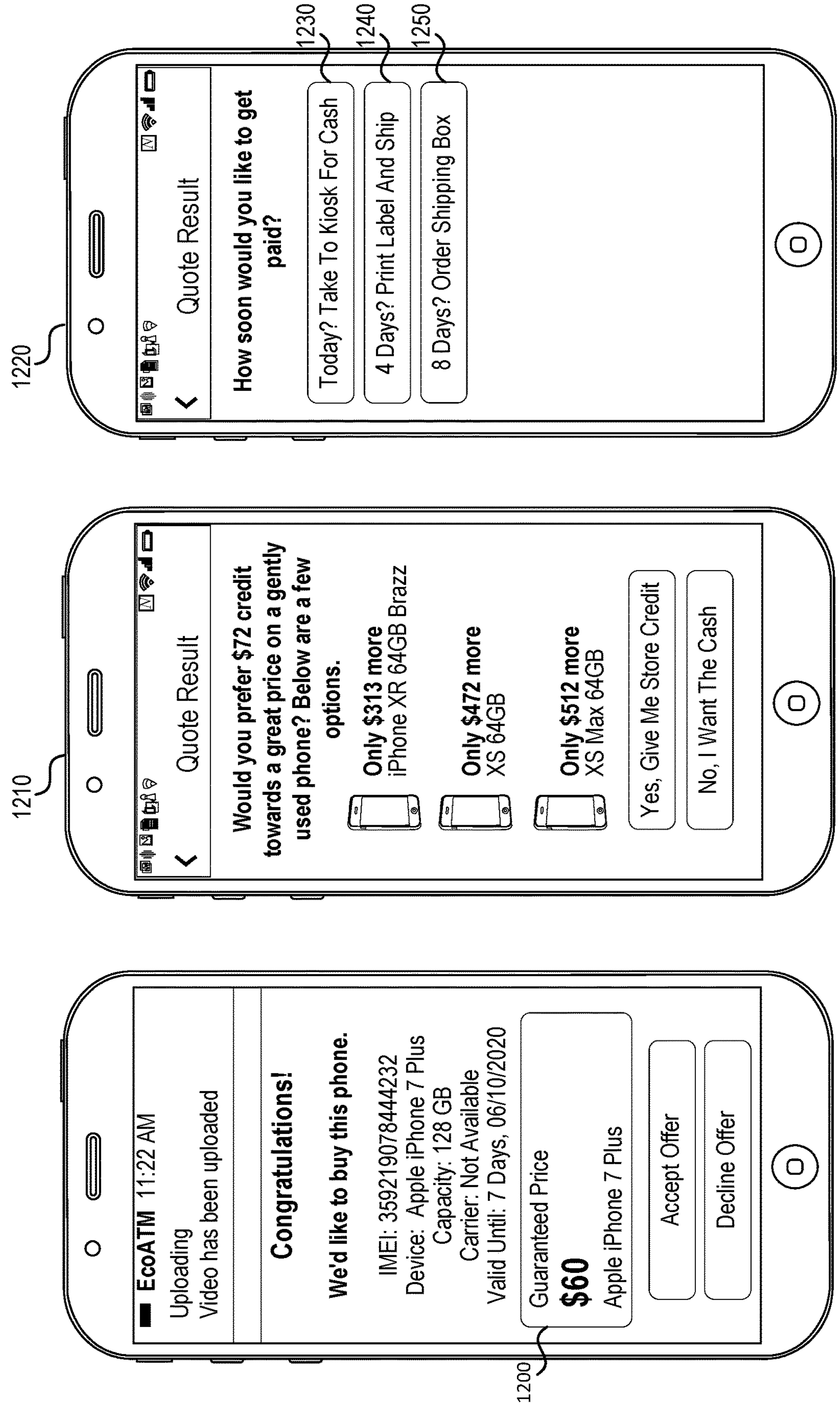
FIG. 12 shows a series of user interfaces that display a guaranteed price and various payment options according to some embodiments of the present technology.

FIG. 12 shows a series of user interfaces that display a guaranteed price and various payment options according to some embodiments of the present technology. After performing the target device 240 evaluation, the application running on the evaluator device 710 can present a guaranteed price 1200 to the user. If the user refuses the guaranteed price 1200, the application running on the evaluator device 710 can present an option to the user to explain the reasoning behind the offer price, such as a crack in the target device 240 was detected. If the user accepts the guaranteed price 1200, in step 1210, the application can offer to the user store credit such as store points, a gift card, a better quality device, device accessories, credits for unrelated services such as an Uber or a Lyft ride, points, mileage credits, etc.

In step 1220, the application can present to the user options 1230, 1240, 1250 on how to receive payment. None of the options 1230, 1240, 1250 require further investigation of the target device 240, because the guaranteed price 1200 is an accurate quote.

If the user selects option 1230, the user can take the target device 240 to a store or a kiosk (e.g., the kiosk 100) and receive cash payment. The kiosk or a device at the store can read the target device 240's IMEI, electrically or via OCR. The kiosk or the device at the store can pay the user without needing to do any further interrogation. Consequently, kiosks or devices at the store do not have to include any grading capabilities and can be cheap devices that confirm IMEI and identity and pay customers.

If the user selects option 1240, the user can print the label and ship the target device 240 to the store or the kiosk. The cost of the shipping can be subtracted from the guaranteed price 1200. If the user selects the third option 1250, the user can receive a shipping box with the shipping label. The cost of the box and the shipping label can also be subtracted from the guaranteed price 1200. Alternatively, the user can receive payment for the target device 240 from a third party such as a GrubHub™, Uber™, or Lyft™ driver that comes to pick up the target device 240 and take the target device 240 to a store or a kiosk for a nominal fee.

The user can increase the evaluation of the target device 240 by testing the target device 240's touchscreen functionality, display quality, Wi-Fi, camera, microphone, GPS, etc. To test additional functionality, the application running on the evaluator device 710 can display a code, such as a QR code. The application running on the evaluator device 710 can instruct the user, via audio, video, text, picture or other similar means, to point a camera of the target device 240 toward the code.

Once the target device 240 scans the code, the target device 240 can execute instructions to test the target device 240's touchscreen functionality, display quality, network access such as data, Wi-Fi, camera, microphone, GPS, etc. The instructions can be provided to the target device 240 through an application installed on the target device 240 or can be provided to the target device 240 when the target device 240 visits a specified webpage.

Figure 13:
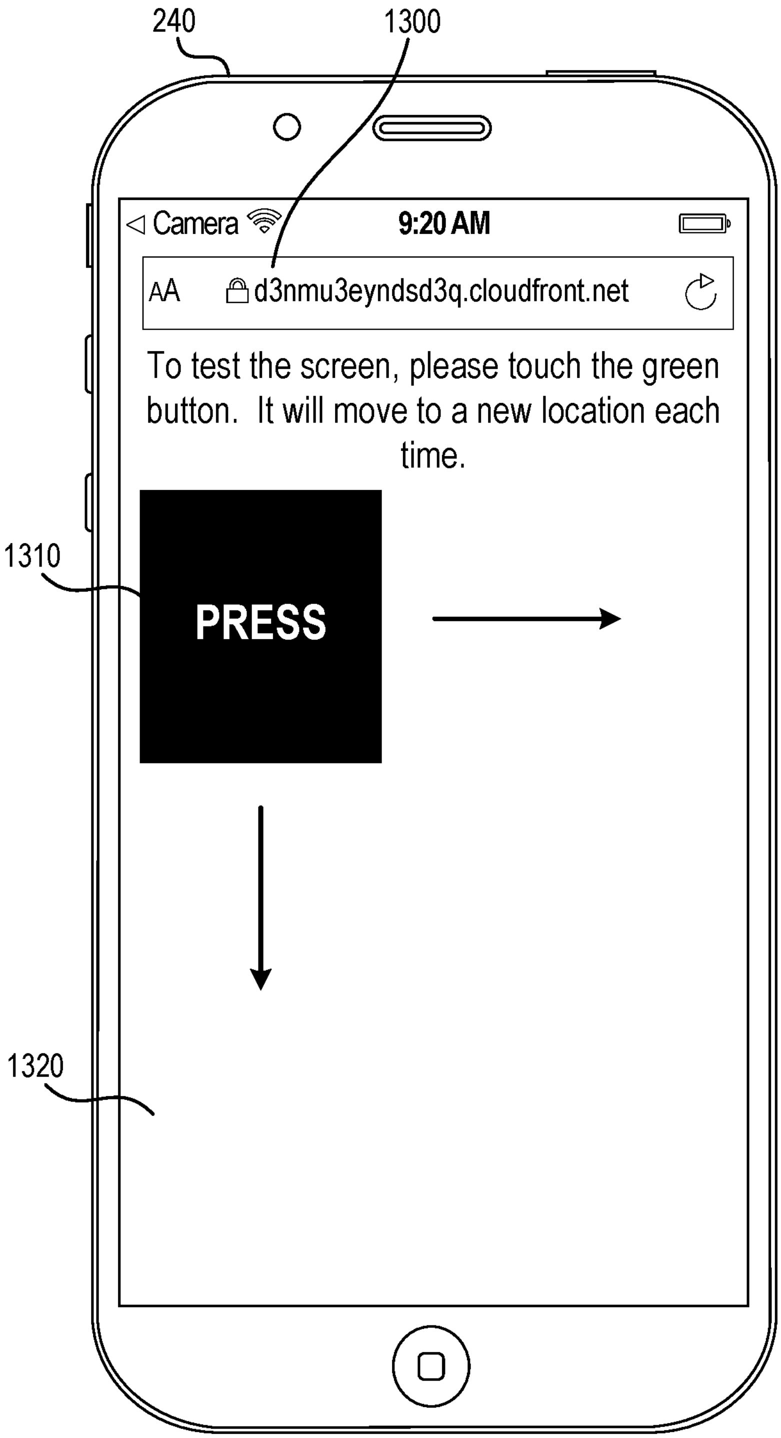
FIG. 13 shows a user interface that displays tests of the target device including touchscreen functionality according to some embodiments of the present technology.

FIG. 13 shows a user interface that displays tests of the target device 240 including touchscreen functionality according to some embodiments of the present technology. The user can run the tests if the user has selected "Sell This Phone" 910 in FIG. 9, or "Sell Another Phone" 920 in FIG. 9.

If the user selects the "Sell This Phone" and completes the self-evaluation, e.g. the evaluator device 710 in FIG. 13 determines the make and model of the target device 240 in FIG. 7, the evaluator device 710 can choose to run the tests described in FIGS. 13-16 based on the make and model of the target device 240. For example, if the target device 240 is a more expensive device, such as an iPhone™ 11 Pro Max, the evaluator device 710 can run the tests in FIGS. 13-16. If the target device 240 is a less inexpensive device, such as an iPhone™ 5, the evaluator device 710 can skip the tests in FIGS. 13-16.

If the user selects "Sell Another Phone" 920, the evaluator device 710 can run the tests in FIGS. 13-16, and the applications on the evaluator device 710 and the target device 240 can communicate with each other to determine the final price 1200. The target device 240 can report its condition, and with that data, the evaluator device 710 can determine the final price.

To run the tests on the target device 240, in one embodiment, the evaluator device can ask the user to download the test application to the target device 240, where the test application is configured to run the tests. In other embodiments, to streamline the process, and not require the user to download another application, the evaluator device 240 can show a QR code on its screen and ask the target device 240 to point the target device 240's camera at the QR code. When the target device 240 detects the QR code, the target device 240 can launch a web browser and take the user to a website. The website, via HTML5 and Javascript, can run one or more of the tests in FIGS. 13-16 via the target device 240's browser.

The evaluator device 710 can run the tests in FIGS. 13-16, either before or after providing the quote 1082 in FIG. 10, 1200 in FIG. 12. For example, if the evaluator device 710 runs the tests in FIGS. 13-16 before providing the quote 1082, the evaluator device 710 can offer the user the highest price. In another example, evaluator device 710 can run the tests in FIGS. 13-16 only after providing the quote 1082, 1200 and the user declines the quote. After the user declines the quote, the evaluator device 710 can try to win the user back by offering a chance for a higher quote, such as by asking "Want $10 more?" If the user indicates that they do want a higher quote, the evaluator device 710 can run the tests in FIGS. 13-16.

To test network access of the target device 240, the target device 240 can be asked to access a particular webpage 1300. If the target device 240 successfully accesses the webpage 1300, that is an indication that the target device 240 has functioning network access. To test the camera of the target device 240, the target device 240 scans a QR code that can initiate testing of other functionalities of the target device 240.

To test the touchscreen functionality, the target device 240 can display a square 1310, that can move horizontally and vertically across the screen 1320. In each position of the square 1310, the target device 240 can ask the user to select the square 1310. The target device 240 can determine whether the selection was detected, and whether the selection matches the location of the square 1310. If the selection matches the location of the square 1310 for all positions of the square 1310 across the screen 1320, the target device 240 can determine that the touchscreen functionality works.

Figure 14:
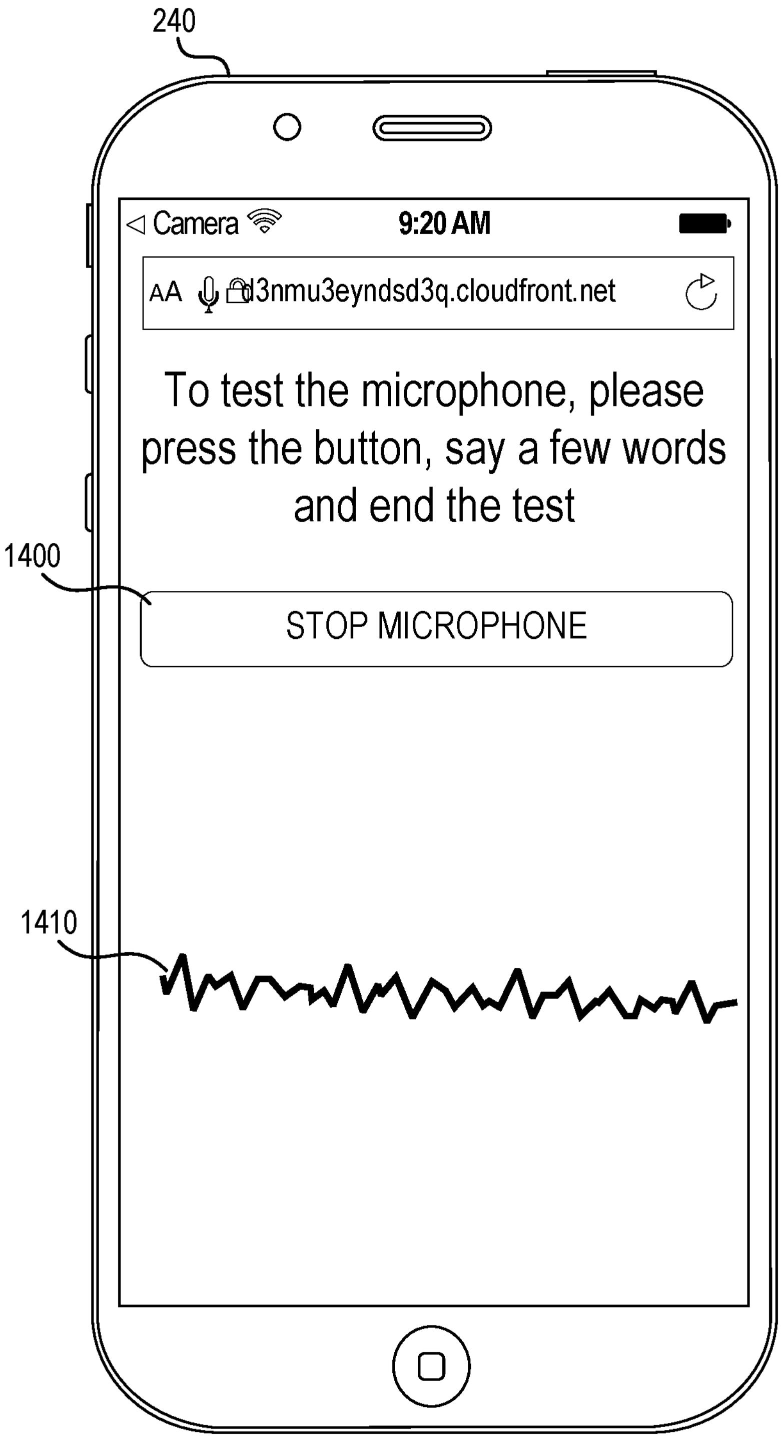
FIG. 14 shows a user interface that displays a test of the microphone of the target device according to some embodiments of the present technology.

FIG. 14 shows a user interface that displays a test of the microphone of the target device 240 according to some embodiments of the present technology. The target device 240 or the evaluator device 710 can instruct the user, via audio, video, text, picture or other similar means, how to test the microphone. For example, the target device 240 can provide a button to start the test and record the audio, and a button 1400 to stop the test. The target device 240 can display a visualization 1410 of the recorded audio.

Figure 15:
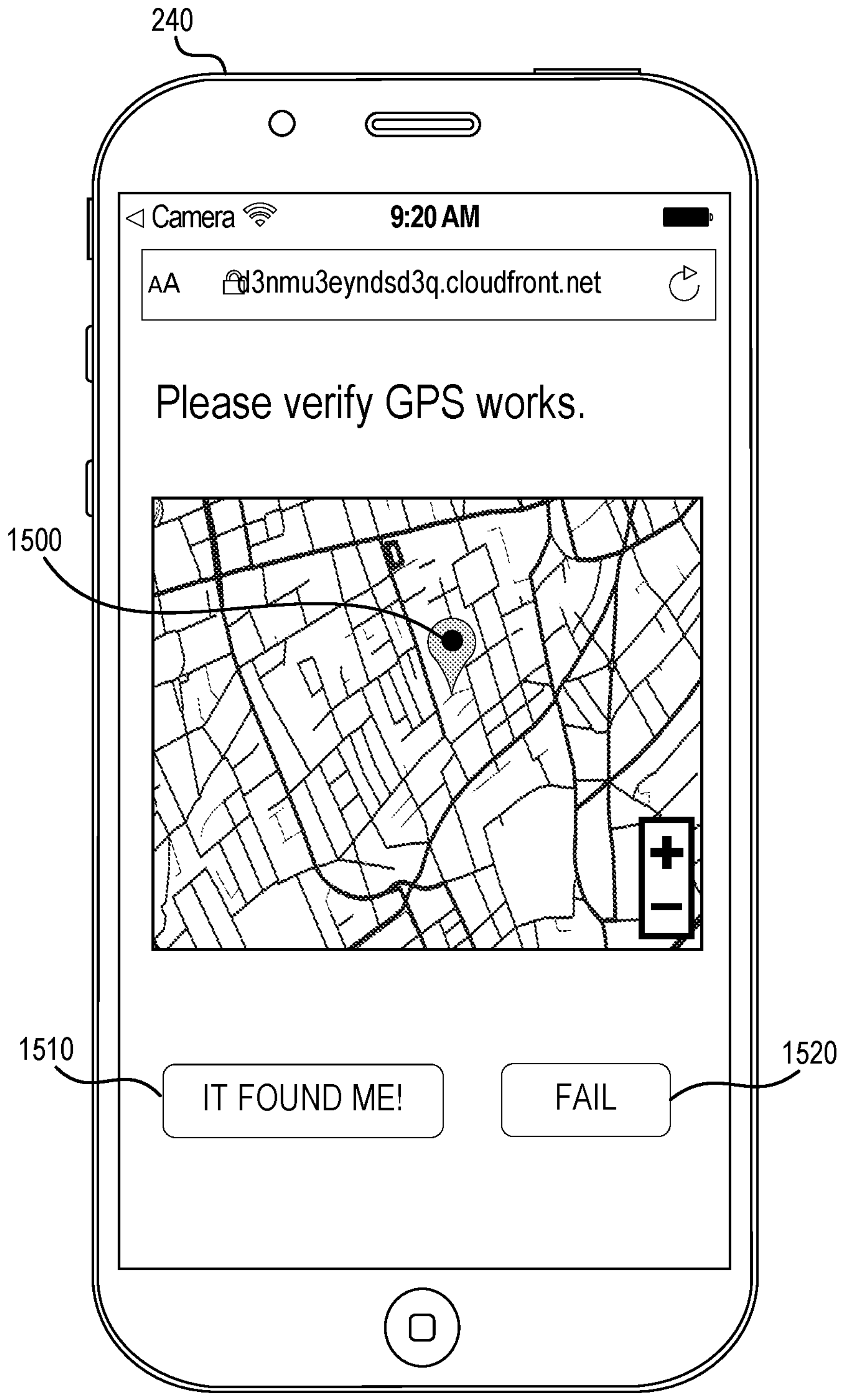
FIG. 15 shows a user interface that displays a test of the global positioning system (GPS) of the target device according to some embodiments of the present technology.

FIG. 15 shows a user interface that displays a test of the GPS of the target device 240 according to some embodiments of the present technology. The target device 240 can test the GPS by determining the location of the target device 240 using the GPS and communicating the location of the target device 240 to the user, via audio, video, text, picture or other similar means. For example, the target device 240 can display the detected location 1500 of the target device 240 on a map. The target device 240 can request a confirmation from the user, such as using buttons 1510, 1520 or an audio communication.

Figure 16:
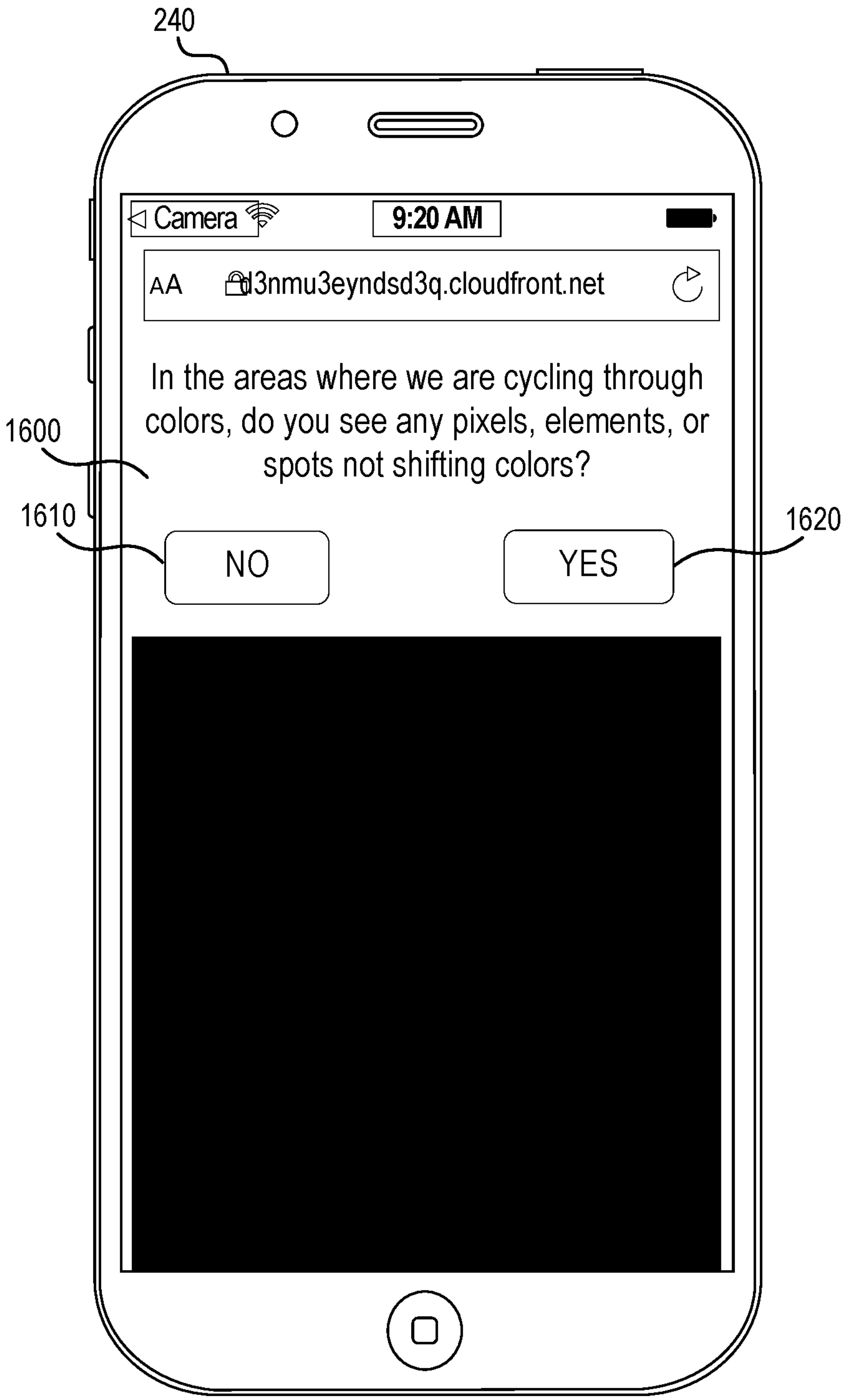
FIG. 16 shows a user interface that displays a test of the display of the target device according to some embodiments of the present technology.

FIG. 16 shows a user interface that displays a test of the display of the target device 240 according to some embodiments of the present technology. The target device 240 can display the colors, such as red, blue, and green, on the display screen 1600 of the target device 240. The target device 240 can present a query to the user, via audio, video, text, picture or other similar means, such as: "in the areas where we are cycling through colors, do you see any pixels, elements, or spots that are not shifting colors?". The user can respond to the query using buttons 1610, 1620, or by using audio communication.

Figure 17:
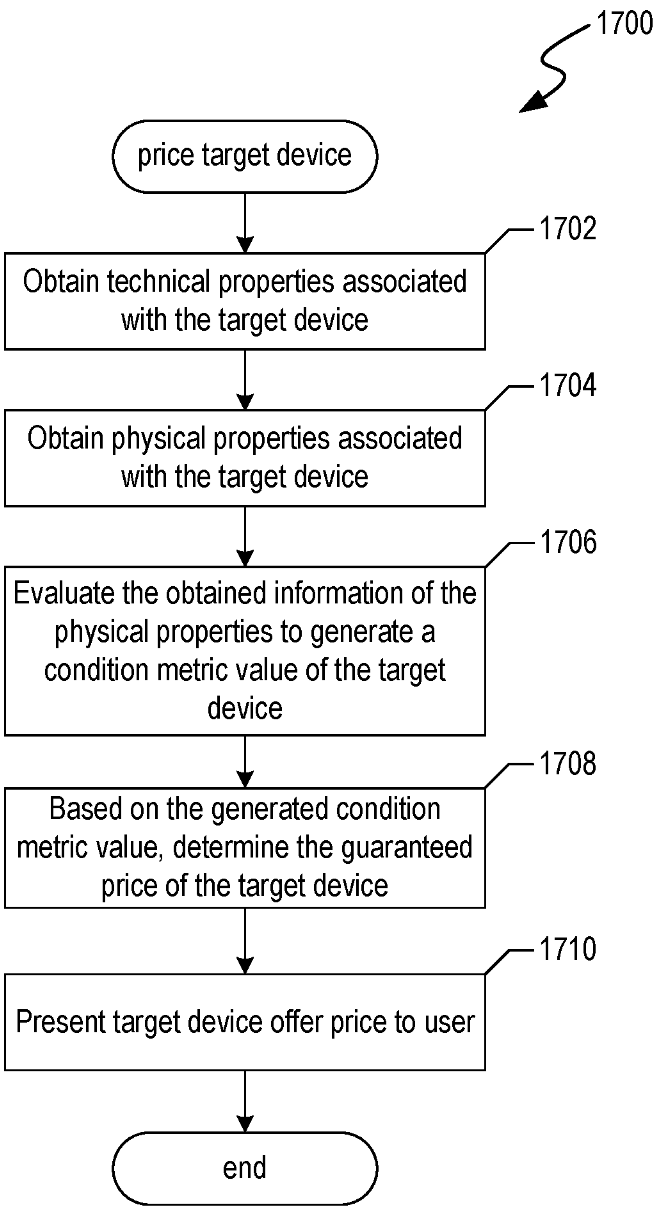
FIG. 17 is a high-level flow diagram of a routine to generate a guaranteed price of a target device (e.g., a mobile phone, tablet computer, thumb drive, television, SLR, etc.) for recycling in accordance with some embodiments of the present technology.

FIG. 17 is a high-level flow diagram of a routine 1700 to generate a guaranteed price of a target device 240 (e.g., a mobile phone, tablet computer, thumb drive, television, SLR, etc.) for recycling in accordance with some embodiments of the present technology. In various embodiments, an app running on an evaluator device (e.g., the evaluator device 710 of FIG. 7) such as a mobile phone or computer, and/or another processing device operatively connectable to the app, such as a remote computer (e.g., a server), can perform some or all of the routine 1700. In some instances, for example, a user who owns a target device 240 (e.g., a game console, laptop, etc.) may want to know how much the target device 240 is worth so that he or she can decide whether to sell it. The routine 1700 of FIG. 17 enables the user to use another electronic device (e.g., the evaluator device 710) to quickly obtain a current price for the target device 240, without requiring the user to bring the target device 240 to a recycling kiosk 100, a retail outlet, or another location, and without requiring the user to manually provide information about the target device 240 and its configuration.

In various embodiments, the routine 1700 and the other flow routines described in detail herein can be implemented by an evaluator device 710 running an app that can obtain information about a connected target device 240. The target device 240 may be, for example, one of various consumer electronic devices, such as a used mobile telecommunication device, which includes all manner of handheld devices having wired and/or wireless communication capabilities (e.g., a smartphone, computer, television, game console, home automation device, etc.). In some embodiments, the user downloads the app to the evaluator device 710 from an app store or other software repository associated with the device manufacturer or a third party (e.g., the Apple® Appstore™, Google Play™ store, Amazon® Appstore™, and so on), from a website, from a kiosk such as the kiosk 100 (e.g., sideloading an app over a wired or wireless data connection), from a removable memory device such as an SD flashcard or USB drive, etc. In other embodiments, the app is loaded on the evaluator device 710 before it is first acquired by the user (e.g., preinstalled by the device manufacturer, a wireless service carrier, or a device vendor).

In block 1702, the evaluator device 710 can obtain technical properties associated with the target device 240. The technical properties can include make and model of the device, computation capacity of the device, memory capacity of the device, carrier providing data, and/or cellular connectivity to the device, etc.

In block 1704, the evaluator device 710 can obtain physical properties associated with the target device 240. The physical properties can include wear and tear of the target device 240. To obtain the physical properties, the evaluator device 710 can instruct a user of the target device 240 to position the target device 240 in multiple predetermined positions, such as front, back, sides; three-quarter view from the top, bottom, and left of the front; and/or three-quarter view from the top, bottom, and left of the back of the target device 240.

While obtaining the physical properties of the target device 240, the evaluator device 710 can indicate to the user that the evaluator device 710 has recorded an image of each of the multiple predetermined positions. The indication can include a click, a voice explaining that the picture has been taken, or a visual display indicating that the picture has been taken. In addition, the evaluator device 710 can record a video of handling of the target device 240 while the target device 240 is being positioned into the multiple predetermined positions, without informing the user that the video is being recorded. By not informing the user that the video is being recorded, the user who wants to commit fraud, and for example, switch the target device 240 with a second device in a better condition, is less careful, and can switch out the devices between pictures. However, because the evaluator device 710 is recording a video, the evaluator device 710 can record the switching out of the devices.

In block 1706, the evaluator device 710 can evaluate the obtained information of the physical properties to generate a condition metric value of the target device 240 by analyzing the video. The condition metric value can indicate the wear and tear of the target device 240. The condition metric value can be a numerical value indicating the condition of the target device 240 in a predetermined scale, such as a scale from 1 to 100, where 100 indicates mint condition, and 1 indicates that a replacement needed. The condition metric value can be a vector or a matrix, indicating the condition of the device for various factors. For example, the condition metric value can be a vector (50, 10, 70 . . . ), where the first entry indicates the condition of the screen, the second entry indicates the condition of the battery, the third entry indicates the memory capacity of the device, etc. The condition metric value to generate a condition metric value of the target device 240 can also be a scalar value representing a weighted sum of the vector entries.

To determine the wear and tear of the target device 240, the evaluator device 710 can activate its flashlight to illuminate the target device 240, prior to or while the target device 240 is positioned into the multiple predetermined positions. The flashlight can create highlights, or glints, in the cracks on the surface of the target device 240. The evaluator device 710 can detect the highlights, or glints, appearing on a surface of the target device 240.

The video analysis can be performed by a remote operator such as an AI. The AI can detect an inaccurate determination of the wear and tear of the target device 240 by detecting from the video whether a second device has replaced the target device 240. If the AI detects a switch in the devices, the AI can alert the user and/or a system administrator that a switch has been detected.

In block 1708, based on the generated condition metric value, the evaluator device 710 can determine the guaranteed price of the target device 240, as explained in this application. In block 1710, the evaluator device 710 can present to the user the guaranteed price of the target device 240.

The evaluator device 710 can determine whether the target device 240 has been evaluated previously, such as by determining whether the unique device identifier has been previously evaluated by the system. Upon determining that the target device 240 has been evaluated previously, the evaluator device 710 can obtain from a database, properties of the target device 240 and can populate the technical properties and the physical properties from the data contained in the database.

FIG. 17 and the flow diagrams that follow are representative and may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Those skilled in the art will appreciate that the blocks shown in FIG. 17 and in each of the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 17 and the other flow diagrams are of a type well known in the art, and can themselves include a sequence of operations that need not be described herein. Those of ordinary skill in the art can create source code and/or microcode, program logic arrays, or otherwise implement the embodiments disclosed herein based on the flow diagrams and the Detailed Description provided herein.

In various embodiments, all or a portion of the routine 1700 and the routines in the other flow diagrams herein can be implemented by means of a consumer or another user (such as a retail employee) operating one or more of the electronic devices and systems described above. For example, in some embodiments, the routine 1700 and other routines disclosed herein can be implemented by a mobile device, such as the evaluator device 710 described above with reference to FIG. 7. For example, in some instances the app can run on one or more evaluator devices 710 and/or on one or more target devices 240. Accordingly, the description of the routine 1700 and the other routines disclosed herein may refer interchangeably to the routine, the app, the evaluator device 710, the target device 240, and/or the kiosk 100 performing an operation, with the understanding that any of the above devices, systems, and resources can perform all or part of the operation.

While various embodiments of the present technology are described herein using mobile phones and other handheld devices as examples of electronic devices, the present technology applies generally to all types of electronic devices. For example, in some embodiments, the app can be installed and/or run on a larger evaluator device 710 and/or target device 240, e.g., a laptop or tower computer, to perform all or a portion of the routine 1700. For example, the app can inventory a laptop or desktop computer and provide the user a confirmation code that the user can print out and bring to a kiosk or to an associated retailer location or point of sale (or send in with the computer via, e.g., courier, mail, or package delivery service) as a receipt. The code can identify the target device 240 and represent the agreed price determined according to the valuation performed by the app based on the information it obtained from the target device 240 and on any user-provided supplemental information. In some embodiments, the app and/or the receipt can indicate any elements that require independent verification (e.g., undamaged screen glass) for the user to receive the agreed price for the target device 240. The user can then take the target device 240 to the retail storefront or point of sale (or, e.g., to the kiosk 100 for viewing by a remote kiosk operator) for its condition to be independently verified, after which the user can deposit the target device 240. The user can then receive the price upon verified receipt of the target device 240, such as a retailer or the kiosk 100 issuing cash, a credit, or a card such as a gift card.

Figure 18:
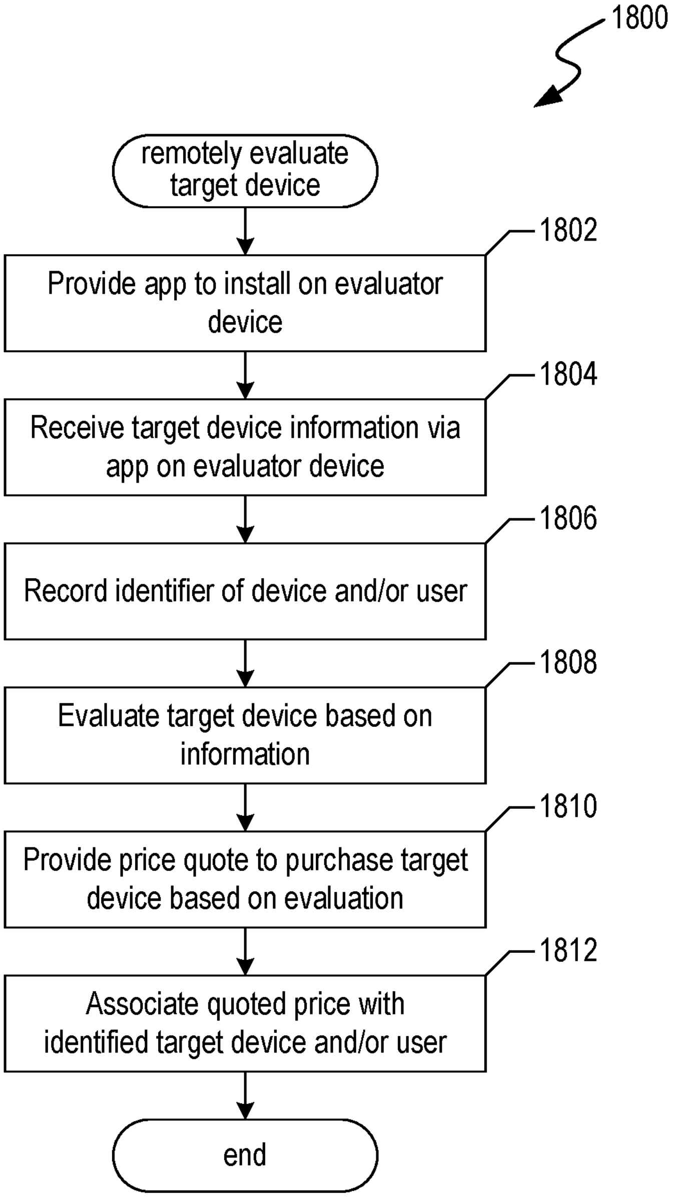
FIG. 18 is a flow diagram of a routine for remotely evaluating a target device for recycling in accordance with some embodiments of the present technology.

FIG. 18 is a flow diagram of a routine 1800 for remotely evaluating a target device 240 for recycling in accordance with some embodiments of the present technology. In various embodiments, the kiosk 100 and/or another processing device operatively connectable to the kiosk 100, such as a remote server, can perform some or all of the routine 1800. In some embodiments, the routine 1800 can be performed in conjunction with the routine 1700 of FIG. 17 performed by the evaluator device 710, which can be remote from the kiosk 100. For example, the kiosk 100 and/or a remote server can provide software (e.g., the app described above) to be installed on the evaluator device 710, and then the kiosk and/or server can remotely receive information about the target device 240 via the app installed on the evaluator device 710, use the information to provide an offer price for the target device 240, and record the offer price so that the user can recycle the target device 240 for the quoted offer price when the user brings the target device 240 to the kiosk 100.

In block 1802, the routine 1800 provides the app described above to install on the evaluator device 710. The routine 1800 can provide the app to the evaluator device 710 by various avenues: for example, from the kiosk 100 (e.g., sideloading the app over a wired or wireless data connection); through a website (e.g., a website associated with the kiosk operator); from a software repository run by the device manufacturer or a third party (e.g., the Apple® Appstore™, Google Play™ store, Amazon® Appstore™, etc.); via a removable memory device such as an SD flashcard or USB drive; by preinstallation on the evaluator device 710 by the device manufacturer, a wireless service carrier, or a device vendor; and so on.

In block 1804, the routine 1800 receives information about the target device 240 and/or the user via the app on the evaluator device 710. The information can include, for example, a device identifier such as a serial number, IMEI number, or hardware address; a device make and/or model name, number, or code; data describing the device configuration, characteristics, and/or capabilities; owner information, such as a name, driver's license number, and/or account identifier; etc. For example, the user may download and run the app on the evaluator device 710 to obtain such information about the target device 240, and the app can store information about the target device 240, and/or transmit the information, for example, to a remote server computer. In various embodiments, the routine 1800 can access the stored or transmitted information, such as by receiving the information at the server computer.

In block 1806, the routine 1800 records one or more identifiers of the target device 240 (and/or the evaluator device 710) and/or the user. In some embodiments, the routine 1800 utilizes an identifier associated with the target device 240 that was included in the information that the routine 1800 received in block 1804. Examples of such target device 240 identifiers include the IMEI of a mobile phone, the model and/or serial numbers of a laptop computer, a unique wireless identifier of the target device 240 such as a Wi-Fi interface MAC address, a product bar code, USB vendor ID and device ID (and release number) codes, etc. The identifier can also be a derived code such as a unique hash (based on, e.g., the information received in block 1804), and/or a serially or randomly assigned code such as by generating a globally unique identifier (GUID)

for the target device 240 and/or user. In some embodiments, the routine 1800 can generate an identifier after pricing the target device 240, so that the identifier reflects the pricing. User-related identifiers can include, for example, a driver's license number, account credentials such as a username and password, etc. The routine 1800 can record the identifiers in a registry database that indexes identifiers against, for example, evaluator devices 710 to which the app has been installed, target devices that the system has priced (e.g., remotely via the app), and/or target devices that the kiosk 100 has previously evaluated, for example. The database can be, for example, one or more of the databases associated with the server computer, can be stored in the cloud storage facility, can be distributed among the kiosks 100, and so on.

In block 1808, the routine 1800 evaluates the target device 240 based on the information. For example, the routine 1800 can compare the received target device 240 information to a database of prices, such as a lookup table, pricing model, or other data structure containing prices for various target devices on a server that can be remotely located from the evaluator device 710 and/or the target device 240 (e.g., the server computer). The routine 1800 can, for example, use the identifier to determine the make and model of the target device 240, and use the make and model of the target device 240 (along with, e.g., information about the condition of the target device 240) to determine a price to offer for the device based on the data in the database or pricing model. In some embodiments, the routine 1800 can determine an offer price that enables the user to receive the price in exchange for recycling the target device 240 at the kiosk 100. In some embodiments, the routine 1800 can determine an offer price for the target device 240 that is contingent on an assessment of the visual condition of the target device 240 by the evaluator device 710 or by the kiosk 100. In some embodiments, the routine 1800 can determine an offer price that includes a range of prices based on the possible outcomes of such an assessment. In some instances, the target device 240 may have no market value. In various embodiments, the pricing data is updated on a continuous or periodic basis.

In block 1810, the routine 1800 sends an offer price quote for the target device 240 to the evaluator device 710. In some embodiments, the routine 1800 sends the offer price quote from the server to the app running on the evaluator device 710. In block 1812, the routine 1800 associates the quoted price with the identified target device 240 (and/or the evaluator device 710) and/or the user. For example, the routine 1800 can store information about the price quote, the target device 240, and/or the user in the database and/or in one or more data structures maintained by the app on the evaluator device 710, by the kiosk 100, and/or by other aspects of the present technology. In some embodiments, the routine 1800 can associate the price with a unique identifier such as a hash value generated based on the user, the device identification, the app, and/or the time and amount of the price itself, etc. For example, the routine 1800 can associate a numeric or alphanumeric identifier code with the offer price for the target device 240 and give that code to the user, informing the user that the user can enter the code at the kiosk 100 by a certain time to receive the offer price for the device. For example, the routine 1800 can display the code on the screen 715 of the evaluator device 710 and/or send the user an email or text message containing the code. The routine 1800 can store the price and the identifier in a data structure on the evaluator device 710 (e.g., in a table maintained by the app) and/or remotely from the evaluator device 710 (e.g., in a data structure maintained at one or more of the kiosk 100, the server computer, the cloud storage facility, etc.), and it can transmit them between or among various computing and/or storage facilities. In some embodiments, the routine 1800 transmits the identifier to the server computer so that when the kiosk 100 receives the identifier, the kiosk 100 can look up the identifier and retrieve the associated price for the target device 240. After block 1812, the routine 1800 ends.

Figure 19:
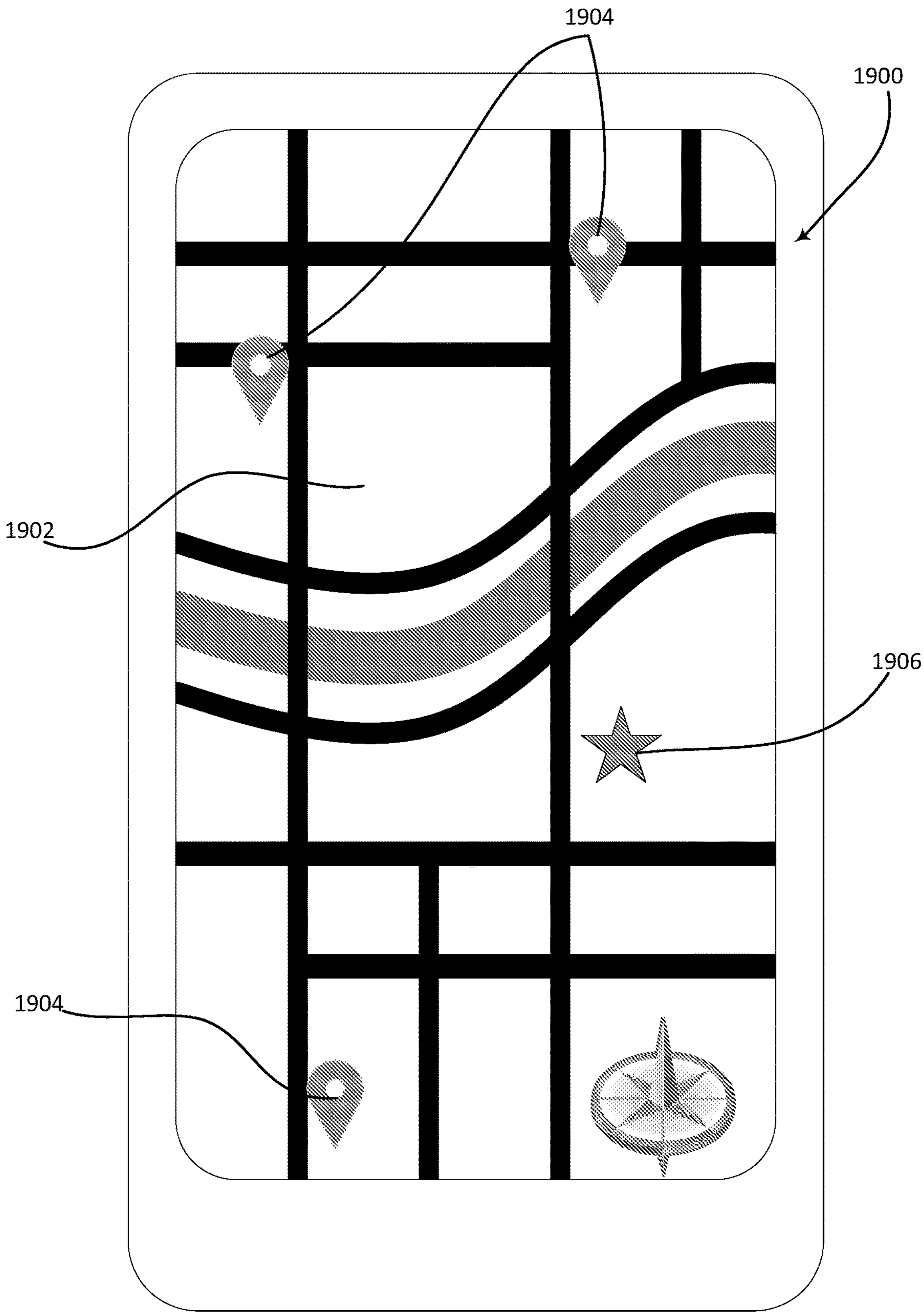
FIG. 19 is a schematic diagram of a mobile application displayed on an electronic device in accordance with embodiments of the present technology.

Returning to FIG. 6, in some embodiments, after the user has obtained an estimated value for their device, the process 600 continues by the user identifying a target kiosk (e.g., a kiosk that is near the user) at which the user can complete the trade-in, sale, donation, or other transaction associated with their device (block 604). In some embodiments, the target kiosk is the kiosk closest to the user at the time the use is searching for a kiosk. The user could identify the closest kiosk by use of, for example, a mobile application that provides directions to the nearest kiosk. An example interface or display page 1900 of such a mobile application is illustrated in FIG. 19. In the illustrated embodiment, the display page 1900 includes a map 1902 of nearby kiosks 1904. In other embodiments, a suitable display page can include a list (e.g., a list of addresses), and/or other graphical and/or textual descriptions of the location of one or more nearby kiosks 1904, including the closest kiosk (e.g., a target kiosk 1906). The kiosks 1904, 1906 can be the same as, or at least generally similar in structure and function, to the kiosk 100 described herein. The display page 1900 can be displayed, for example, on the user's electronic device for which the value was previously estimated or on another electronic device (e.g., the evaluator device 710).

After the user has identified and traveled to the target kiosk, the process 600 continues by the user initiating a transaction with the target kiosk (which will be referred to hereinafter as "the kiosk 100" for ease of reference) (block 606). Initiating a transaction with the kiosk 100 can include interacting with one or more user interfaces of the kiosk described above. For example, the user may be asked to place the mobile phone they wish to sell or otherwise recycle into the kiosk 100 (e.g., onto the inspection plate 122 in the inspection area of the kiosk) via the access door 112 (FIG. 1A) (block 608). In some embodiments, the kiosk 100 presents a label to the user (e.g., via the label outlet 115) to attach to the mobile phone. For example, the label may identify the phone with a unique identifier from a previous analysis performed via a mobile application, as described above. After the device has placed in the inspection area, the access door 112 closes (e.g., to close access to the inspection area from outside of the kiosk 100) and the kiosk 100 evaluates the electronic device as described above with reference to, e.g., FIGS. 2A and 2B. Upon evaluation of electronic device (to, e.g. confirm the identity, condition, and/or price of the device), the kiosk 100 can offer the user a price for the device (via, e.g., the display 108; FIG. 1A). As noted above, if the kiosk 100 is able to confirm the identity and condition of the device, then the price offered to the user may be the price previously estimated for the device by use of, e.g., a mobile application. The user then decides whether or not to accept the price (decision block 610). If the user accepts the price, the kiosk 100 can dispense payment (e.g., cash, coupon, voucher, code, etc.) to the user, or the kiosk 100 can implement or otherwise initiate an electronic payment to, e.g., an account of the user (block 614). Collecting payment can, in some embodiments, be performed while the user is at the kiosk 100. For example, the user may collect cash, a voucher, a receipt, and/or other form of payment directly from the kiosk 100. In some embodiments, payment is provided via electronic funds transfer and/or at a later time (e.g., subject to inspection of the electronic device by a remote evaluator). If the user declines the offer, the access door 112 (FIG. 1A) opens and the user retrieves the electronic device from the kiosk 100 (block 612).

In some embodiments, the kiosk 100 is configured to accept an electronic device for which a previous estimate has not been provided or obtained. For example, in the context of the above-described process 600 of FIG. 6, the user may approach a kiosk 100 and begin the process at block 606 without having previously obtained an estimate for their electronic device. The user may insert one or more electronic devices into the kiosk (decision block 608) and the kiosk may proceed to confirm the make, model, or other characteristic of the device(s). For example, the kiosk 100 may determine the make and model of the device(s) via observance of an IMEI number or other identifier on a display screen of the electronic device. The kiosk 100 may offer a pre-set price or other offer (e.g., an offer to recycle the device) for the electronic device. This offer may be for a lower amount than would be offered if the user were to obtain an evaluation of the device before approaching the kiosk 100.

Figure 20:
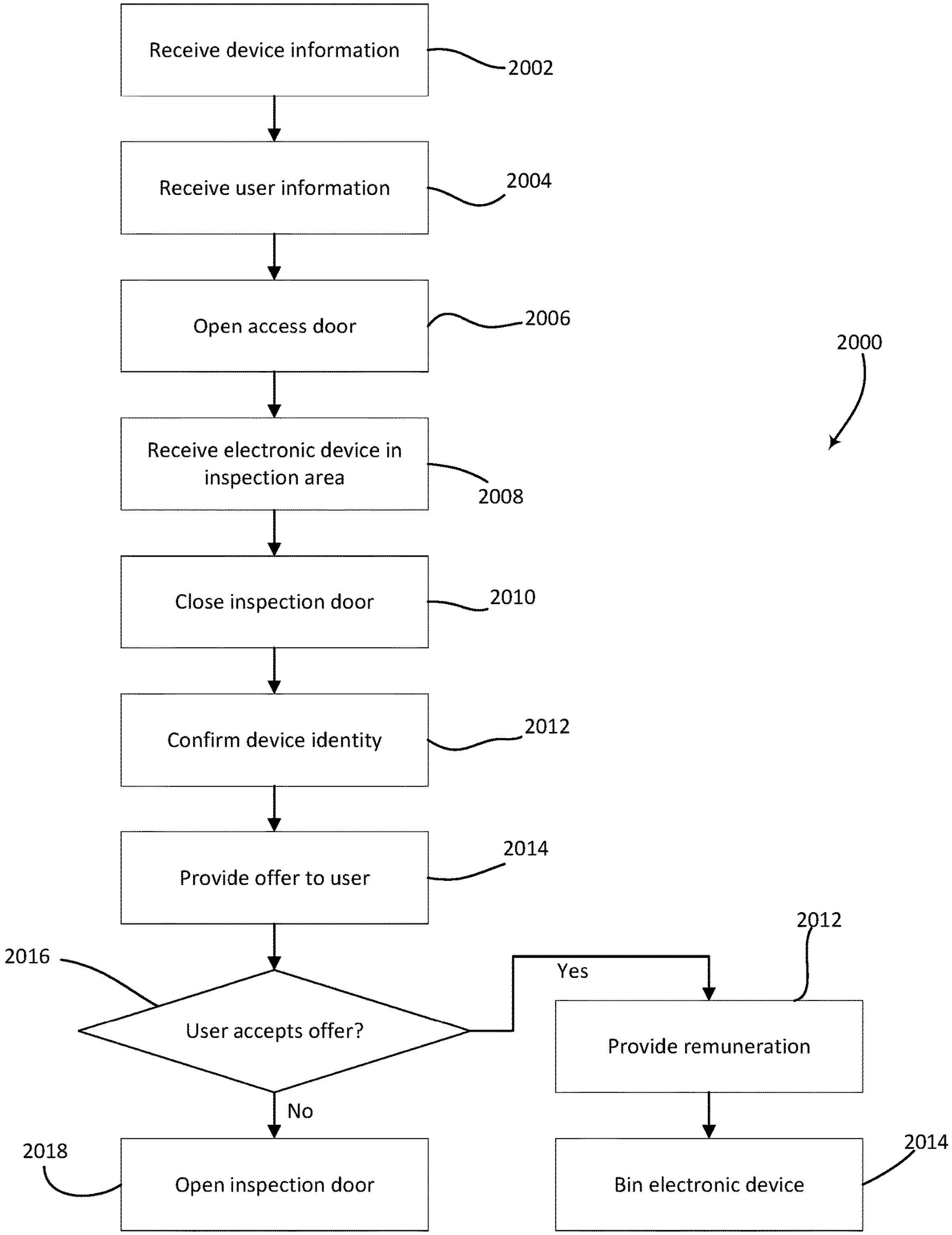
FIG. 20 is a flow diagram illustrating a process performed by the kiosk of FIG. 1A in accordance with embodiments of the present technology.

In some embodiments, the kiosk 100 can include one or more lockers or other storage receptacles configured to store new and/or used electronic devices for purchase. The locker(s) can integrated into the kiosk 100, attached to the kiosk 100, or positioned near the kiosk 100 at an installation site. A user may pre-purchase an electronic device or purchase an electronic device at the kiosk 100. U.S. Patent Application Nos. 62/950,075, filed Dec. 18, 2019 and Ser. No. 16/788,169, filed Feb. 11, 2020, each of which is incorporated by reference herein in its entirety and made part of the present disclosure, discuss kiosks having associated lockers and other structures configured to sell and/or refurbish electronic devices for sale FIG. 20 is a flowchart illustrating process 2000 for purchasing, recycling, and/or donating mobile devices that can be performed by the kiosk 100 and/or other systems described herein in accordance with embodiments of the present technology. The process 2000 can include receiving device information (block 2002). The device information can include one or more unique identifiers (e.g., an IMEI number, unique code, and/or other unique identifier) associated with electronic device. As described above, the kiosk 100 can include one or more cameras (e.g., camera 124) configured to capture the unique identifier on a screen of the electronic device when the electronic device is positioned within the inspection area 120 of the kiosk 100. In some embodiments, the unique identifier can be provided by the user via one or more user interfaces (e.g., touchscreens, keypads, or other interfaces) of the kiosk. In some embodiments, the process 2000 also includes receiving user information (block 2004). For example, receiving user information can include scanning a user's driver's license or other ID (e.g., via the card reader) and/or photographing or recording video of the user (e.g., via the camera(s) 110*a*-*b*), or otherwise recording information about the user.

After receiving the device and/or user information, the kiosk 100 opens the access door 112 (block 2006) so that the user can place the electronic device in the inspection area of the kiosk 100 (block 2008). In some embodiments, the kiosk 100 is configured to only open access door 112 after receiving the device information. In some configurations, the kiosk 100 closes the access door 112 after receiving the electronic device in the inspection area (block 2010). The kiosk 100 can be configured confirm the device identity. In some embodiments, the access door 112 remains open while the kiosk 100 confirms the device identity and does not shut until and unless the user accepts an offer for payment/recycling of the electronic device. The device identify can be confirmed, for example, via one or more cameras (e.g., the camera 124; FIG. 2B) (block 2012). For example, the kiosk can capture one or more images or videos of the screen of electronic device to capture an IMEI number or other unique identification of the electronic device (from, e.g., the settings page). OCR and/or other techniques can be used to automatically process the images/videos and identify the unique identification of the electronic device.

The kiosk can be configured to provide an offer to the user (block 2014) in exchange for the electronic device. The offer can include an offer of monetary payment for the device via, e.g., cash, electronic payment, a voucher for trade-in value toward a new device, etc. In some embodiments in which the device is of little or no resale value, the kiosk can offer to responsibly recycle the device and provide the user with, e.g., tax documentation so that the user can receive a tax credit for recycling the device. The kiosk 100 determines whether the user has accepted the offer (block 2016). Confirmation of the user's decision can be obtained via, e.g., user interaction with one or more touchscreens, buttons, or other user interfaces presented on the display 108 of the kiosk 100. If the user rejects the offer, the kiosk 100 can open the access door 112 to allow the user to remove the electronic device from the inspection area (block 2018). Conversely, if the user accepts the offer, the kiosk 100 can provide remuneration consistent with the previously-provided offer as described above (block 2012). The remuneration may be provided immediately. In other embodiments, the kiosk communicates to the user that the remuneration will be provided at a later date (e.g., contingent on device identification and/or condition confirmation by a remote operator). In some embodiments where the access door 112 remains open until acceptance of the offer, the kiosk 100 can reconfirm the identity of the electronic device when the access door 112 closes. The kiosk 100 also transfers the electronic device to one of the bins 130*a, b* after the user accepts the offer (block 2014), and the process is complete.

The foregoing description of the electronic device recycling system 500 illustrates but one possible network system suitable for implementing the various technologies described herein. Accordingly, those of ordinary skill in the art with appreciate that other systems consistent with the present technology can omit one or more of the facilities described in reference to FIG. 5 or can include one or more additional facilities not described in detail in FIG. 5.

Although specific circuitry is described above, those or ordinary skill in the art will recognize that a microprocessor-based system could also be used where any logical decisions are configured in software. The foregoing discussions of FIGS. 4 and 5 provide a brief, general description of a suitable computing environment in which the present technology can be implemented. Although not required, aspects of the present technology are described in the general context of computer-executable instructions, such as routines executed by a general-purpose data processing device, e.g., a server computer, wireless device or personal computer. Those skilled in the relevant art will appreciate that aspects of the present technology can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

As discussed above, as an alternative to retailer trade-in or buyback programs, consumers can recycle and/or sell their used mobile phones using self-service kiosks located in malls, retail stores, or other publicly accessible areas. Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers all types of cameras GPS devices; set-top boxes; universal remote controls; wearable computers; etc. In some embodiments, it is contemplated that the kiosk 100 can facilitate selling and/or otherwise processing larger consumer electronic devices, such as desktop computers, TVs, game consoles, etc., as well smaller electronic devices such as Google® Glass™, smartwatches (e.g., the Apple Watch™, Android Wear™ devices such as the Moto 360®, or the Pebble Steel™ watch), etc. Embodiments of the kiosk 100 and various features thereof can be at least generally similar in structure and function to the systems, methods and corresponding features described in the following patents and patent applications, which are incorporated herein by reference in their entireties: U.S. Pat. Nos. 10,860,990, 10,853,873, 10,572,946, 10,475,002; 10,445,708; 10,438,174; 10,417,615; 10,401,411; 10,269,110; 10,127,647; 10,055,798; 9,885,672; 9,881,284; 8,200,533; 8,195,511; and 7,881,965; U.S. patent application Ser. Nos. 17/445,799; 17/445,178; 17/445,158; 17/445,083; 17/445,082; 17/125,994; 16/794,009; 16/788,169; 16/788,153; 16/719,699; 16/794,009; 16/534,741; 15/057,707; 14/967,183; 14/966,346; 14/964,963; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; 13/113,497; U.S. Provisional Application Nos. 63/220,890, 63/220,381, 63/127,148, 63/116,020; 63/116,007; 63/088,377; 63/070,207; 63/066,794; 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

Aspects of the invention can be embodied in a special purpose computer or data processor that is specifically programmed, configured, or constructed to perform one or more of the computer-executable instructions explained in detail herein. While aspects of the present technology, such as certain functions, are described as being performed exclusively on a single device, the present technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the present technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

EXAMPLES

Several aspects of the present technology are set forth in the following examples.

1. A consumer-operated kiosk for receiving an electronic device from a user, the kiosk comprising:
   a housing having a volume of less than two cubic feet, the housing having an opening in a wall thereof;
   an inspection area within the housing and accessible through the opening, the inspection area configured to receive the electronic device from the user;
   an access door configured to selectively block the opening to close access to the inspection area from outside of the housing;
   an inspection plate within the inspection area, the inspection plate configured to support the electronic device within the inspection area;

a first deflecting plate positioned at least partially below the inspection plate within the housing;

a second deflecting plate positioned at least partially below the first deflecting plate; and a storage bin positioned at least partially below the second deflecting plate;

wherein— the inspection plate is configured to tilt to cause the electronic device to fall toward the first deflecting plate;

the first deflecting plate is configured to redirect the electronic device downward; and the second deflecting plate is configured to redirect the electronic device toward the storage bin.

2. The kiosk of example 1, further comprising a camera within the housing and having a field of view that includes the inspection plate, wherein the camera is configured to capture images and/or video of the electronic device while the electronic device is positioned on the inspection plate.

3. The kiosk of example 2 wherein the camera is mounted to an interior sidewall of the housing and is aligned at a non-vertical angle.

4. The kiosk of example 3 wherein an angle between the sidewall and the alignment of the camera is between 10°-35°.

5. The kiosk of any of examples 2-4 wherein the inspection plate is at least partially transparent and the camera is positioned below the inspection plate to view the electronic device through the inspection plate.

6. The kiosk of any of examples 1-5 wherein the inspection plate is configured to tilt about an axis of rotation non-parallel to a front wall of the housing.

7. The kiosk of example 6 wherein the axis of rotation of the inspection plate is perpendicular to the front wall of the housing.

8. The kiosk of any of examples 1-7, further comprising a third deflecting plate positioned at least partially below the first deflecting plate and configured to redirect the electronic device from the first deflecting plate toward the second deflecting plate.

9. The kiosk of example 8 wherein the third deflecting plate is positioned directly below the inspection plate.

10. The kiosk of any of examples 1-9 wherein:

the storage bin is a first storage bin, the kiosk further comprises a second storage bin positioned adjacent the first storage bin within the housing;

the second deflecting plate is configured to rotate between a first position and a second position;

in the first position, the second deflecting plate directs the electronic device toward the first storage bin; and in the second position, the second deflecting plate directs the electronic device toward the second storage bin.

11. The kiosk of any of examples 1-10 wherein the housing has a volume of less than 0.75 cubic feet.

12. The kiosk of any of examples 1-11 wherein the storage bin comprises:

a first sidewall;

a second sidewall opposite and facing the first sidewall; and a first set of flexible fingers extending from the first sidewall toward the second sidewall, wherein the flexible fingers are configured to— flex when contacted by an electronic device dropped into the bin, and to reduce the likelihood that an electronic device passing through the storage bin lands on a lateral side of the electronic device.

13. The kiosk of example 12 wherein the storage bin comprises a second set of flexible fingers extending from the second sidewall toward the first sidewall.

14. A consumer-operated kiosk for receiving an electronic device from a user, the kiosk comprising:

a housing having an inspection area therein;

an inspection plate within the inspection area, the inspection plate configured to support the electronic device within the inspection area;

a deflecting plate positioned at least partially below the inspection plate within the housing;

a first storage bin positioned at least partially below the deflecting plate;

a second storage bin positioned adjacent the first storage bin and at least partially below the deflecting plate; and a processor operably connected to the inspection plate and to the deflecting plate, wherein the processor is configured to execute computer readably instructions to— cause the inspection plate to tilt to direct the electronic device toward the deflecting plate;

cause the deflecting plate to move between— a first position wherein the deflecting plate directs the electronic device toward the first storage bin; and a second position wherein the deflecting plate directs the electronic device toward the second storage bin.

15. The kiosk of example 14 wherein the processor is configured to detect when the first storage bin is filled with electronic devices, and wherein the processor causes the deflecting plate to move to the second position when the first storage bin is full.

16. The kiosk of examples 14 or 15, further comprising an access door configured selectively open and close access to the inspection area from outside of the kiosk, wherein the processor is operably connected to the access door, and wherein the processor is configured to cause the access door to open if a user rejects an offer for purchase of the electronic device during a transaction at the kiosk.

17. A method of processing an electronic device using a consumer-operated kiosk, the method comprising:

providing a user with an estimated value of the electronic device via a software application executed on a processor of a mobile device;

identifying a target kiosk location and conveying the location to the user via the software application;

receiving the electronic device on an inspection plate within an inspection area of the target kiosk, the target kiosk having an internal volume of less than two cubic feet;

tilting the inspection plate to cause the electronic device to move toward a deflecting plate in the kiosk;

redirecting, using the deflecting plate, the electronic device toward a storage bin within the kiosk.

18. The method of example 17, further comprising moving the deflecting plate to direct the electronic device to one of a first storage bin or a second storage bin.

19. The method of examples 17 or 18, further comprising visually inspecting the electronic device through the inspection plate using a camera mounted to an interior wall of the kiosk, the camera mounted at an angle between 10°-35° with respect to the internal wall.

20. The method of any of examples 17-19, further comprising dispensing remuneration to the user.
21. The method of any of examples 17-20, further comprising causing the electronic device to land on a front side of back side of the electronic device at the bottom of the storage bin using one or more flexible fingers extending from one or more internal walls of the storage bin.

CONCLUSION

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes are at times described as being performed in series, these processes may instead be performed or implemented in parallel or performed at different times.

The teachings of the present technology provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. For example, the kiosk 100 may not include the screen 108. In some such embodiments, a user may interact with the kiosk via a mobile application installed on the electronic device of the user. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A consumer-operated kiosk for receiving an electronic device from a user, the kiosk comprising:
- a housing having an opening in a wall thereof;
- an inspection area within the housing and accessible through the opening;
- an access door configured to selectively block the opening to close access to the inspection area from outside of the housing;
- an inspection plate within the inspection area, the inspection plate configured to receive and support the electronic device thereon at a receiving position relative to the housing within the inspection area;
- a camera positioned within the housing and having a field of view that includes the inspection plate, wherein the camera is configured to capture images and/or video of the electronic device while the electronic device is supported on the inspection plate and at the receiving position;
- a first deflecting plate positioned at least partially below the inspection plate within the housing;
- a second deflecting plate positioned at least partially below the first deflecting plate; and
- a storage bin positioned at least partially below the second deflecting plate;
- wherein—
  - the inspection plate is configured to tilt to cause the electronic device to move from the receiving position toward the first deflecting plate;
  - the first deflecting plate is configured to direct the electronic device downward; and
  - the second deflecting plate is configured to direct the electronic device toward the storage bin.

2. The kiosk of claim 1 wherein the camera is mounted to an interior sidewall of the housing and is aligned at a non-vertical angle.

3. The kiosk of claim 2 wherein an angle between the sidewall and the alignment of the camera is between 10°-35°.

4. The kiosk of claim 1 wherein the inspection plate is at least partially transparent and the camera is positioned below the inspection plate to view the electronic device through the inspection plate.

5. The kiosk of claim 1 wherein the inspection plate is configured to tilt about an axis of rotation non-parallel to a front wall of the housing.

6. The kiosk of claim 5 wherein the axis of rotation of the inspection plate is perpendicular to the front wall of the housing.

7. The kiosk of claim 1, further comprising a third deflecting plate positioned at least partially below the first deflecting plate and configured to redirect the electronic device from the first deflecting plate toward the second deflecting plate.

8. The kiosk of claim 7 wherein the third deflecting plate is positioned directly below the inspection plate.

9. The kiosk of claim 1 wherein:

the storage bin is a first storage bin, the kiosk further comprises a second storage bin positioned adjacent the first storage bin within the housing;

the second deflecting plate is configured to rotate between a first position and a second position;

in the first position, the second deflecting plate directs the electronic device toward the first storage bin; and in the second position, the second deflecting plate directs the electronic device toward the second storage bin.

10. The kiosk of claim 1 wherein the housing has a volume of less than 0.75 cubic feet.

11. The kiosk of claim 1 wherein the storage bin comprises:

a first sidewall;

a second sidewall opposite and facing the first sidewall; and a first set of flexible fingers extending from the first sidewall toward the second sidewall, wherein the flexible fingers are configured to— flex when contacted by an electronic device dropped into the bin, and to reduce the likelihood that an electronic device passing through the storage bin lands on a lateral side of the electronic device.

12. The kiosk of claim 11 wherein the storage bin comprises a second set of flexible fingers extending from the second sidewall toward the first sidewall.

13. The kiosk of claim 1 wherein the housing has a volume of less than two cubic feet.

14. A consumer-operated kiosk for receiving an electronic device from a user, the kiosk comprising:

a housing having an inspection area therein;

an inspection plate within the inspection area, the inspection plate configured to receive and support the electronic device thereon at a receiving position relative to the housing within the inspection area;

a camera positioned within the housing and having a field of view that includes the inspection plate, wherein the camera is configured to capture images and/or video of the electronic device while the electronic device is supported on the inspection plate at the receiving position;

a deflecting plate positioned at least partially below the inspection plate within the housing;

a first storage bin positioned at least partially below the deflecting plate;

a second storage bin positioned adjacent the first storage bin and at least partially below the deflecting plate; and a processor operably connected to the inspection plate and to the deflecting plate, wherein the processor is configured to execute computer-readable instructions to— cause the inspection plate to tilt to direct the electronic device from the receiving position toward the deflecting plate; and cause the deflecting plate to move between— a first position wherein the deflecting plate directs the electronic device toward the first storage bin; and a second position wherein the deflecting plate directs the electronic device toward the second storage bin.

15. The kiosk of claim 14 wherein the processor is configured to detect when the first storage bin is filled with electronic devices, and wherein the processor causes the deflecting plate to move to the second position when the first storage bin is full.

16. The kiosk of claim 14, further comprising an access door configured to selectively open and close access to the inspection area from outside of the kiosk, wherein the processor is operably connected to the access door, and wherein the processor is configured to cause the access door to open if a user rejects an offer for purchase of the electronic device during a transaction at the kiosk.

* * * * *